US012658992B2

(12) United States Patent
Hu et al.

(10) Patent No.: US 12,658,992 B2
(45) Date of Patent: Jun. 16, 2026

(54) CHANNEL STATE REPORTING FOR THE UPDATING OF PRECODERS

(71) Applicant: QUALCOMM Incorporated, San Diego, CA (US)

(72) Inventors: Rui Hu, Beijing (CN); Liangming Wu, Beijing (CN); Yu Zhang, San Diego, CA (US); Chenxi Hao, Beijing (CN); Min Huang, Beijing (CN); Qiaoyu Li, Beijing (CN); Wei Xi, Beijing (CN); Kangqi Liu, San Diego, CA (US); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 489 days.

(21) Appl. No.: 18/264,870

(22) PCT Filed: Apr. 9, 2021

(86) PCT No.: PCT/CN2021/086109
§ 371 (c)(1),
(2) Date: Aug. 9, 2023

(87) PCT Pub. No.: WO2022/213347
PCT Pub. Date: Oct. 13, 2022

(65) Prior Publication Data
US 2024/0340049 A1     Oct. 10, 2024

(51) Int. Cl.
*H04B 7/06*          (2006.01)
(52) U.S. Cl.
CPC .................................... *H04B 7/061* (2013.01)
(58) Field of Classification Search
CPC ..................................................... H04B 7/061
(Continued)

(56) References Cited

U.S. PATENT DOCUMENTS 8,953,699 B2 * 2/2015 Sayana .................. H04B 7/024
                                                            375/267
2016/0065278 A1 * 3/2016 Wang .................... H04L 5/0048
                                                            375/267
(Continued)

FOREIGN PATENT DOCUMENTS

WO     WO-2010050874 A1 *  5/2010 ........... H04B 7/0617
WO        2018201640 A1    11/2018

OTHER PUBLICATIONS

International Search Report and Written Opinion—PCT/CN2021/086109—ISA/EPO—Dec. 27, 2021.

*Primary Examiner* — Tanmay K Shah
(74) *Attorney, Agent, or Firm* — QUALCOMM Incorporated

(57) ABSTRACT

Aspects of the disclosure relate to the generation of channel state reports and precoding a wireless transmission based on frequency division duplex (FDD) reciprocity. A base station (BS) uses at least two precoders to transmit signals to A user equipment (UE). The UE generates a set of channel state reports, in which the UE transmits a first set of channel coefficients using a first timing, a set of port attributes using a second timing, and a second set of channel coefficients using a third timing. The first set of channel coefficients correspond to a first precoded portion of the wireless transmission, and the set of port attributes and the second set of channel coefficients correspond to a second portion of the wireless transmission. The BS modifies at least one of the precoders based on the channel state reports. Other aspects, embodiments, and features are also claimed and described.

30 Claims, 25 Drawing Sheets

(58) Field of Classification Search
USPC ........................................................ 375/267
See application file for complete search history.

(56) References Cited

U.S. PATENT DOCUMENTS

| 2016/0156397 | A1  | 6/2016 | Onggosanusi et al. | |
| 2017/0257884 | A1* | 9/2017 | Rahman | H04B 7/065 |
| 2023/0216565 | A1* | 7/2023 | Kwak | H04B 7/088 |
| | | | | 375/267 |

\* cited by examiner

Figure 16:
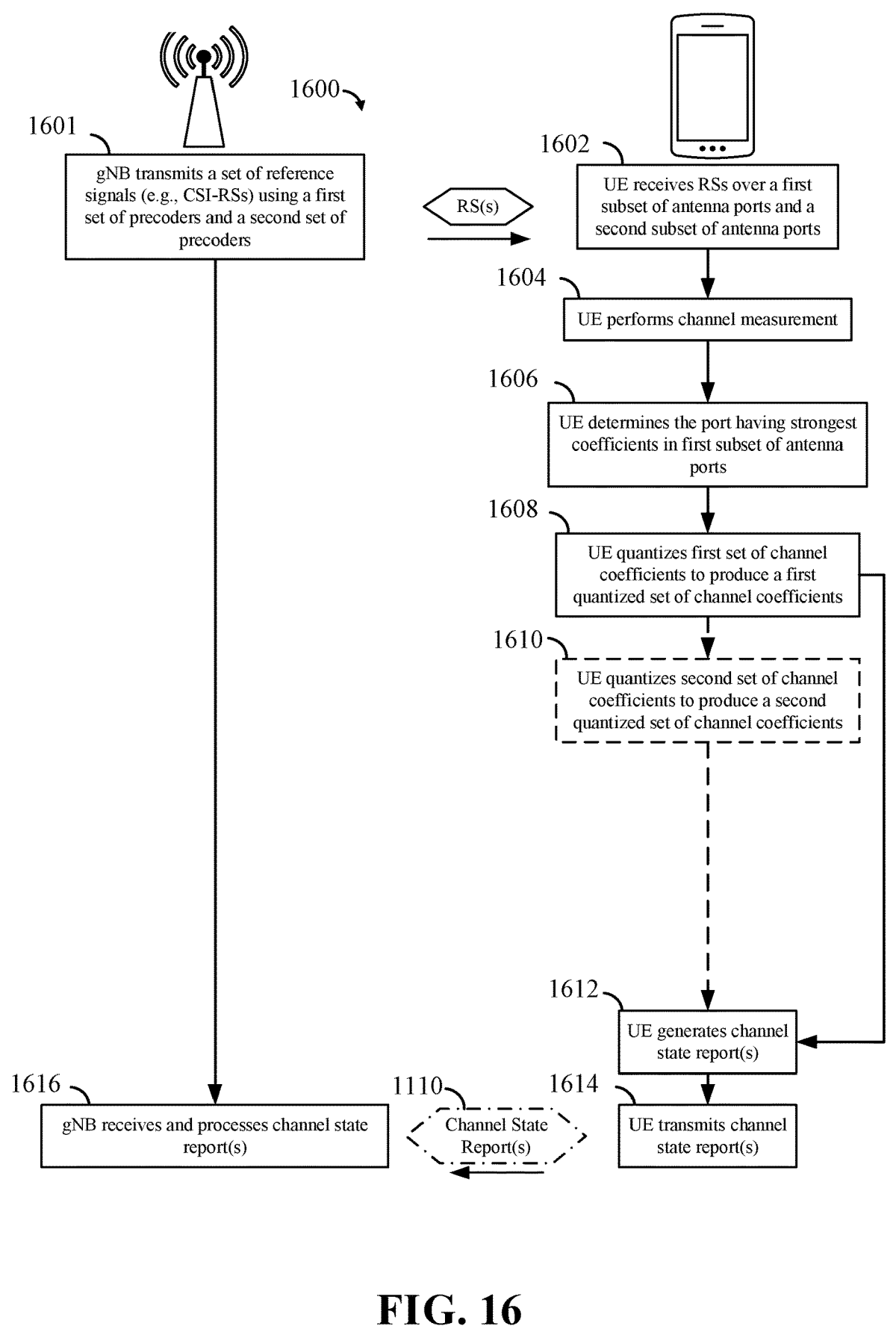

1601
gNB transmits a set of reference signals (e.g., CSI-RSs) using a first set of precoders and a second set of precoders RS(s)

1602
UE receives RSs over a first subset of antenna ports and a second subset of antenna ports 1604
UE performs channel measurement 1606
UE determines the port having strongest coefficients in first subset of antenna ports 1608
UE quantizes first set of channel coefficients to produce a first quantized set of channel coefficients 1610
UE quantizes second set of channel coefficients to produce a second quantized set of channel coefficients 1612
UE generates channel state report(s)

1616
gNB receives and processes channel state report(s)

1110
Channel State Report(s)

1614
UE transmits channel state report(s)

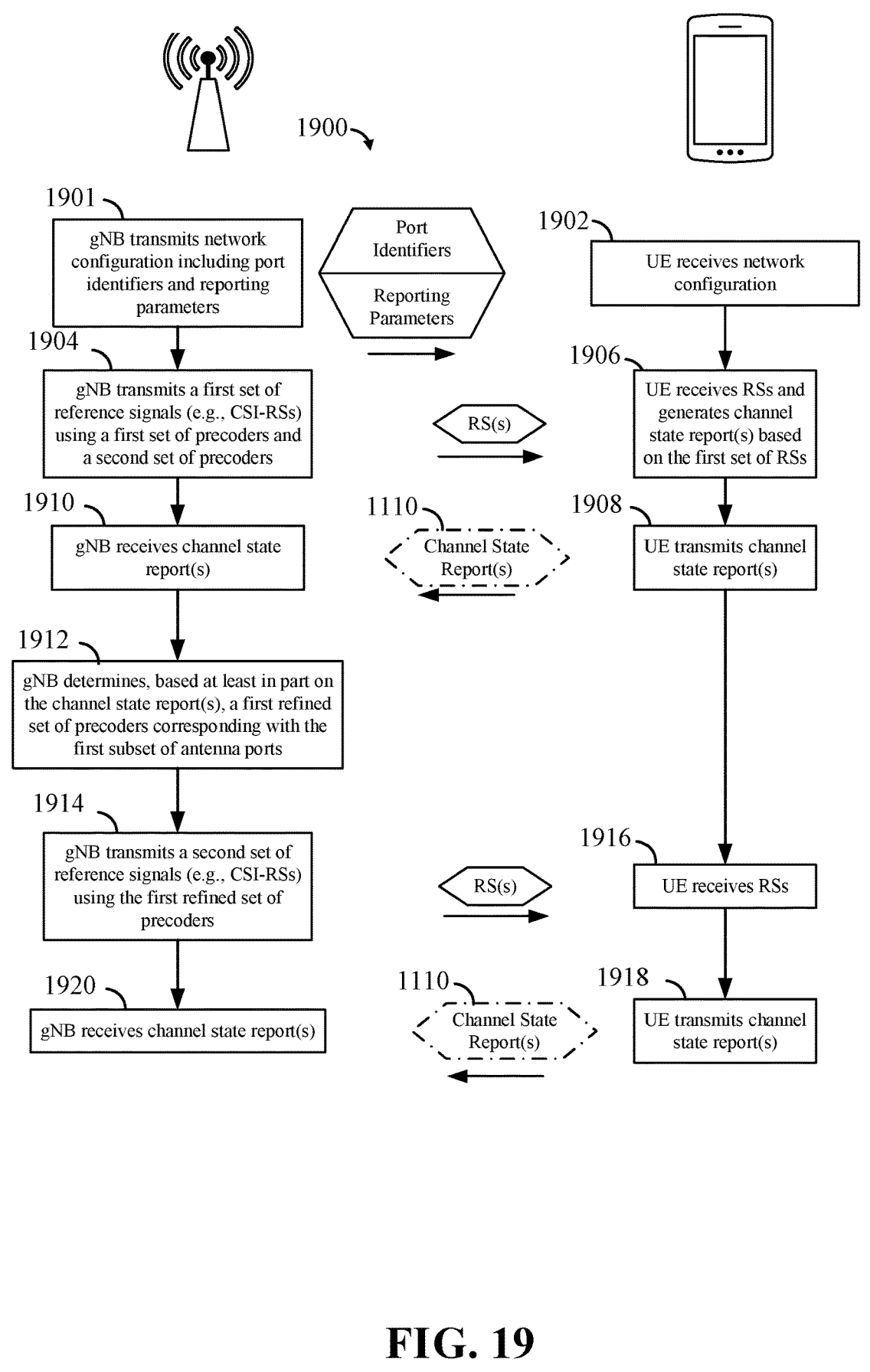

1901
gNB transmits network configuration including port identifiers and reporting parameters Port Identifiers Reporting Parameters 1902
UE receives network configuration 1904
gNB transmits a first set of reference signals (e.g., CSI-RSs) using a first set of precoders and a second set of precoders RS(s)

1906
UE receives RSs and generates channel state report(s) based on the first set of RSs 1910
gNB receives channel state report(s)

1110
Channel State Report(s)

1908
UE transmits channel state report(s)

1912
gNB determines, based at least in part on the channel state report(s), a first refined set of precoders corresponding with the first subset of antenna ports 1914
gNB transmits a second set of reference signals (e.g., CSI-RSs) using the first refined set of precoders RS(s)

1916
UE receives RSs 1920
gNB receives channel state report(s)

1110
Channel State Report(s)

1918
UE transmits channel state report(s)

FIG. 19

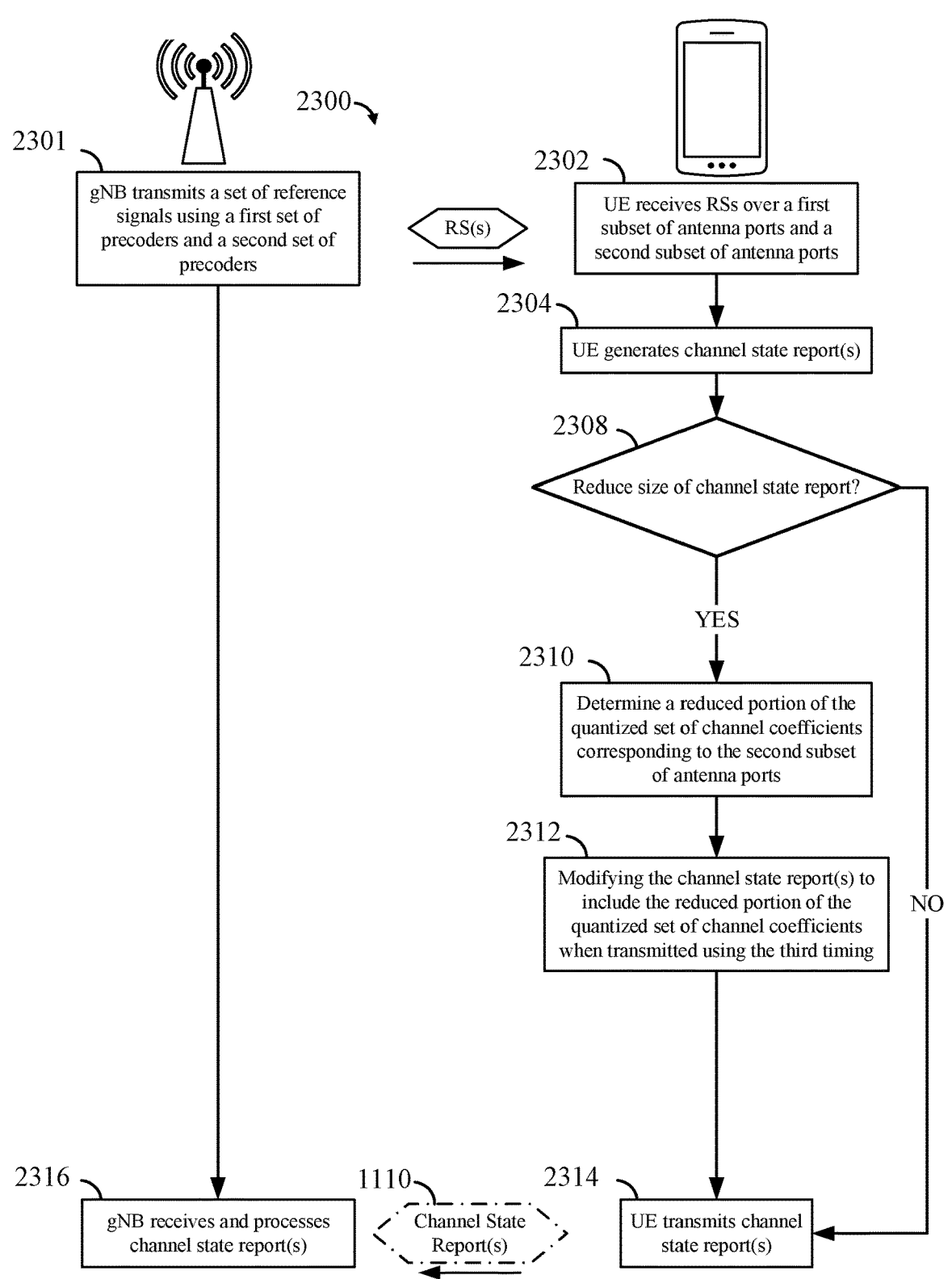

2300

2301
gNB transmits a set of reference signals using a first set of precoders and a second set of precoders RS(s)

2302
UE receives RSs over a first subset of antenna ports and a second subset of antenna ports 2304
UE generates channel state report(s)

2308
Reduce size of channel state report?

YES

2310
Determine a reduced portion of the quantized set of channel coefficients corresponding to the second subset of antenna ports 2312
Modifying the channel state report(s) to include the reduced portion of the quantized set of channel coefficients when transmitted using the third timing

NO 2316
gNB receives and processes channel state report(s)

1110
Channel State Report(s)

2314
UE transmits channel state report(s)

FIG. 23

CHANNEL STATE REPORTING FOR THE UPDATING OF PRECODERS

This application is a national stage application under 35 U.S.C. § 371 of PCT Application No. PCT/CN2021/086109, filed Apr. 9, 2021. The entire contents of PCT Application No. PCT/CN2021/086109 is incorporated herein by reference in its entirety.

TECHNICAL FIELD

The technology discussed below relates generally to wireless communication systems, and more particularly, to techniques for refining precoding matrices used in multi-antenna wireless communication systems.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Multiple access technologies have been adopted in various telecommunication standards to provide a common protocol that enables different wireless devices to communicate on a municipal, national, regional, and even global level. New radio (e.g., NR) is an example of an emerging telecommunication standard. NR includes a set of enhancements to the Long-Term Evolution (LTE) mobile standard promulgated by 3GPP. NR is designed to better support mobile broadband Internet access by improving spectral efficiency, lowering costs, improving services, making use of new spectrum, and better integrating with other open standards using multiple access technologies.

In wireless communication systems, the use of multiple antennas at a transmitter and/or at a receiver can provide improved functionality beyond the use of a single antenna at each endpoint. As an example, beamforming, or the directional transmission or reception of a wireless signal, can be achieved by applying a suitable precoding matrix to a signal transmission. That is, the amplitude and phase of each antenna in an array of antennas may be precoded, or controlled to create a desired (e.g., directional) pattern of constructive and destructive interference in the wavefront. In another example involving multiple-input multiple-output (MIMO), sometimes referred to as spatial multiplexing, a transmitter can transmit different streams of data, also referred to as layers, simultaneously on the same wireless resources. NR, as an emerging telecommunication standard, is designed to support beamforming, as well as MIMO technology, and carrier aggregation. Similar to beamforming, for MIMO, the transmitter applies a suitable precoding matrix to a signal transmission. For beamforming and for MIMO, generation of a suitable precoding matrix generally corresponds to sophisticated processing of a timely channel estimate, where a reference signal transmitted over the channel is received and measured.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method of wireless communication over a set of antenna ports is disclosed. The method includes receiving a first set of reference signals (RSs) corresponding to a first subset of the antenna ports; receiving a second set of RSs corresponding to a second subset of the antenna ports, the first subset of antenna ports corresponding to a first set of precoders and the second subset of antenna ports corresponding to a second set of precoders; determining, based at least in part on the first set of RSs, a first set of channel coefficients corresponding to the first subset of antenna ports; determining, based at least in part on the second set of RSs, a second set of channel coefficients corresponding to the second subset of antenna ports, and a set of port attributes corresponding to at least a portion of the second subset of antenna ports; transmitting the first set of channel coefficients using a first timing; transmitting the set of port attributes using a second timing; and transmitting the second set of channel coefficients using a third timing.

In another example, an apparatus for wireless communication that utilizes a set of antenna ports is disclosed. The apparatus includes: means for receiving a first set of reference signals (RSs) corresponding to a first subset of the antenna ports; means for receiving a second set of RSs corresponding to a second subset of the antenna ports, the first subset of antenna ports corresponding to a first set of precoders and the second subset of antenna ports corresponding to a second set of precoders; means for determining, based at least in part on the first set of RSs, a first set of channel coefficients corresponding to the first subset of antenna ports; means for determining, based at least in part on the second set of RSs, a second set of channel coefficients corresponding to the second subset of antenna ports, and a set of port attributes corresponding to at least a portion of the second subset of antenna ports; means for transmitting the first set of channel coefficients using a first timing; means for transmitting the set of port attributes using a second timing; and means for transmitting the second set of channel coefficients using a third timing.

In another example, an apparatus for wireless communication that utilizes a set of antenna ports is disclosed. The apparatus includes: at least one processor; a transceiver communicatively coupled to the at least one processor; and a memory communicatively coupled to the at least one processor, wherein the processor is configured to: receive a first set of RSs corresponding to a first subset of the antenna ports; receive a second set of RSs corresponding to a second subset of the antenna ports, the first subset of antenna ports corresponding to a first set of precoders and the second subset of antenna ports corresponding to a second set of precoders; determine, based at least in part on the first set of RSs, a first set of channel coefficients corresponding to the first subset of antenna ports; determine, based at least in part on the second set of RSs, a second set of channel coefficients corresponding to the second subset of antenna ports, and a set of port attributes corresponding to at least a portion of the second subset of antenna ports; transmit the first set of channel coefficients using a first timing; transmit the set of port attributes using a second timing; and transmit the second set of channel coefficients using a third timing.

In another example, a method of wireless communication over a set of antenna ports is disclosed. A method of wireless communication over a set of antenna ports, the method comprising: transmitting a set of timing parameters that define a first timing for obtaining a first set of channel coefficients corresponding to a first subset of antenna ports, a second timing for obtaining a set of port attributes corresponding to at least a portion of a second subset of antenna ports, and a third timing for obtaining a second set of channel coefficients corresponding to the second subset of antenna ports; transmitting a first set of reference signals (RSs) using a first set of precoders that correspond to the first subset of antenna ports; transmitting a second set of RSs using a second set of precoders; receiving a set of channel state reports including at least one of: the first set of channel coefficients, the set of port attributes corresponding to the second subset of antenna ports, or the second set of channel coefficients; and modifying, based at least in part on the set of channel state reports, at least the first set of precoders to produce a modified set of precoders; and transmitting a wireless transmission using the modified set of precoders.

In another example, an apparatus for wireless communication that utilizes a set of antenna ports is disclosed. The apparatus includes: at least one processor; a transceiver communicatively coupled to the at least one processor; and a memory communicatively coupled to the at least one processor, wherein the processor is configured to: transmit a set of timing parameters that define a first timing for obtaining a first set of channel coefficients corresponding to a first subset of antenna ports, a second timing for obtaining a set of port attributes corresponding to at least a portion of a second subset of antenna ports, and a third timing for obtaining a second set of channel coefficients corresponding to the second subset of antenna ports; transmit a first set of reference signals (RSs) using a first set of precoders that correspond to the first subset of antenna ports; transmit a second set of RSs using a second set of precoders; receive a set of channel state reports including at least one of: the first set of channel coefficients, the set of port attributes corresponding to the second subset of antenna ports, or the second set of channel coefficients; and modify, based at least in part on the set of channel state reports, at least the first set of precoders to produce a modified set of precoders; and transmit a wireless transmission using the modified set of precoders.

In another example, an apparatus for wireless communication that utilizes a set of antenna ports is disclosed. The apparatus includes: means for transmitting a set of timing parameters that define a first timing for obtaining a first set of channel coefficients corresponding to a first subset of antenna ports, a second timing for obtaining a set of port attributes corresponding to at least a portion of a second subset of antenna ports, and a third timing for obtaining a second set of channel coefficients corresponding to the second subset of antenna ports; means for transmitting a first set of reference signals (RSs) using a first set of precoders that correspond to the first subset of antenna ports; means for transmitting a second set of RSs using a second set of precoders; means for receiving a set of channel state reports including at least one of: the first set of channel coefficients, the set of port attributes corresponding to the second subset of antenna ports, or the second set of channel coefficients; and means for modifying, based at least in part on the set of channel state reports, at least the first set of precoders to produce a modified set of precoders; and means for transmitting a wireless transmission using the modified set of precoders.

These and other aspects of the technology discussed herein will become more fully understood upon a review of the detailed description, which follows. Other aspects, features, and examples will become apparent to those skilled in the art upon reviewing the following description of certain examples in conjunction with the accompanying figures. While the following description may discuss various advantages and features relative to certain embodiments and figures, all embodiments can include one or more of the advantageous features discussed herein. In other words, while this description may discuss one or more examples as having certain advantageous features, one or more of such features may also be used in accordance with the various examples discussed herein. In similar fashion, while this description may discuss exemplary embodiments as device, system, or method embodiments, it should be understood that such exemplary embodiments can be implemented in various devices, systems, and methods.

BRIEF DESCRIPTION OF THE DRAWINGS

FIG. 8 is a schematic illustration of a base station-generated portion of a precoder according to some embodiments.

FIG. 16 is a flow chart illustrating an exemplary process for a scheduled entity to quantize channel coefficients according to some embodiments.

FIG. 19 is a flow chart illustrating an exemplary process for a scheduling entity to refine a set of precoders based on a set of channel state reports received from a scheduled entity according to some embodiments.

FIG. 23 is a flow chart illustrating an exemplary process for a scheduled entity to reduce the payload size of a channel state report according to some embodiments.

DETAILED DESCRIPTION

Figure 1:
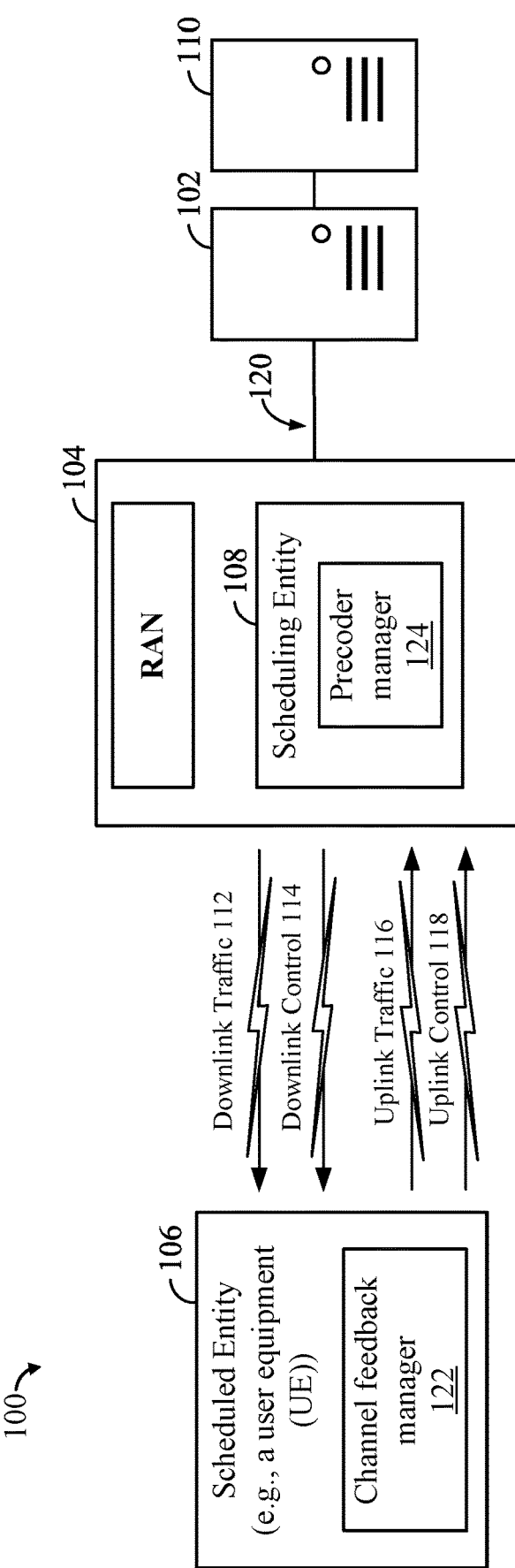
FIG. 1 is a schematic illustration of a wireless communication system according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, and/or packaging arrangements. In an example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. In an example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

In frequency division duplex (FDD) communication systems, signals are communicated between wireless communication devices via FDD carriers (e.g., uplink (UL) and downlink (DL) component carriers). In FDD systems, various communication devices, such as base stations and mobile devices, establish FDD links between transmitters and receivers of such devices to provide UL transmissions and DL transmissions between one another. Communication devices in such systems may exchange sets of reference signals (RSs) via the FDD component carriers. In an example, a base station may transmit to a mobile device a set of channel state information RSs (CSI-RSs) via a DL channel, and similarly, a mobile device may transmit to a base station a set of sounding reference signals (SRSs) via a UL channel.

In some examples, a transmitter may transmit such reference signals, as well as other signals, over a set of antenna ports. Antenna ports may or may not be the same as a number of antennas, as such ports are a logical entity corresponding to separate, multiplexed sets of transmissions and reference signals. To produce these antenna ports, the transmitter may apply a set of precoders to a transmission. Here, a precoder is essentially a mathematical operation the transmitter applies to a multi-antenna transmission, in order to produce a set of antenna ports, as a set of multiplexed streams that one or more receiving devices may then separate from one another. In an illustrative example, a base station may apply a set of DL precoders to transmit a signal to a mobile device, and likewise, a mobile device may apply a set of UL precoders to transmit a signal to a base station. The transmitter calculates the precoding matrix to apply based on a channel characterization procedure, generally based on the use of RSs to obtain measurements of the channel.

When transmitting a signal wirelessly, however, channel conditions (also referred to herein as the channel) between a transmitter and a receiver may change over time. And further, if the channel estimate is inaccurate, a precoder based on that estimate can suffer from degradation. A transmitter, in such instances, may determine and then over time modify a set of precoders while transmitting the signal in order to compensate.

Ideally, precoders are configured based on the most recent, most accurate channel estimates. For example, a base station may configure a precoder for a DL transmission based on a recent estimate of the DL channel. This DL channel estimate may, in some instances, be obtained by the base station first transmitting a RS to a mobile device, which the mobile device then measures to estimate the DL channel for the base station. In some instances, however, this process may be unavailable or otherwise undesirable for different reasons. In some wireless communication systems, devices have employed a technique called channel reciprocity. In this approach, for example, a precoder for a DL transmission might be calculated based on an estimate of the UL channel, and likewise a precoder for a UL transmission might be calculated based on an estimate of the DL channel. While this technique is well-known in time-division duplex (TDD) carriers, where the UL and the DL utilize the same channel, it is not typically used in FDD networks, where the UL and DL component carriers are separated from one another in frequency. Thus, while the use of channel reciprocity in an FDD network can be acceptable, the quality of the precoder may suffer.

Accordingly, to determine and/or modify precoders based on such channel estimates, various feedback systems between devices may be used to communicate channel estimates or channel characteristics for the various channels between a transmitter and receiver. In this way, scheduling entities may determine and/or refine their DL precoders based on feedback regarding the DL channel, and scheduled entities may determine and/or refine their UL precoders based on feedback regarding the UL channel.

In some aspects, the present disclosure provides apparatus, methods, processing systems, and computer-readable media for determining a set of precoders to apply when transmitting signals wirelessly over a set of antenna ports in an FDD system. Further aspects of the present disclosure provide apparatus, methods, processing systems, and computer-readable media for communicating feedback regarding FDD channel reciprocity over time. A device receiving this feedback may then determine and/or modify a set of precoders over time for subsequent wireless transmissions.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and at least one scheduled entity 106 (e.g., at least one user equipment (UE)). By virtue of the wireless communication system 100, the at least one scheduled entity 106 may be enabled to carry out data communication with an external data network 110, such as (but not limited to) the Internet.

As illustrated, the RAN 104 includes at least one scheduling entity 108, where, in some examples, the scheduling entity 108 may be a base station (BS). Broadly, a BS is a network element in a RAN responsible for radio transmission and reception in one or more cells to or from a UE. In different technologies, standards, or contexts, those skilled in the art may variously refer to a base station as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication. Such UE components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or for relevant quality of service (QoS) for transport of critical service data.

In an example, the wireless communication system 100 may include a number of scheduling entities 108 (each individually referred to herein as a scheduling entity 108) and other network entities. A scheduling entity 108 may provide communication coverage for a particular geographic area, sometimes referred to as a "cell", which may be stationary or may move according to the location of a mobile scheduling entity 108. In some examples, the scheduling entities 108 may be interconnected to one another and/or to one or more other BSs or network nodes (not shown) in the wireless communication system 100 through various types of backhaul interfaces (e.g., a direct physical connection, a wireless connection, a virtual network, or the like) using any suitable transport network. In some examples, the scheduling entity 108 may be a macro BS for macro cells. In another example, the scheduling entity 108 may be a pico BS for a pico cell, smaller than a macro cell. Further, the scheduling entity 108 may be a femto BS for a femto cell, even smaller than a pico cell. In some examples, a scheduling entity 108 may support one or multiple cells.

The scheduling entity 108 communicates with a number of scheduled entities 106 (each individually referred to herein as a scheduled entity 106) in the wireless communication system 100. The scheduled entities 106 (e.g., a first UE, a second UE, etc.) may be dispersed throughout the wireless communication system 100, and each scheduling entity 108 may be stationary or mobile. The wireless communication system 100 may also include relay stations, also referred to as relays or the like, that receive a transmission of data and/or other information from an upstream scheduling entity 108 and sends a transmission of the data and/or other information to a downstream scheduling entity 108, or that relays transmissions between scheduled entities 106, to facilitate communication between devices.

Wireless communication between the RAN 104 and a scheduled entity 106 (e.g., a UE) may be described as utilizing an air interface. Transmissions over the air interface from a scheduling entity 108 (e.g., a BS, a UE, etc.) to a scheduled entity 106 (e.g., one or more UEs) may be referred to as DL transmissions. In accordance with certain aspects of the present disclosure, the term "downlink" may refer to a point-to-multipoint transmission originating at a scheduling entity 108 (e.g., a BS, etc.). Another way to describe this scheme may be to use the term broadcast channel multiplexing. Transmissions from a scheduled entity 106 to a scheduling entity 108 may be referred to as UL transmissions. In accordance with further aspects of the present disclosure, the term "uplink" may refer to a point-to-point transmission originating at a scheduled entity 106 (e.g., a UE). As illustrated in FIG. 1, a scheduling entity 108 may manage DL traffic 112 to one or more scheduled entities 106, and UL traffic 116 from one or more scheduled entities 106.

In some examples, access to the air interface may be scheduled, where a scheduling entity 108 allocates wireless resources for communication among some or all devices and equipment within a cell (e.g., a service area of the scheduling entity 108). Within the present disclosure, a scheduling entity 108 may be responsible for scheduling, assigning, reconfiguring, and releasing resources for one or more scheduled entities 106. That is, for scheduled communication, scheduled entities 106 utilize resources allocated by a scheduling entity 108. In an example, the scheduled entities 106 may include entities scheduled for communication (e.g., UEs) that are configured to utilize resources allocated by the scheduling entity 108.

The RAN 104 may implement any suitable wireless communication technology or technologies to facilitate communication between a scheduled entity 106 and a scheduling entity 108 (e.g., by providing radio access to a scheduled entity 106). In an example, the RAN 104 may operate according to 3$^{rd}$ Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure. NR access networks may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communication (mMTC) targeting non-backward compatible MTC techniques, and/or mission critical targeting ultra-reliable low-latency communication (URLLC). These services may include latency and reliability requirements. These services may also have different transmission time intervals (TTI) to meet respective quality of service (QoS)requirements. In addition, these services may co-exist in the same subframe. NR supports beamforming and beam direction that may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. Similarly, multi-layer transmissions with, for example, up to 2 streams per UE may be supported. In some instances, aggregation of multiple cells may be supported with up to 8 serving cells, for example.

Base stations (BSs) are not the only entities that may function as scheduling entities. In some examples, a UE may function as a scheduling entity 108. A UE, as such, may be configured to schedule resources for one or more other scheduled entities (e.g., one or more other UEs) in wireless communication system 100.

In general, a scheduling entity 108 (e.g., one or more base stations (BSs)) may include a backhaul interface for communication with a backhaul 120 of the wireless communication system 100. The backhaul 120 may provide a link between a scheduling entity 108 (e.g., a BS) and a network 102. Further, in some examples, a backhaul 120 may provide interconnection between multiple scheduling entities 108 (e.g., a first BS and a second BS, etc.). Various types of interfaces for the backhaul 120 may be employed, such as a direct physical connection, a virtual network, or the like using any suitable transport network.

The core network 102 may be a part of the wireless communication system 100, and may be independent of the radio access technology (RAT) used in the RAN 104. In some examples, the core network 102 may be configured according to NR specifications (e.g., 5GC). In another example, the core network 102 may be configured according to a 4G evolved packet core (EPC), or any other suitable standard or configuration.

It should be noted that the techniques described herein may be used for various wireless networks and radio technologies, and that while some aspects of the present disclosure may be described using terminology commonly associated with 3G, 4G, and/or new radio (e.g., 5G NR) wireless technologies, aspects of the disclosed technology can be applied in other generation-based communication systems as would be understood by a person skilled in the art.

In general, any number of wireless networks may be deployed in a given geographic area. Each wireless network may support a particular RAT and may operate on one or more frequencies. Those skilled in the art may variously refer to a RAT as a radio technology, an air interface, etc. Those skilled in the art may further refer to a frequency as a carrier, a subcarrier, a component carrier, a frequency channel, a tone, a subband, etc. Each frequency may support a single RAT in a given geographic area in order to avoid interference between wireless networks of different RATs.

Figure 2:
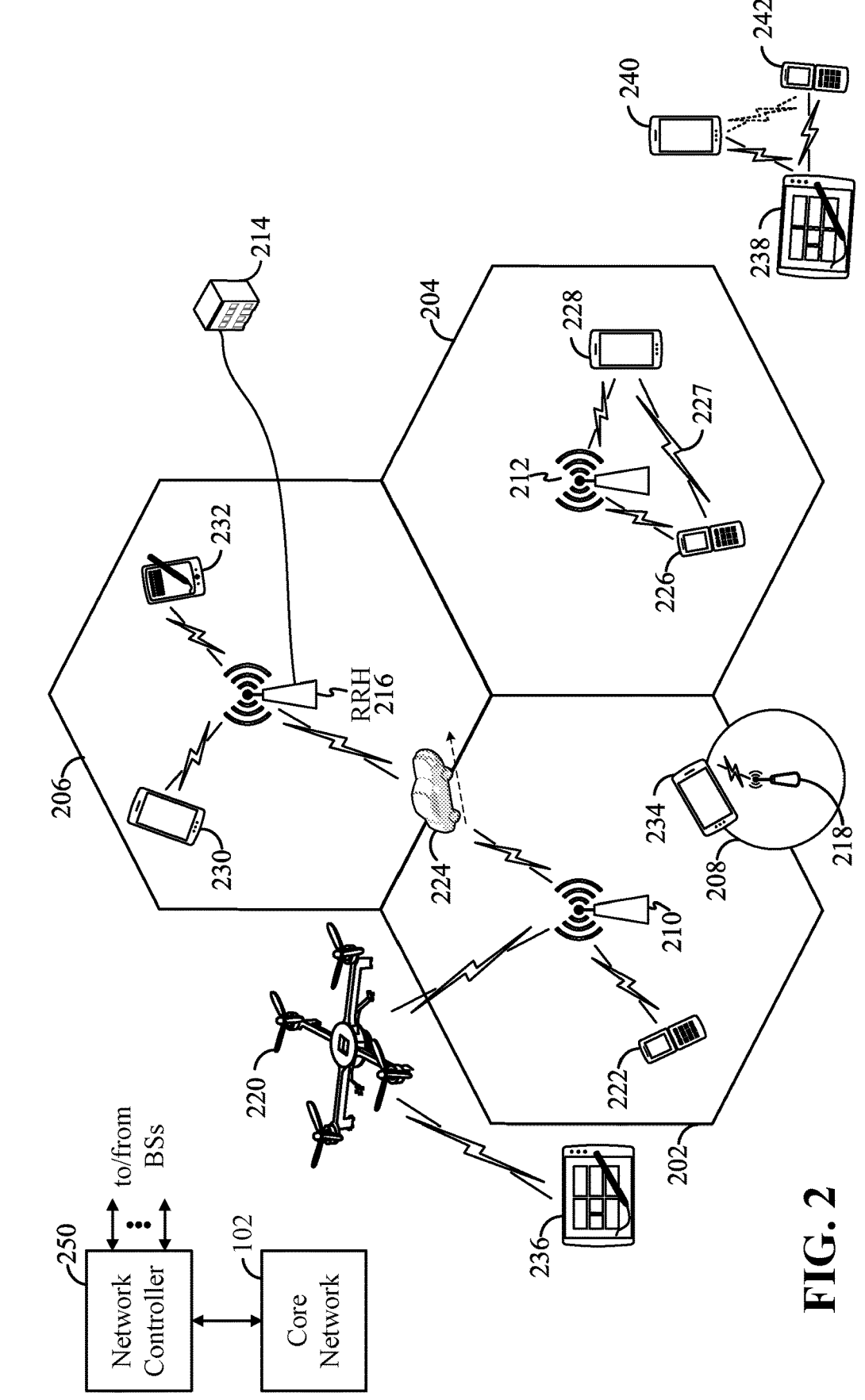
FIG. 2 is a conceptual illustration of an example of a radio access network (RAN) according to some embodiments.

FIG. 2 provides a schematic illustration of a RAN 200, by way of example and without limitation. In some examples, the RAN 200 may be the same as the RAN 104 described above and illustrated in FIG. 1. For example, the RAN 200 may be an NR system (e.g., a 5G NR network). The RAN 200 may be in communication with a core network 102. The core network 102 may be in communication with one or more BSs 210, 212, 214, and/or 218 and/or UEs 222, 224, 226, 228, 230, 232, 234, 236, 238, 240, and/or 242 in the RAN 200 via one or more interfaces.

The geographic area covered by the RAN 200 may be divided into cellular regions (cells) that a user equipment (UE) can uniquely identify based on an identification broadcasted from one access point or base station (BS). FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations (BSs) 210 and 212 in cells 202 and 204; and shows a third base station 214 controlling a remote radio head (RRH) 216 in cell 206. That is, a BS can have an integrated antenna or can be connected to an antenna or RRH by feeder cables. In the illustrated example, the cells 202, 204, and 126 may be referred to as macro cells, as the BSs 210, 212, and 214 support cells having a large size. Further, a BS 218 is shown in the small cell 208 (e.g., a micro cell, pico cell, femto cell, home base station, home Node B, home eNode B, etc.) which may overlap with one or more macro cells. In this example, the cell 208 may be referred to as a small cell, as the BS 218 supports a cell having a relatively small size. Cell sizing can be done according to system design as well as component constraints.

The RAN 200 may include any number of wireless BSs and cells. Further, a RAN may include a relay node to extend the size or coverage area of a given cell. The BSs 210, 212, 214, 218 provide wireless access points to a core network 102 for any number of mobile apparatuses. In some examples, the BSs 210, 212, 214, and/or 218 may be the same as the scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each BS 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with BS 214 by way of the RRH 216; UE 234 may be in communication with BS 218; and UE 236 may be in communication with mobile BS 220. In some examples, the UEs 222, 224, 226, 228, 230, 232, 234, 236, 238, 240, and/or 242 may be the same as the scheduled entity 106 described above and illustrated in FIG. 1. In some examples, a mobile network node (e.g., a quadcopter 220) may be configured to function as a UE. For example, the quadcopter 220 may operate within the cell 202 by communicating with BS 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system 100 with scheduled access to time-frequency resources and having a cellular configuration, a P2P configuration, or a mesh configuration, a scheduling entity and one or more scheduled entities may communicate utilizing the scheduled resources.

In some examples, the air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time utilizing a given resource. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD).

In FDD systems, transmissions in different directions operate at different carrier frequencies. In TDD systems, transmissions in different directions on a given carrier are separated from one another using time division multiplexing. That is, the carrier is sometimes dedicated for transmissions in one direction, while at other times, the carrier is dedicated for transmissions in the other direction.

The air interface in the RAN 200 may utilize one or more multiplexing and multiple access algorithms to enable simultaneous communication of the various devices. For example, 5G NR specifications provide multiple access for UL transmissions from a UE 222 and a UE 224 to a base station (BS) 210, and for multiplexing for DL transmissions from a BS 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a BS 210 may multiplex DL transmissions to UEs 222 and 224 utilizing time division multiplexing (TDM), code division multiplexing (CDM), frequency division multiplexing (FDM), OFDM, sparse code multiplexing (SCM), or other suitable multiplexing schemes.

In some examples, a network controller 250 may be in communication with a set of BSs 210, 212, 214, and/or 218 and provide coordination and control for these BSs 210 (e.g., via backhaul 120). In certain aspects, the network controller 250 may be in communication with a core network 102 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In FDD communication systems, a scheduling entity 108 may, in some examples, derive a set of precoders (e.g., one or more DL precoders) based on measured UL channel conditions. In an example, the DL component carrier in an FDD system may be considered $H_{DL} \in C^{N \times N_T \times N_R}$, where N is a number of sub-bands, $N_T$ is a number of transmitting antennas, and $N_R$ is a number of receiving antennas (e.g., a number of receive antennas 308 of a receiver 306). Characterizing the DL channel may include vectorizing the DL channel for each receiving antenna, $H_{v_{DL}} \in C^{N \times N_T \times N_R}$ where $H_{v_{DL}}(:,i)=vec(H_{DL}(:, :, i))$. The rank of $H_{v_{DL}}$ may be at most $N_R$, and the left subspace $U=SVD(H_{v_{DL}})$, where $U \in C^{N \times N_T \times r}$ and $r \leq N_R$. In this example, this left subspace may be considered as the basis (e.g., combination of SD and FD bases) for calculating the set of precoders.

It is desirable, in some examples, for a precoder to be the singular-value decomposition (SVD) of the corresponding channel in order to have good communication performance. To illustrate, it may be desirable for a DL precoder to be the SVD of the DL channel, and for a UL precoder to be the SVD of the UL channel.

With bidirectional (duplex) communication, a channel estimate corresponding to a set of RSs transmitted in one direction may be used to generate a precoding matrix for transmissions in the other direction. In general, this is referred to in the art as reciprocity (also sometimes referred to as carrier or channel reciprocity, in some examples).

In FDD communication systems, downlink (DL) and uplink (UL) channels may have correlated parameters, e.g., delay spread, angular spread, shadowing factor, cluster delay, cluster power, and departure/arrival angles. The DL and UL channels may further have correlated spatial domain (SD) and frequency domain (FD) bases. Thus, according to some aspects of the present disclosure, UL and DL reciprocity may exist in FDD systems, such as in terms of angle, delay, etc. In addition, a channel between a scheduling entity 108 and a scheduled entity 106 may be modeled as a multipath channel, where a line-of-sight signal and a number of signal reflections may arrive at a receiver over different paths, having different respective propagation times or delays. In an example, the receiving device may observe signals from a small number of taps, which may be characteristic of a sparse channel.

In some examples, a number of antenna ports (e.g., antenna ports for transmitting CSI-RSs) utilized in such systems may increase or decrease based on an amount of mismatch between the UL and DL channels (e.g., a high number of antenna ports may be utilized for relatively large UL/DL mismatch, poor FDD reciprocity between channel, or generally large calibration error). It should be reiterated that an antenna port is a logical entity distinct from a physical antenna. Each antenna port in a set of antenna ports may correspond to subsets of reference signals in a set of reference signals transmitted over the set of antenna ports.

In aspects of the present disclosure, a transmitter generates precoders for both the SD and FD. In an example, a scheduling entity may generate SD and FD precoders based on SD and FD bases, and the scheduling entity may then apply both precoders when transmitting a DL transmission.

In FDD communication systems, however, reciprocal UL and DL channels may, at times, have poor reciprocity. In such instances, a scheduling entity 108 that generates SD and FD bases for the DL channel based on the estimated reciprocal UL channel at the BS may result in poor performance of a DL precoder refined based on such SD and FD bases. Accordingly, it is desirable to develop techniques and apparatus for providing a particularized channel state reporting regime for the updating of DL precoders in FDD communication systems.

As would be understood by persons of ordinary skill in the art, non-ideal precoding tends to degrade the performance of the precoders over time. In instances where FDD reciprocity between a transmitter 302 and a receiver 306 is suboptimal, a precoder may perform poorly during any part of a transmission timeline. This may happen when the precoder was generated (or modified) based on a channel estimate of a UL channel, and then used to precode a DL transmission (e.g., a set of data transmissions, a set of reference signals, etc.). In any case, non-ideal precoding techniques may result in the transmission of faulty transmissions, such as transmission inaccuracies, data losses, or otherwise, imprecise communication.

Accordingly, techniques for generating (e.g., initializing or modifying) DL precoders based on UE explicit feedback may improve the performance of the DL precoders, and in addition, may improve the overall performance in various FDD systems. In some examples, a scheduled entity 106 may transmit feedback to scheduling entity 108 over a set of channel state reports. In an example, the scheduled entity 106 may transmit the UE explicit feedback to the scheduling entity 108 according to a set of timing parameters (e.g., periodicities, transmission timings, etc.). The scheduled entity 106 may transmit the feedback in multiple report parts across a set of channel state reports over time. The size of each channel state report in the set of channel state reports may increase and decrease over time (e.g., based on the inclusion and omission of different pieces of information corresponding to the different report parts).

The set of timing parameters may correspond to particular channel coefficients that the scheduled entity 106 determines by measuring one or more RSs. A scheduled entity 106 may also transmit feedback regarding a set of port attributes regarding a particular subset of antenna ports. In such examples, a scheduling entity 108 determines a set of DL precoders based on the UE explicit feedback communicated by the scheduled entity 106. In an example, a scheduling entity 108 may refine a DL precoder, or at least a portion of a DL precoder, such as a portion corresponding to a particular subset of antenna ports, based on sets of channel coefficients and/or sets of port attributes communicated to the scheduling entity 108 from the scheduled entity 106.

Figure 3:
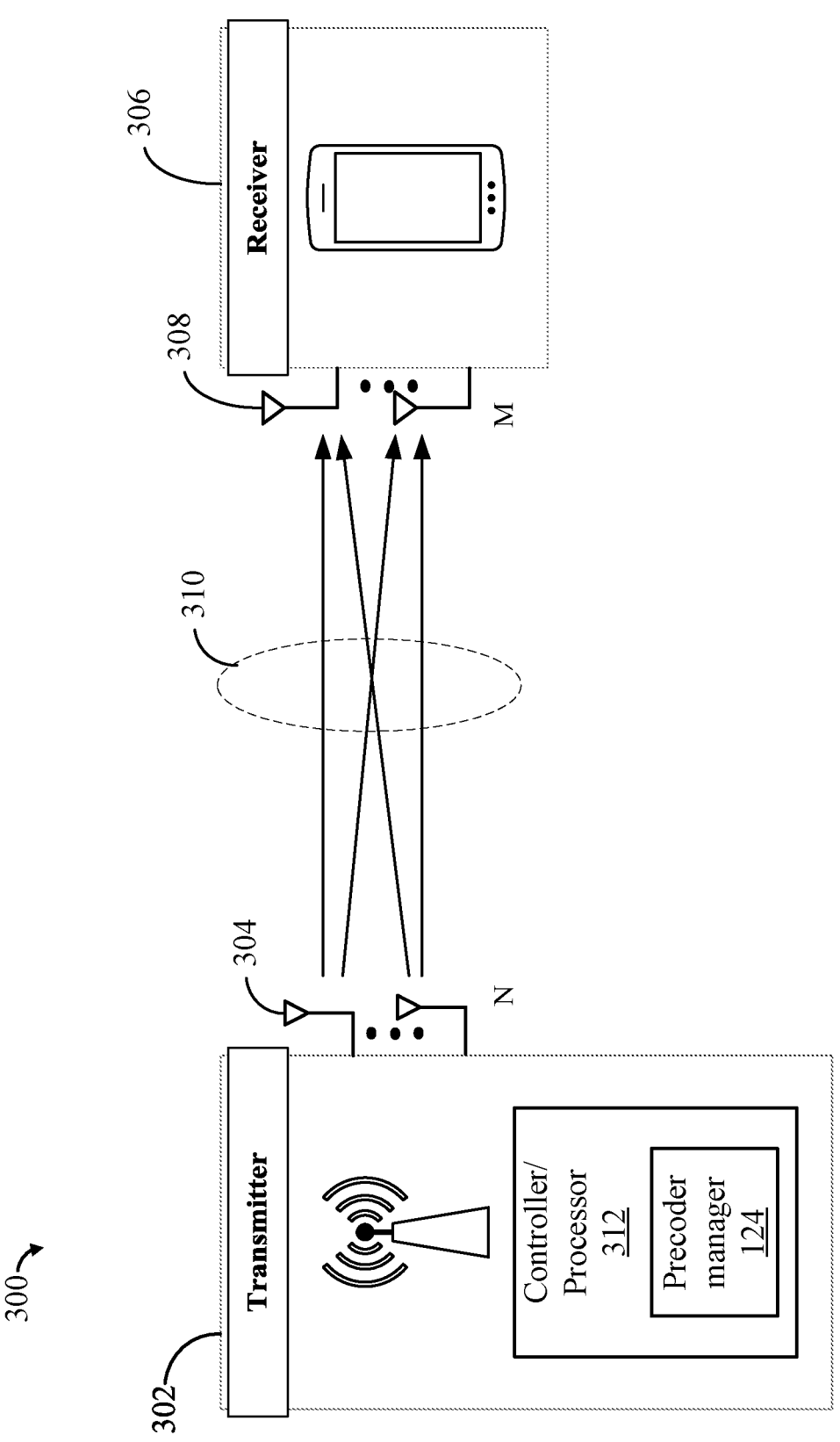
FIG. 3 is a block diagram illustrating a wireless communication system supporting multiple-input multiple-output (MIMO) communication according to some embodiments.

FIG. 3 illustrates an example of a wireless communication system 300 (e.g., wireless communication system 100) with multiple antennas, supporting beamforming and/or MIMO. The use of such multiple antenna technology enables the wireless communication system 300 to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront. In a MIMO system, a transmitter 302 includes multiple transmit antennas 304 (e.g., 'N' transmit antennas) and a receiver 306 includes multiple receive antennas 308 (e.g., 'M' receive antennas). In such examples, transmit antennas 304 and receive antennas 308 may create N×M signal paths 310 between the transmitter 302 and receiver 306. Each of the transmitter 302 and the receiver 306 may be implemented, for example, within a scheduling entity 108, a scheduled entity 106, or any other suitable wireless communication device.

In a MIMO system, spatial multiplexing may be used to transmit different layers simultaneously on the same time-frequency resource. In some examples, a transmitter 302 may send multiple data streams to a single receiver 306. In this way, a MIMO system takes advantage of capacity gains and/or increased data rates associated with using multiple antennas in rich scattering environments where channel variations can be tracked. In such examples, the receiver 306 may track channel variations and provide corresponding feedback to the transmitter 302. In the simplest case, as shown in FIG. 3, a rank-2 (e.g., including two data streams) spatial multiplexing transmission on a 2×2 MIMO antenna configuration may transmit two data streams via two transmit antennas 304. In such examples, receiver 306 may receive the signals (e.g., the data streams) using the receive antennas 308, where the signal received from each of the transmit antennas 304 reaches the receive antennas 308 along different signal paths 310. In such examples, receiver 306 may then reconstruct the data streams using the received signals from each receive antenna 308.

In some examples, a transmitter 302 may send multiple data streams to multiple receivers. This is generally referred to as multi-user MIMO. A multi-user MIMO system may exploit multipath signal propagation to increase the overall network capacity, e.g., by increasing throughput and spectral efficiency, and reducing the required transmission energy. This is achieved by a transmitter 302 spatially precoding (e.g., multiplying the data streams with different weighting and phase shifting) each data stream (in some examples, based on known CSI) and then transmitting each spatially precoded data stream through multiple transmit antennas 304 to the receiver 306. In such examples, transmitter 302 may transmit each of the data streams using the same allocated time-frequency resources. A receiver (e.g., receiver 306) may transmit feedback, including, e.g., a quantized version of the channel, so that the transmitter 302 can schedule the receivers with good channel separation. In some examples, the spatially precoded data streams transmitted through the multiple transmit antennas 304 arrive at receiver 306 with various spatial signatures, where each spatial signature corresponds to different data streams.

In some examples, receiver 306 may identify the various spatial signatures corresponding to the different data streams. Receiver 306 may then utilize the spatial signatures (and, in some examples, in combination with known CSI) to separate the spatially precoded data streams from one another. The receiving device may then recover the one or more data streams destined for that receiving device. In the other direction, multiple transmitters can each transmit a spatially precoded data stream to a single receiver. The receiver 306 may then identify the source of each spatially precoded data stream.

Upon receiving and processing the data streams, receiver 306 may then transmit feedback, including a quantized version of the channel, to one or more transmitting devices (e.g., a transmitter 302 or multiple transmitters 302). In some examples, the receiver 306 may transmit channel state reports, which may be referred to, in various examples, as "UE explicit feedback." In an example, the receiver 306 may provide CSI to transmitter 302 as a set of channel state reports, which may be referred to generally as CSI reports or, in various examples, as a channel state feedback (CSF) report. In some examples, a transmitter 302 may utilize the feedback received to schedule the receiving devices with adequate channel separation.

The number of layers in a MIMO system (e.g., a multi-user MIMO system) corresponds to the rank of the transmission. In some examples, the rank of a MIMO system is limited by the number of transmit antennas 304 or receive antennas 308, whichever is lower. In addition, the channel conditions at the receiver 306, as well as other considerations, such as the available resources at the transmitter 302, may also affect the transmission rank. In some examples, a BS in a RAN (e.g., transmitter 302) may assign a DL transmission rank to a particular UE (e.g., receiver 306). In an example, the BS may assign a rank (and therefore, a number of data streams) for a DL transmission to the UE based on rank information (RI) (e.g., a rank indicator) the UE transmits to the BS. In some examples, the UE may determine this RI based on the antenna configuration (e.g., the number of transmit antennas 304 and receive antennas 308) and a measured signal-to-interference-and-noise ratio (SINR) on each of the receive antennas 308. The RI may indicate, for example, the number of layers that the UE may support under the current channel conditions. In any event, the BS may receive the RI from the UE, and, then, utilize the RI (e.g., a received rank indicator), along with resource information (e.g., the available resources and amount of data to be scheduled for the UE), to assign the DL transmission rank to the UE.

The transmitter 302 determines the precoding of the transmitted data stream or streams based, for example, on known CSI of the channel on which the transmitter 302 transmits the data stream(s). In an example, the transmitter 302 may transmit one or more suitable reference signals (e.g., a CSI-RS and/or a SRS) that the receiver may measure and in turn, provide a set of channel state reports back to the transmitting device (e.g., via a UE feedback channel). The channel state report(s) may include, for example, various combinations of one or more of channel quality information (CQI) (e.g., a channel quality indicator), precoding matrix information (PMI) (e.g., a precoding matrix indicator), and/or the RI (e.g., a rank indicator). In such examples, a set of channel state reports including CQI, PMI, and/or RI may indicate a suitable transmission rank, a precoding matrix given the selected rank, and coding and modulation scheme given the selected precoder matrix, respectively, from the perspective of the scheduled entity 106.

In such examples, the receiving device may obtain CQI by performing various measurements on the one or more RSs obtained from the transmitting device. The receiving device may communicate measured CQI back to the transmitting device (e.g., via a set of channel state reports). In some examples, the CQI communicates the current channel quality, and in some examples, communicates a requested transport block size (TBS) for future transmissions to the receiving device. In some examples, the receiver 306 may further communicate PMI (e.g., a precoding matrix indicator) to the transmitter 302. This PMI generally communicates a precoding matrix (e.g., preferred by the receiver 306) for the transmitter 302 to use, and may be indexed to a predefined codebook. The transmitter 302 may then utilize this CQI/PMI to determine a suitable precoding matrix for transmissions to the receiver 306. In an example, the reported PMI is a suitable precoder matrix from the UE perspective to be used for DL transmissions. The BS may determine whether to use the reported PMI to modify, for example, a first subset of precoders in a set of precoders. The PMI may correspond to a specific precoder matrix and/or codebook. In such examples, a BS may use a set of PMI values to modify the set of precoders to a refined set of precoders.

In some examples, a controller/processor 340 may implement an antenna port mapping that allows controller/processor 312 to process (e.g., map) a set of antenna ports. In an example, controller/processor 312 may utilize precoder manager 124, together or separately, to implement the antenna port mapping. The antenna port mapping may, in general, be described as a mapping from the output of the controller/processor 312 to various antenna ports in a set of antenna ports (e.g., via precoder manager 124). In some examples, there may, for example, be up to eight, ten, twelve, sixteen, or, in some instances, larger numbers of individual antenna ports (e.g., emulated antenna ports) in a given set of antenna ports. As noted before, an antenna port is a logical entity distinct from a physical antenna, such as antennas 304.

In an example, the input for the antenna port mapping may consist of modulation symbols (e.g., QPSK, 16QAM, 64QAM, 256QAM etc.) corresponding to one or more transport blocks (TBs) output from the processor/controller 312. In some examples, the output of the antenna port mapping is a set of symbols (e.g., generally representing a wireless transmission, or stream of symbols, in the system 100) for each antenna port in the set of antenna ports. In such examples, a precoder manager 124 may map the symbols of each antenna port to the OFDM time frequency grid corresponding to that antenna port. The output may then be transmitted by antennas 304. Accordingly, a scheduling entity 108 may utilize a set of precoders (e.g., a modified set of precoders that are refined over time) to transmit a precoded set of signals via antennas 304 with the set of signals being precoded using an antenna port mapping.

In an illustrative example, the scheduling entity 108 may apply (e.g., via controller/processor 312) a first type of precoder to a first subset of RSs being transmitted over a first subset of antenna ports (e.g., using a first grouping of antenna ports from a first set of antenna ports). The first type of precoder corresponds to a first subset of precoders of a set of precoders, where the scheduling entity 108 is configured to refine the first subset of precoders to, for example, improve DL signal quality in FDD systems (e.g., in the wireless communication system 100). The first type of precoder may correspond to a first subset of precoders of the set of precoders. In addition, the scheduling entity 108 may apply a second type of precoder to a second subset of RSs being transmitted over a second subset of antenna ports (e.g., using a second grouping of antenna ports from the first set of antenna ports). The second type of precoder may correspond to a second subset of precoders (e.g., a complementary subset of precoders) of the set of precoders. In some instances, the second subset of precoders may be based on the first subset of precoders (e.g., based on the null space of the first set of precoders). In such examples, the scheduling entity 108 may precode the first subset of RSs using the first type of precoder. In addition, the scheduling entity 108 may precode the second subset of RSs using the second type of precoder. The scheduling entity 108 may transmit the first subset of RSs and the second subset of RSs over a corresponding set of antenna ports. Accordingly, the scheduled entity 106 may be configured to receive, via receive antennas 308, the first subset of RSs and the second subset of RSs as a set of RSs (e.g., as one or more CSI-RS(s)).

In one aspect of the present disclosure, a scheduled entity 106 performs a method for generating channel state information (CSI) and communicating the CSI to a scheduling entity across a set of channel state reports (e.g., a channel state report of a first type, a channel state report of a second type, a channel state report of a third type, etc.). The scheduled entity 106 transmits the set of channel state reports using a set of timing parameters corresponding to various report parts that are set for inclusion in the set of channel state reports across various time intervals. In an example, a scheduled entity 106 may transmit a first set of channel coefficients corresponding to a first subset of the antenna ports, using a first timing. In addition, the scheduled entity 106 may transmit a set of port attributes (e.g., a set of port indices to identify certain ports) corresponding to at least a portion of a second subset of the antenna ports, using a second timing. In another example, the scheduled entity 106 may transmit a second set of channel coefficients corresponding to the second subset of the antenna ports, using a third timing.

In some examples, the scheduling entity 108 may provide the scheduled entity 106 with a set of timing parameters that provide for the scheduled entity 106 to ascertain the timing for transmitting the various data items of the different report parts. The scheduling entity 108 may further provide the scheduled entity 106 with a set of omission parameters (e.g., one or more criteria) that provide conditions under which the scheduled entity 106 may forgo transmitting a particular data item or at least a portion of a data item (e.g., a portion of a quantized set of channel coefficients corresponding to the second subset of antenna ports). In an example, the scheduled entity 106 may determine that the resource allocation for transmitting the channel state report is limited and as such, may omit the set of channel coefficients corresponding to the second subset of antenna ports and/or the port attributes corresponding to at least the portion of the second subset of antenna ports. In another example, the scheduled entity 106 may reduce the data size of a channel state report by quantizing the data into discrete values. The scheduling entity 108 may provide a set of additional size reduction parameters that instruct the scheduled entity 106 to reduce the size of a channel state report through various omissions or reductions of data (e.g., omitting the weakest quantized channel coefficients determined relative to the second subset of antenna ports), such as when the report would otherwise exceed a reporting size threshold.

In a further aspect of the present disclosure, a scheduling entity 108 may perform a method for acquiring CSI from a scheduled entity 106. The scheduling entity 108 configures the scheduled entity 106 with a set of timing parameters to generate two or more different types of channel state reports. The two or more different types of reports correspond to at least two subsets of antenna ports from a set of antenna ports (e.g., a first subset of antenna ports, a second subset of antenna ports, etc.). The two or more different types of reports include different transmission timing parameters for reporting (1) various channel coefficients (e.g., a first set of channel coefficients corresponding to the first subset of antenna ports, a second set of channel coefficients corresponding to the second subset of antenna ports), and/or (2) port attributes corresponding to a subset of antenna ports in a set of antenna ports (e.g., port identifiers, port indices in a bitmap, signal measurements, quality attributes, port indices for at least a portion of a subset of ports providing sufficient signal quality to satisfy a predefined port selection threshold, etc.).

In an example, the scheduling entity 108 performs a method for precoding a transmission over a set of antenna ports. The scheduling entity 108 receives a set of channel state reports from a scheduled entity 106 according to a plurality of timing parameters, the timing parameters corresponding to different report parts of the set of channel state reports. In such examples, the scheduling entity 108 updates a first set of precoders based on at least one channel state report in a set of channel state reports. In an example, the scheduling entity 108 may modify (e.g., update, refine, etc.) the first set of precoders based on the first set of channel coefficients corresponding to a first subset of antenna ports in the set of antenna ports, based on the set of port attributes corresponding to at least a portion of a second subset of antenna ports in the set of antenna ports, and/or based on a second set of channel coefficients corresponding to the second set of precoders. In an example, the second set of precoders includes a random sequence of matrix values generated based on Gaussian systems, or in some instances, based on a null space of the first set of precoders.

In another illustrative example, a scheduling entity utilizes FDD reciprocity to generate spatial domain (SD) and frequency domain (FD) bases for precoding a DL transmission based at least partially on the set of channel state reports providing UE explicit feedback. In an example, the scheduling entity may receive a UL transmission (e.g., an SRS), estimate the UL channel, receive a set of channel state reports from a scheduled entity regarding the DL channel, generate SD and FD bases based at least partially on the channel state report(s) and/or the UL channel estimate, and determine anew, or modify over time, a set of DL precoders using the SD and FD bases.

Upon determining and/or modifying the precoders, a transmitter for the scheduling entity may apply the precoder(s) to any number of different signals to then transmit a precoded set of signals over a set of antenna ports via the FDD carrier. In some examples, a scheduled entity may generate and/or modify UL precoders to apply the precoder(s) to any number of different signals to then transmit a precoded set of signals over a set of antenna ports to the scheduling entity via the FDD carrier.

Figure 4:
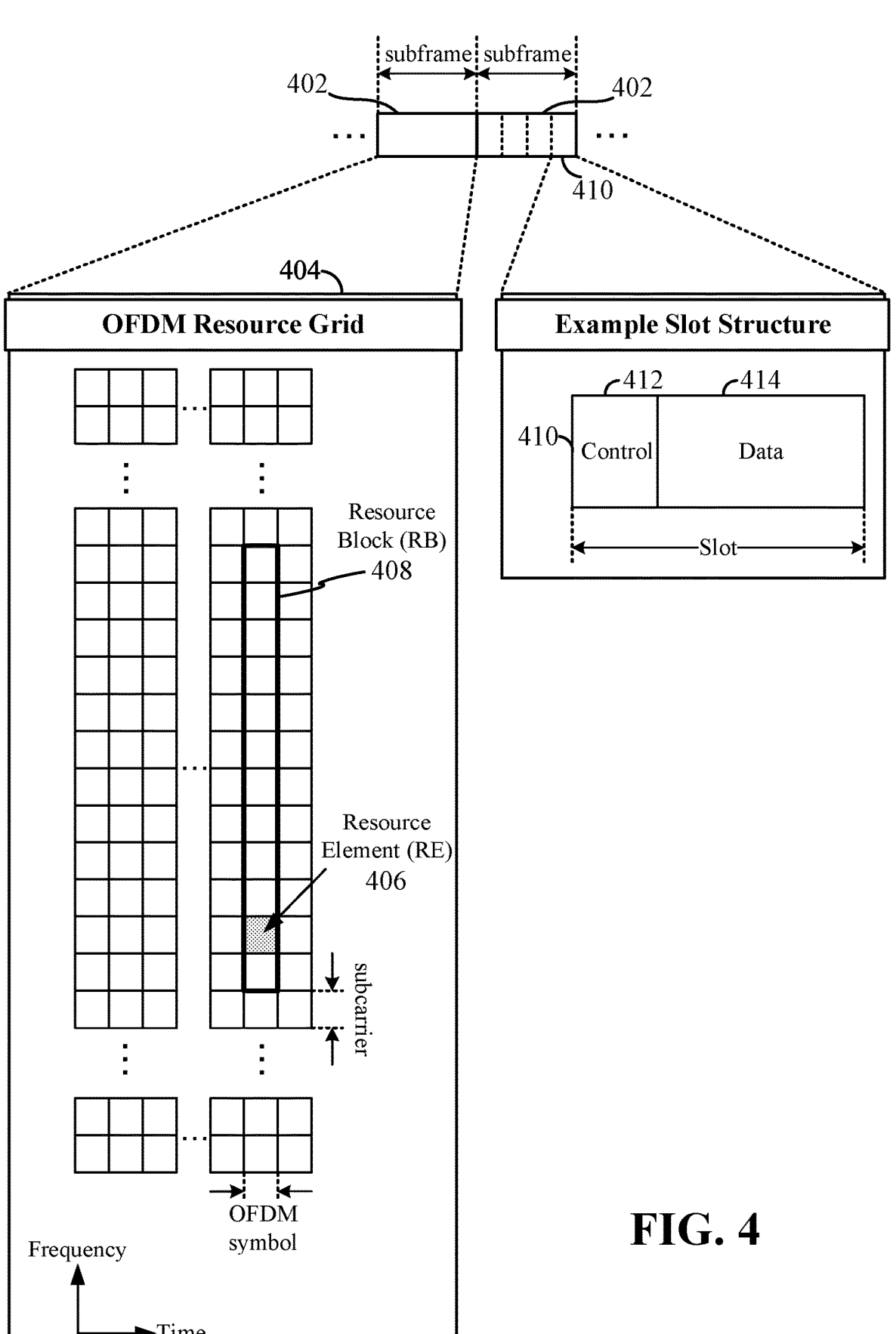
FIG. 4 is a schematic illustration of an organization of wireless resources in an air interface utilizing orthogonal frequency divisional multiplexing (OFDM) according to some embodiments.

FIG. 4 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein. That is, while some examples of the present disclosure may focus on an OFDM link for clarity, the present disclosure is not so limited, and a person of ordinary skill in the art will understood that one or more of the various techniques of this disclosure may also be applied to, for example, DFT-s-OFDMA waveforms, as well.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 4 illustrates an expanded view of an exemplary DL subframe 402, showing an OFDM resource grid 404. However, as those skilled in the art will readily appreciate, the PHY transmission structure for any particular application may vary from the example described here, depending on any number of factors. Here, time is in the horizontal direction with units of OFDM symbols. Frequency is in the vertical direction with units of subcarriers or tones.

The resource grid 404 may schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408. In an illustrative and non-limiting example, an RB may include twelve subcarriers, a number independent of the numerology used. In some examples, depending on the numerology, an RB may include any suitable number of consecutive OFDM symbols in, for example, the time domain. The present disclosure assumes, by way of example, that a single RB, such as RB 408, corresponds to a single direction of communication (either transmission or reception for a given device).

In this illustration, the RB 408 occupies less than the entire bandwidth of the subframe 402, with some subcarriers illustrated above and below the RB 408. In a given implementation, the subframe 402 may have a bandwidth corresponding to any number of one or more RBs 408. Further, the RB 408 is shown occupying less than the entire duration of the subframe 402, although this is merely one possible example.

Each 1 ms subframe 402 may consist of one or multiple adjacent slots. In FIG. 4, one subframe 402 includes four slots 410, as an illustrative example. In some examples, a slot may be defined according to a specified number of OFDM symbols with a given CP length. For example, a slot may include 7 or 14 OFDM symbols with a nominal CP. Additional examples may include mini-slots having a shorter duration (e.g., one or two OFDM symbols). A BS may in some cases transmit these mini-slots occupying resources scheduled for ongoing slot transmissions for the same or for different UEs.

An expanded view of one of the slots 410 illustrates the slot 410 including a control region 412 and a data region 414. In general, the control region 412 may carry control channels (e.g., a physical downlink control channel (PDCCH)), and the data region 414 may carry data channels (e.g., a physical downlink shared channel (PDSCH) and/or a physical uplink shared channel (PUSCH)). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within an RB 408 may carry one or more physical channels, including control channels, shared channels, data channels, etc. Other REs 406 within the RB 408 may also carry pilots or reference signals (RSs). These pilots or RSs may provide for a receiving device (e.g., a UE) to perform channel estimation of the corresponding channel, which, in some examples, may enable coherent demodulation/detection of the control and/or data channels within the RB 408.

In a DL transmission, the transmitting device (e.g., the scheduling entity 108) may allocate one or more REs 406 (e.g., within a control region 412) to carry one or more DL control channels. These DL control channel include DL control information (DCI) 114 including one or more DL control channels that generally carry information originating from higher layers, such as a physical broadcast channel (PBCH), a PDCCH, etc., to one or more scheduled entities 106. The PDCCH may carry DCI for one or more UEs in a cell. This can include, but is not limited to, power control commands, scheduling information, a grant, and/or an assignment of REs for DL and UL transmissions.

In some examples, DL REs may be allocated to carry DL physical signals that generally do not carry information originating from higher layers. These DL physical signals may include a primary synchronization signal (PSS), a secondary synchronization signal (SSS), demodulation reference signals (DM-RSs), phase-tracking reference signals (PT-RSs), CSI reference signals (CSI-RSs), etc.

A scheduling entity 108 may transmit the synchronization signals (e.g., a PSS and an SSS, collectively referred to as SSs), and in some examples, the PBCH in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order. While the present disclosure, at times, may refer to one or more specific SS block configurations as illustrative examples, the present disclosure is not so limited, and a person of ordinary skill in the art will understand that other example configuration may also apply according to one or more of the various techniques disclosed herein. To illustrate, additional, or alternative, examples may utilize greater or fewer than two synchronization signals, may include one or more supplemental channels in addition to the PBCH, may omit a PBCH, and/or may utilize nonconsecutive symbols for an SS block, to name but a few examples.

In a UL transmission, a transmitting device (e.g., a scheduled entity 106) may utilize one or more REs 406 to carry one or more UL control channels, such as a physical uplink control channel (PUCCH), a physical random access channel (PRACH), etc. These UL control channels may include UL control information (UCI) 118 that generally carries information originating from higher layers. Further, UL REs may carry UL physical signals that generally do not carry information originating from higher layers, such as DM-RSs, PT-RSs, sounding reference signals (SRSs), etc. In some examples, the UCI 118 may also include hybrid automatic repeat request (HARQ) feedback such as an acknowledgment (ACK) or negative acknowledgment (NACK), CSI, or any other suitable UCI.

In addition to control information, one or more REs 406 (e.g., within the data region 414) may be allocated for user data or traffic data. Such traffic may be carried on one or more traffic channels, such as, for a DL transmission, a PDSCH; or for a UL transmission, a PUSCH.

The channels or carriers described above and illustrated in FIGS. 1-4 are not necessarily all the channels or carriers that may be utilized between a scheduling entity 108 and a scheduled entity 106. Those of ordinary skill in the art will recognize that other channels or carriers may be utilized in addition to those illustrated, such as other traffic, control, and feedback channels.

The following description provides examples of UE explicit feedback that a transmitter (e.g., in a scheduling entity) may utilize to generate and/or modify precoders in FDD communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the present disclosure is intended to cover such an apparatus or method which is practiced using other structure, functionality, or structure and functionality in addition to, or other than, the various aspects of the disclosure set forth herein. It should be understood that any aspect of the disclosed technology may be embodied by one or more elements of a claim.

Example Updating Precoders in Frequency Division Duplex (FDD) Communication

Aspects of the present disclosure provide techniques and apparatus for updating precoders in FDD systems.

According to some aspects of the present disclosure, a scheduling entity 108 (e.g., a BS, such as a gNB) may update a set of DL precoders over time based on channel state reports received from a scheduled entity 106 (e.g., a UE). In such examples, the channel state reports represent information related to a DL channel. The scheduled entity 106 may measure the DL channel. A scheduled entity 106 may then generate, and transmit to the scheduling entity 108 any one or more of: (i) a first set of channel coefficients corresponding to a first subset of antenna ports as a first report part, (ii) a set of port attributes corresponding to a second subset of antenna ports as a second report part, and/or (iii) a second set of channel coefficients corresponding to a first subset of antenna ports as a third report part. As described within this disclosure (e.g., with reference to FIG. 15), the scheduled entity 106 may transmit these parts in a set of channel state reports using a particular timing for the various report parts. The first subset of antenna ports may correspond to a first subset of precoders of the DL precoder. The second subset of antenna ports may correspond to a second subset of precoders of the DL precoder. The scheduling entity 108 may receive the various reports parts and refine the first subset of precoders over time based at least in part on the different report parts.

While utilization of TDD reciprocity can be relatively straightforward, there has recently been increased interest in FDD reciprocity. In an FDD carrier, because the UL component carrier and DL component carrier operate at different frequencies, even in different bands, the FDD reciprocity of the respective UL and DL component carriers is less straightforward.

Because of FDD reciprocity, useful information for configuring a DL transmission may be obtained based on channel characteristics, parameters, or features of a corresponding UL carrier. In addition, useful information for configuring a UL transmission may be obtained based on channel characteristics, parameters, or features of a corresponding DL carrier.

According to various aspects of this disclosure, FDD reciprocity refers to a set of channel characteristics, parameters, or features considered reciprocal between UL and DL carriers, even if other characteristics, parameters, or features of the respective carriers may not exhibit such reciprocity. Still, although some portions of the UL and DL carriers might be irretrievably distinct, there remain features or characteristics of UL and DL carriers in FDD systems that nevertheless exhibit useful reciprocity. For example, since both carriers provide communication between the same endpoints, the angle of departure and angle of arrival of the different paths may be considered reciprocal.

According to release-16 of 3GPP specifications for 5G NR, a scheduling entity 108 may employ a certain Type II precoder to a CSI-RS transmission on a subband designated subband n. For example, a release-16 Type II precoder for subband n may be described according to the following equation:

$$\sum_{i=0}^{2L-1}\sum_{m=0}^{M-1} b_i \cdot c_{i,m} \cdot f_m^H[n]$$

Here, '$b_i$' represents an SD basis vector (e.g., the SD portion or component of a precoding matrix). In an example, '$b_i$' may correspond to the i-th column of an SD basis $W_1$, where 'L' may represent a number of SD basis vectors in the SD basis $W_1$. In various examples, the SD basis $W_1$ may represent a singular-value decomposition (SVD) of the channel (e.g., the FDD carrier), based on a measurement of one or more suitable reference signals. In some examples, an SD basis $W_1$ may be a discrete Fourier transform (DFT) basis or any other suitable matrix that generally matches the SD of the channel.

Further, $$f_m^H$$

may represent an FD basis vector (e.g., the FD portion or component of a precoding matrix). For example, $$f_m^H$$

may correspond to a row vector, e.g., being the m-th row of an FD basis $$W_F^H.$$

In various examples, $$W_F^H$$

may represent an FD basis of size 'M by N,' where 'M' may represent a number of FD basis vectors, and 'N' may represent a number of subbands (e.g., a number of columns in the FD basis $$W_F^H).$$

The superscript 'H' represents a conjugate transform. While the discussion that follows assumes that the FD basis vector $$f_m^H$$

is m-th row of $$W_F^H,$$

the techniques of this disclosure are not so limited, and a person of ordinary skill in the art will understand that an FD basis vector may correspond to a linear combination of a set of any suitable number of selected rows of $$W_F^H.$$

In some examples, $$f_m^H[n]$$

represents the element at the m-th row and n-th column of $$W_F^H.$$

In some examples, $c_{i,m}$ may represent a set (e.g., a vector, array, or matrix) of linear combination coefficients. In an illustrative example, $c_{i,m}$ may correspond to coefficient basis $\tilde{W}_{21}$, which may specify a set of linear combination coefficients. When a scheduled entity 106 receives a set of reference signals (e.g., CSI-RS(s)) over a precoded channel (e.g., over a set of antenna ports using precoders), the scheduled entity 106 may provide channel state reports to the scheduling entity 108.

With a release-16 type II precoder, the scheduled entity 106 may provide a scheduling entity 108 with feedback from which scheduling entity 108 can obtain the linear combination coefficients $c_{i,m}$ and the FD basis vector $$f_m^H.$$

According to the release-16 precoder, the scheduling entity 108 calculates the SD basis vector $b_i$ (e.g., based on a set of UL reference signals received from the scheduled entity 106), while the scheduled entity 106 calculates the FD basis vector $$f_m^H$$

(e.g., based on scheduled entity measurements of a set of DL reference signals received from the scheduling entity 108). The scheduling entity 108 may then precode a DL transmission based on this combination of information.

Figure 5:
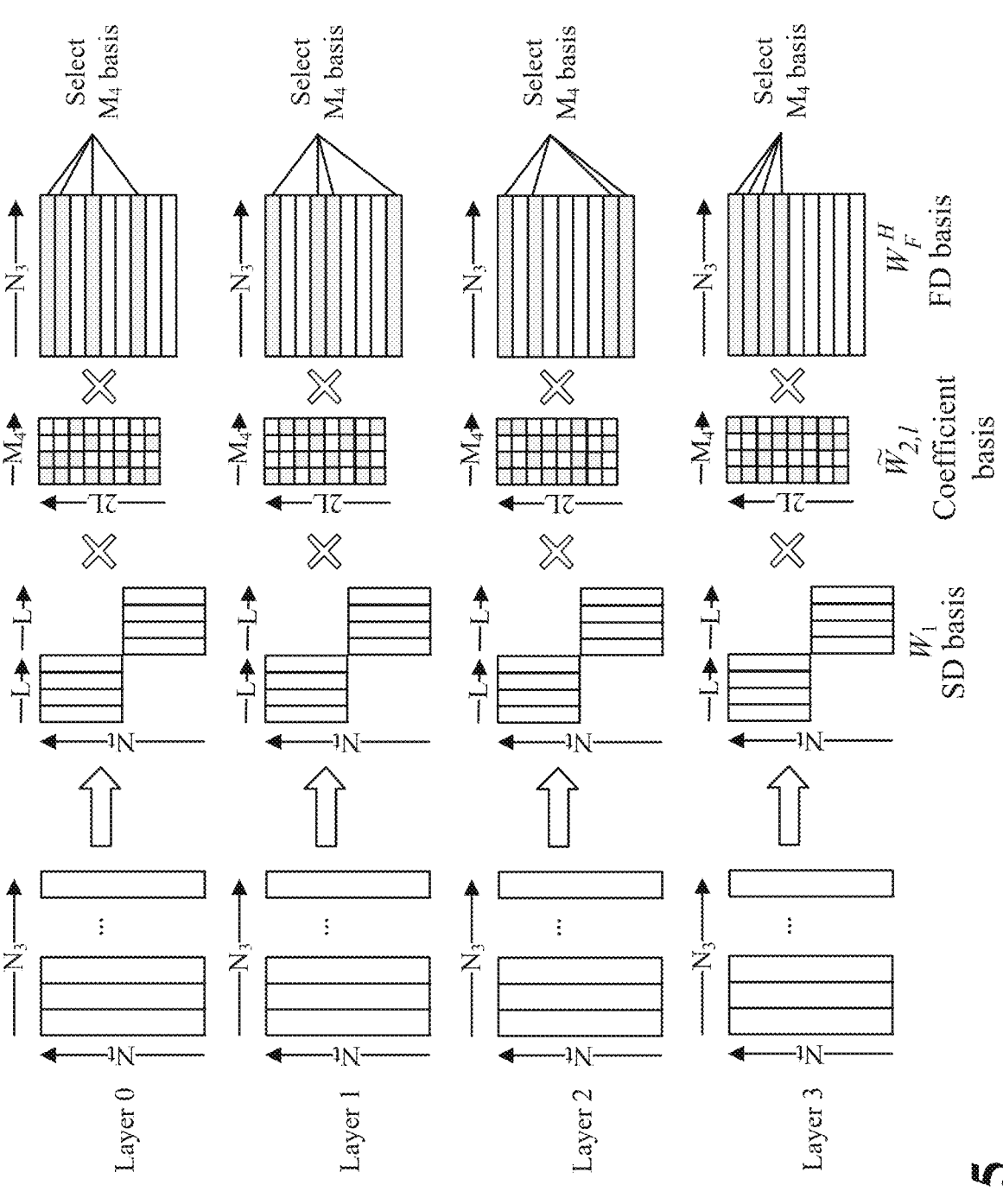
FIG. 5 is a diagram depicting the general structure of a sample codebook according to some embodiments.

In a precoding scheme, the matrices $W_1$, $\tilde{W}_{2,l}$, and $$W_F^H$$

may be specified within a predetermined codebook. FIG. 5 is a diagram depicting the general structure of an example codebook. As illustrated, the codebook may provide each of $W_1$, $\tilde{W}_{2,l}$, and $$W_F^H$$

to be applied to a number of different input layers (e.g., streams of data). In an example, the SD basis $W_I$ may establish SD basis vectors ($b_i$) for the input layers. In addition, the FD basis $$W_F^H$$

may establish FD basis vectors for the input layers.

In addition, the example codebook may specify the coefficient basis $\tilde{W}_{2,l}$ for each port (e.g., layer) within the codebook. As shown, the coefficient basis $\tilde{W}_{2,l}$ may be different for each port within the codebook. Though in another example, each port may share the same coefficient basis $\tilde{W}_{2,l}$.

In some examples, a channel may impact a wireless transmission 's,' e.g., based on various channel characteristics such as fading, Doppler spread, multipath, etc. Thus, if a transmitting device such as a scheduling entity 108 transmits a signal s, the signal received by a receiving device (e.g., a scheduled entity 106) may be effectively represented as y=Hs+n, where n represents noise on the channel. H may be considered in some examples as the transfer function of the channel over which the transmitting device transmits s. As described herein, a scheduled entity 106 may receive a reference signal (RS) from a scheduling entity 108, with which the scheduled entity 106 can determine a set of channel coefficients (e.g., elements related to the transfer function) based on this relationship.

In further examples (e.g., corresponding to MIMO, spatial multiplexing, etc., a transmitting device such as a scheduling entity 108 may precode its transmission s, such that the signal received by the receiving device has modified (e.g., improved) characteristics. For example, a scheduling entity 108 may apply a DL precoder (e.g., having a particular coefficient basis component, SD basis component, etc.) to its transmission s. Accordingly, the signal received by the scheduled entity 106 may then be represented as y=WHs+n, where W represents the DL precoder. And furthermore, as known to those of ordinary skill in the art, a scheduling entity 108 may provide a plurality of antenna ports or layers (e.g., orthogonal or substantially orthogonal streams) by applying different coefficient bases for W to signals for different antenna ports, such that a scheduled entity 106 may distinguish or differentiate data streams carried on different antenna ports from one another based on the DL precoder applied to the respective port. That is, the scheduled entity 106 may have received from a scheduling entity 108 (e.g., in a codebook) the coefficient bases information for each antenna port, which the scheduled entity 106 may then utilize to identify the respective ports and corresponding signals.

As described herein, a scheduled entity 106 may receive a set of reference signals (RSs) corresponding to a set of ports (e.g., layers). Here, the respective RSs may be identified or differentiated in any suitable manner, such as utilizing different predetermined or pre-agreed resources for the RS that corresponds to respective ports or layers. Upon measuring a received RS, the scheduled entity 106 may determine H (e.g., a set of channel coefficients corresponding to H, which may be affected or modified by a DL precoder with a particular coefficient basis as part of the precoding matrix) for a corresponding antenna port.

As discussed, in some examples, the scheduled entity 106 may then determine and transmit a set of channel coefficients that scheduled entity 106 determines for each of a set of one or more ports or layers, to the scheduling entity 108 in a set of channel state reports. In an example, a first set of channel coefficients for a first subset of antenna ports may correspond to a set of channel coefficients for each antenna port in the first subset of antenna ports, and so forth.

Figure 6:
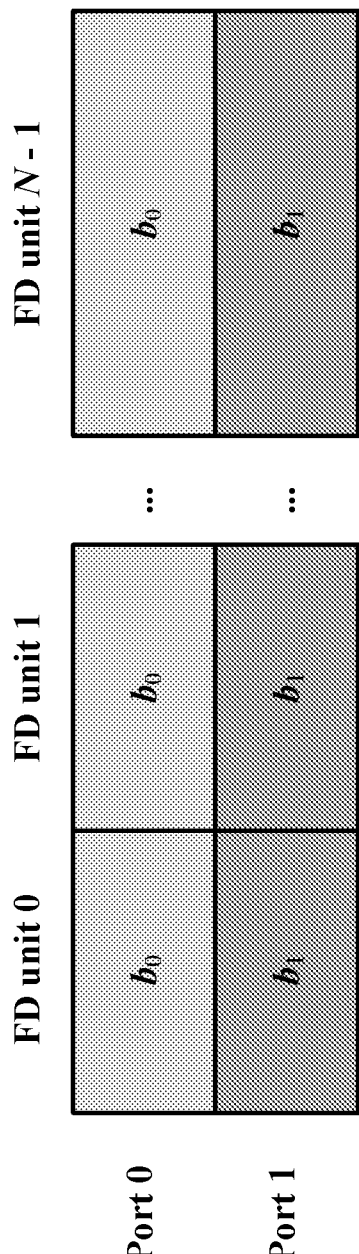
FIG. 6 is a schematic illustration of a base station-generated portion of a precoder according to some embodiments.

Referring now to FIG. 6, this illustration is a grid that schematically shows one example of a BS-generated part of a release-16 Type II precoder, applied to two ports (Port 0 and Port 1) for transmission of a CSI-RS. In the illustrated table, each row shows the SD basis vector (e.g., $b_0$, $b_1$) the scheduling entity 108 generates for a corresponding antenna port. Likewise, each column 'n' (where n=[0, . . . , N−1]) shows the SD basis vector the scheduling entity 108 generates for a corresponding frequency domain (FD) unit (also referred to as an FD basis or FD basis component) (e.g., FD unit 0 through FD unit N−1). In the discussion above, the notation 'n' was discussed in relation to a particular FD basis called a 'subband.' In the discussion that follows, for generality, 'n' will refer to an FD basis. Any reference to a subband may be inferred to be generalized to an FD basis.

The example depicted in FIG. 6 illustrates a BS-generated precoder for a specific set of antenna ports (in the example, two ports—Port 0 and Port 1). In some examples, the scheduling entity 108 may generate a precoder applicable to a larger number of antenna ports, such as when implementing SD and FD port emulation techniques. In that case, the scheduling entity 108 may provide a number of spatial linear beams and utilize beamforming techniques to generate antenna ports. In addition, using port emulation techniques, the scheduling entity 108 may generate a precoder for up to 2L−1 ports, where L may represent the number of spatial linear beams generated by the scheduling entity 108. In some examples, the antenna ports may be arranged based on different polarization levels. In an example, the precoder may be sorted according to increasing levels of polarization, where the initial antenna ports in the precoder (e.g., antenna ports ranging from Port 0 to Port L−1) may exhibit different levels of polarization relative to antenna ports occurring later (e.g., antenna ports ranging from Port L to Port 2L−1).

Figure 7:
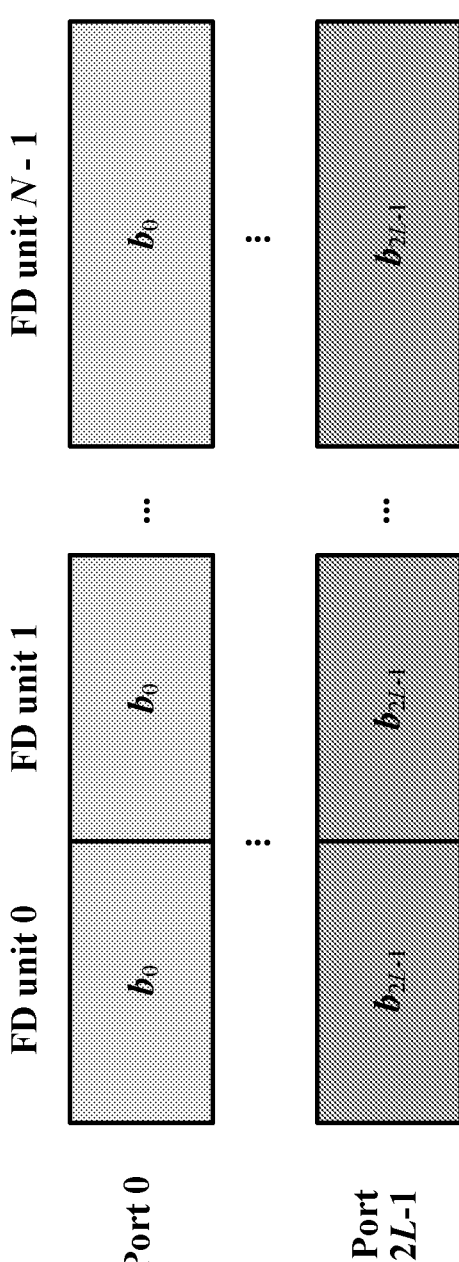
FIG. 7 is a schematic illustration of a base station-generated portion of a precoder according to some embodiments.

To illustrate, FIG. 7 depicts a grid that schematically shows one example of a BS-generated part of a release-16 Type II precoder, applied to a number of ports determined by a number of available spatial linear beams. Specifically, the ports run from a first Port 0 up to Port 2L−1. In the illustrated table, each row shows the SD basis vector (e.g., $b_0$, $b_{2L-1}$, etc.) the scheduling entity 108 generates for a corresponding antenna port (e.g., Port 0, Port 2L−1, etc.). Likewise, each column n (where n=[0, . . . , N−1]) shows the SD basis vector the scheduling entity 108 generates for a corresponding FD unit (e.g., FD unit 0 through FD unit N−1).

It has been observed that a scheduling entity 108 may obtain better DL precoding performance if the scheduling entity 108, rather than the scheduled entity 106, generates the FD basis vector $$f_m^H$$

(in addition to generating the SD basis vector $b_i$) used to precode DL signals transmitted over a set of antenna ports. In this manner, the scheduling entity 108 can consider frequency-selective characteristics of the channel in its determination of a precoder to employ. In an example, a scheduling entity 108 may generate an FD basis vector based on, e.g., an SVD basis of the channel or any other kind of FD basis that matches the FD of the channel. When FDD reciprocity is good, an SVD basis may perform better, while in another example, a different FD basis might perform better. In any case, allowing the scheduling entity 108 to generate the FD basis vector, rather than the scheduled entity 106, provides more flexibility in precoding, as well as potentially alleviating a burden for the scheduled entity 106 of calculating the FD basis vector itself (e.g., from a set of channel coefficients).

In the more recent release-17 of 3GPP specifications for 5G $N_R$, when a scheduling entity 108 employs a Type II precoder, the scheduling entity 108 generates the FD basis vector $$f_m^H$$

and the SD basis vector $b_i$. According to one or more of the various techniques of this disclosure, the scheduled entity 106 (e.g., a UE) may provide the scheduling entity 108 with a set of channel state reports. In some examples, the set of channel state reports may include a set of channel coefficients corresponding to a DL channel estimate performed relative to various antenna ports in a set of antenna ports, and in some instances, may include a set of port attributes representing a UE's selection of antenna ports, as well. In some examples, the scheduling entity 108 may then generate (e.g., update) the FD basis vector $$f_m^H$$

based at least in part on the information contained within one or more of the channel state reports (e.g., the set of channel coefficients) and utilize the FD basis vector for precoding subsequent DL transmissions. While the release-17 Type II precoder may be expressed with the same equation as provided above for the release-16 Type II precoder, the parameters within that equation may have a different origin.

In some examples, as various discussed, for example, with reference to FIGS. 10-25, the reports may communicate one or more sets of channel coefficients (e.g., amplitude measurements and/or phase measurements), associated with a first subset of antenna ports and/or a second subset of antenna ports in a set of antenna ports as described herein. The channel coefficients may be used, in some examples, to provide for the obtaining of linear combination coefficients $c_4$,m. The reports may further communicate a UE selection of antenna ports for a particular subset of antenna ports in the set of antenna ports. The scheduling entity 108 may then utilize the set of channel state reports to determine a set of precoders for subsequent DL transmissions (e.g., a refined set of precoders).

Figure 8:
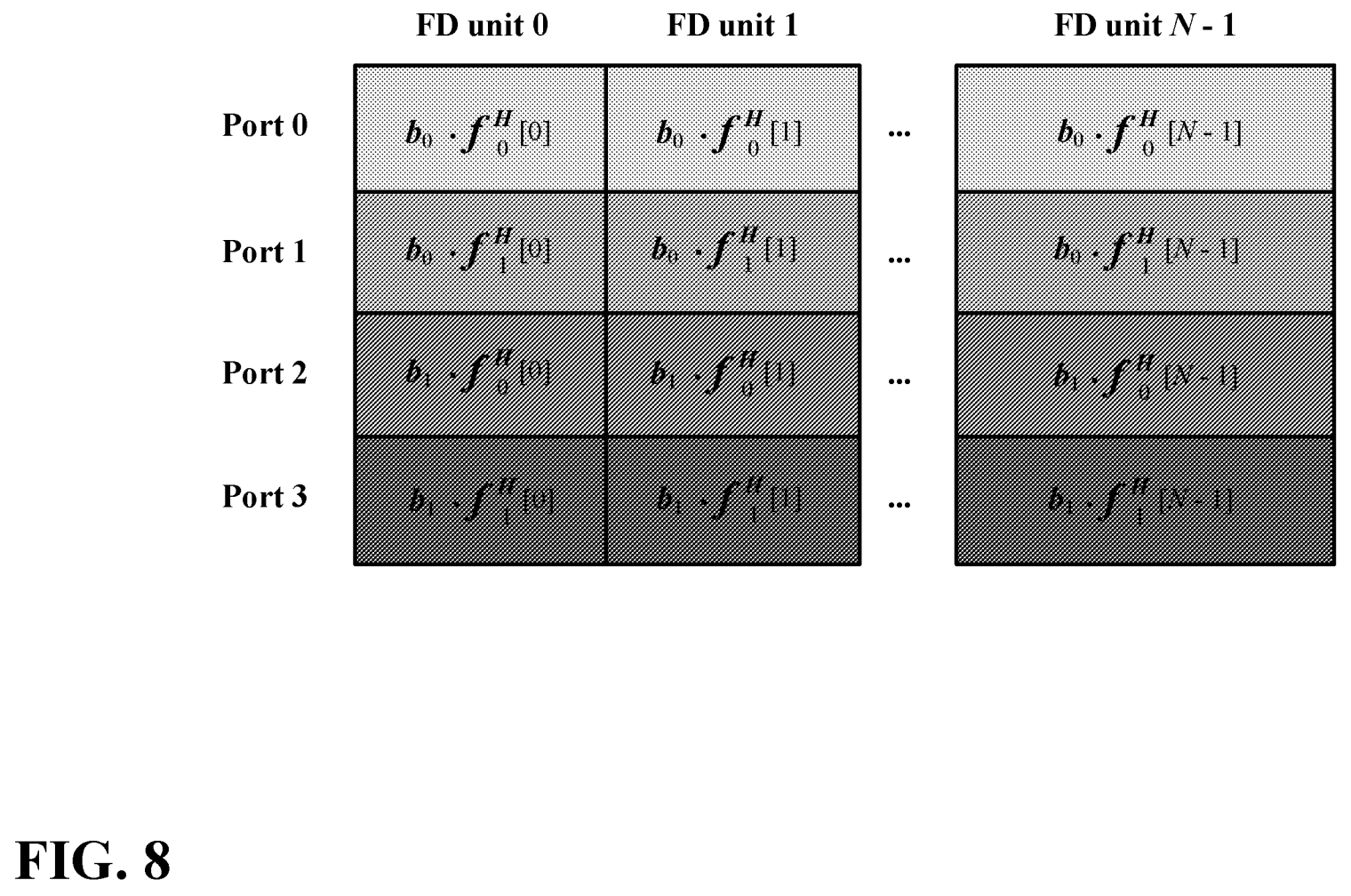

Referring now to FIG. 8, this illustration is a grid that schematically shows one example of a BS-generated part of a release-17 Type II precoder, applied to four ports (Port 0, Port 1, Port 2, and Port 3) for DL transmission. In this grid, each row shows a subset of DL precoders that the scheduling entity 108 generates for a corresponding antenna port (from the set of antenna Ports 0 through 3); and each column 'n' shows the portion of the DL precoder that the scheduling entity 108 generates for a corresponding FD unit, where 'n'=[0, . . . , N−1]. In an illustrative example for Port 0, the scheduling entity 108 generates an SD basis vector $b_0$ and an FD basis vector $$f_0^H$$

used to precode the portion of a DL signal transmitted over Port 0. The particular combination of SD basis vector and FD basis vector shown in FIG. 8 is merely illustrative in nature. In general, each SD basis vector may pair with a different FD basis vector to provide any number of SD-FD pairs. In the illustrated example, Port 0 and Port 1 both have the same SD basis vector, but different FD basis vectors. A scheduling entity 108 may employ other combinations of SD basis vectors and FD basis vectors in various implementations.

According to some aspects of the present disclosure, a scheduling entity 108 operating in FDD may take advantage of FDD reciprocity, and generate a DL precoder for precoding DL transmissions over a set of antenna ports. In an example, a scheduling entity 108 may receive a UL reference signal, such as an SRS or any other suitable signal, transmitted from a scheduled entity 106. The scheduling entity 108 may then generate a UL channel estimate upon measuring the received UL reference signal. And further, based on the UL channel estimate, the scheduling entity 108 may generate a DL precoder based on an SD basis vector and an FD basis vector.

In the present disclosure, certain aspects, features, and operations upon an FD basis vector are discussed. For ease of discussion, the SD basis vector may be considered as an ideal precoder, and thus, is not specifically addressed in the following discussion. Such an ideal SD basis vector is not a requirement, and any suitable ideal or non-ideal SD basis vector may be utilized in a given example in association with the FD basis vectors as discussed herein.

The example depicted in FIG. 8 illustrates a BS-generated precoder corresponding to an example set of antenna ports (in the example, four ports—Ports 0 through 3). The scheduling entity 108 may also generate a precoder applicable to a larger number of antenna ports, such as when implementing SD and FD port emulation techniques. In that case, the scheduling entity 108 may generate antenna ports using port emulation up to a maximum number of K antenna ports. Using such port emulation techniques, the scheduling entity 108 may generate a DL precoder for Ports 0 through K−1, with 'K' being the number of ports.

Figure 9:
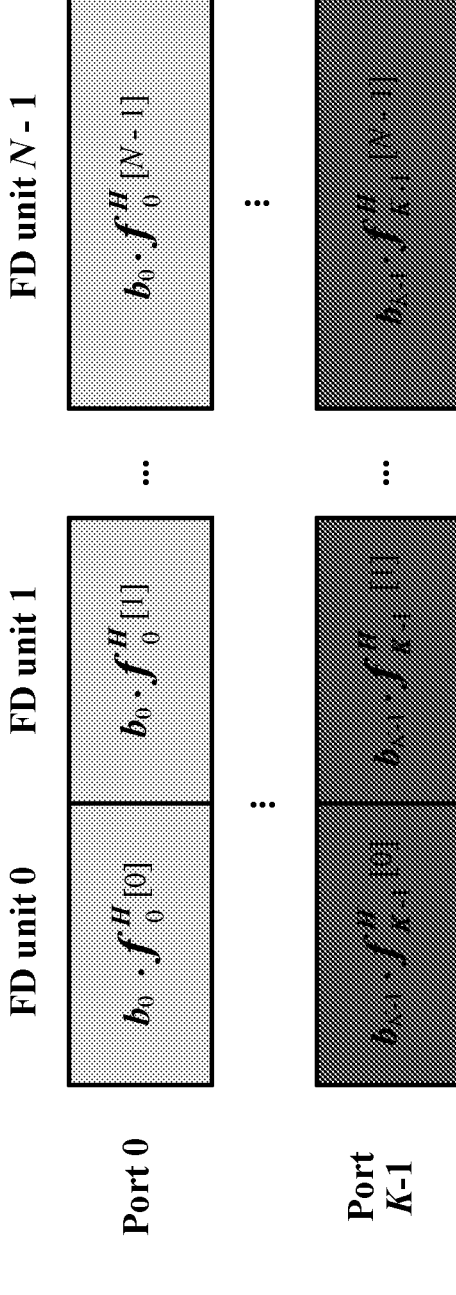
FIG. 9 is a schematic illustration of a base station-generated portion of a precoder according to some embodiments.

To illustrate, FIG. 9 depicts a grid that schematically shows one example of a BS-generated part of a set of precoders (e.g., a release-17 Type II precoder set), applied to a set of antenna ports determined by the value of K. Specifically, the ports run from a first Port 0 up to Port K−1, where 'K' is the number of antenna ports. In the illustrated table, each row shows a portion of a precoder the scheduling entity 108 generates for a corresponding antenna port; and each column n (where n=[0, . . . , N−1]) shows the precoder the scheduling entity 108 generates for a corresponding FD unit (e.g., 'FD unit 0' through 'FD unit N−1'). In an illustrative example for Port 0, the scheduling entity 108 generates an SD basis vector $b_0$ and an FD basis vector $$f_0^H$$

US 12,658,992 B2

29 used to precode the portion of a DL signal transmitted over Port 0. The same principle may apply for signals transmitted over the other antenna ports up to Port K−1.

Having established a precoding scheme, the scheduling entity 108 may transmit a precoded reference signal (e.g., CSI-RS) to a scheduled entity 106 for a channel state reporting scheme, the signal precoded according to an established precoding scheme. Upon receiving the precoded reference signal, the scheduled entity 106 may generate a corresponding channel estimate and transmit a set of channel state reports to the scheduling entity 108.

Example Determination of Antenna Port Subsets

Figure 10:
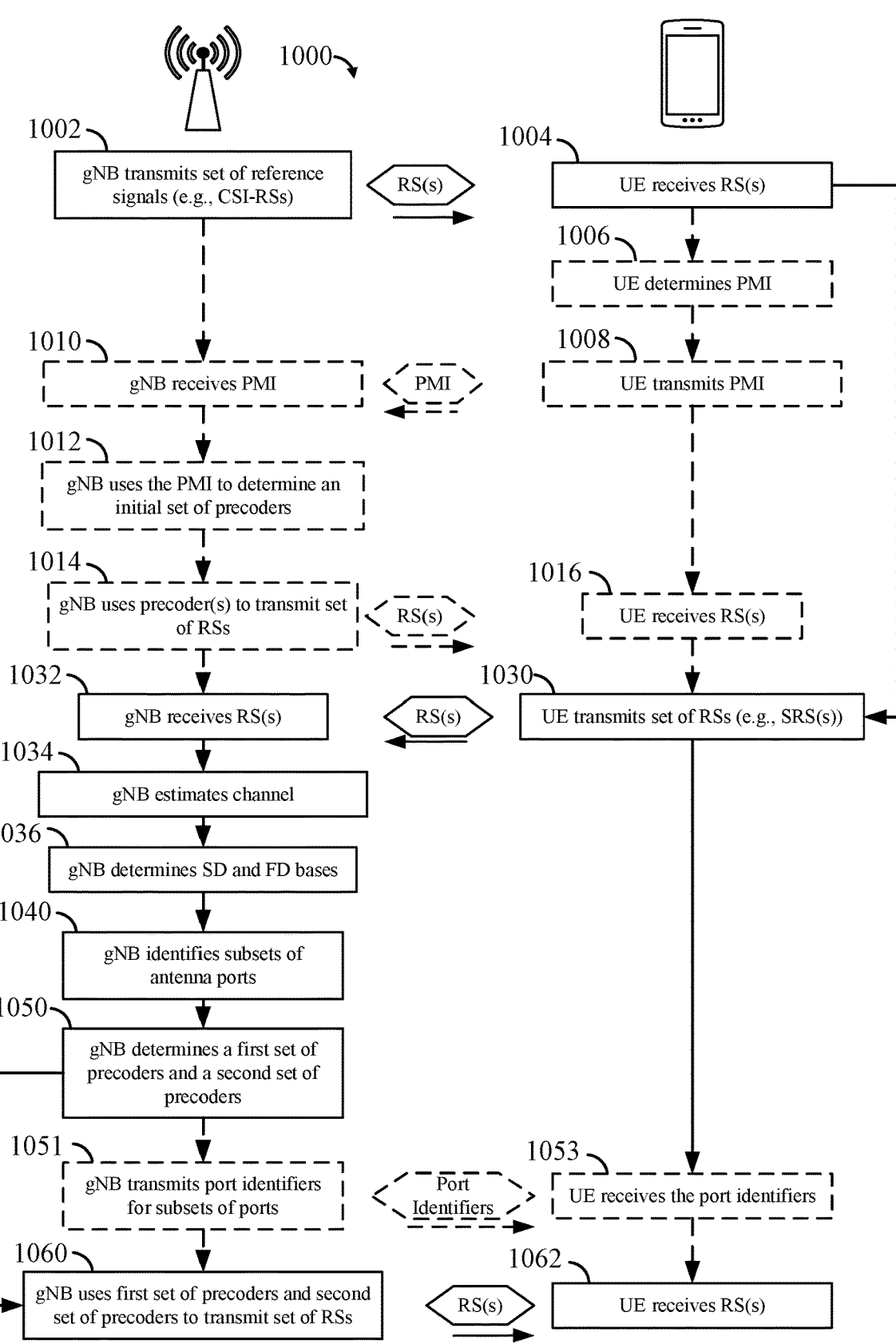
FIG. 10 is a flow chart illustrating an exemplary process for a scheduling entity to transmit reference signals to a scheduled entity according to some embodiments.

FIG. 10 is a flow chart illustrating an exemplary process 1000 for a scheduling entity 108 (e.g., a BS) to transmit DL signals to, and/or receive UL signals from, a scheduled entity 106 (e.g., a UE) in accordance with some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 25 may be configured to carry out the process 1000. In some examples, any suitable apparatus or means for carrying out the functions or algorithm described below may carry out the process 1000.

Blocks 1002-1016 represent an example of a scheduling entity 108 utilizing a DL channel estimate to determine an initial DL precoder and refining the DL precoder based on PMI received from a scheduled entity 106. As will be illustrated, the scheduling entity 108 may advantageously modify the DL set of precoders over time. The scheduling entity 108 may do so based on various sets of channel coefficients and/or port attributes that a scheduled entity 106 may generate based on a set of DL transmission(s). The scheduled entity 106 may then transmit such channel state information to the scheduling entity 108, for example, as described with reference to FIGS. 11-23.

At block 1002, the scheduling entity 108 transmits a first set of reference signals (e.g., one or more CSI-RSs) to a scheduled entity 106. In some examples, the scheduling entity 108 may transmit the first set of RSs by utilizing a set (e.g., a plurality) of antenna ports. In an illustrative example, the scheduling entity 108 may transmit a first set of CSI-RSs to the scheduled entity 106 using a set of antenna ports (e.g., Ports 0 through 9). In addition, the scheduling entity 108 may utilize precoder manager 124 to precode the first set of RSs, such as by implementing a random precoding of the set of antenna ports. In another example, the scheduling entity 108 may transmit the first set of RSs without any precoding. In an example, the scheduling entity 108 may transmit the CSI-RSs without precoding the RSs (e.g., as non-precoded RSs) as an initial set of RSs transmitted to the scheduled entity 106.

At block 1004, the scheduled entity 106 receives the first set of RSs from the scheduling entity 108. The scheduled entity 106 may receive the first set of RSs as a CSI-RS using, for example, receive antennas 308. The scheduled entity 106 may then measure the CSI-RS to estimate the DL channel. Due to certain reciprocal properties that may exist in the respective UL and DL channels in FDD systems, a scheduling entity 108 may, in some examples, generate a DL frequency domain basis vector $$f_m^{DL}$$

30 based on the UL frequency domain basis vector $$f_m^{UL}.$$

In an illustrative example, a scheduling entity 108 may generate an initial DL FD basis vector by reusing a UL FD basis vector. As one example, a scheduling entity 108 may simply apply the UL frequency domain basis vector without change as a DL frequency domain basis vector.

With ideal, or at least reasonably good channel reciprocity, this reuse of the UL frequency domain basis may be suitable. That is, the UL and DL channels may share at least some columns that have nonzero values. In an example, when a scheduling entity 108 reuses the UL frequency domain basis vector $$f_m^{UL}$$

in the DL transmission, the DL precoder may cause a loss of information or signal power corresponding to other channel paths, for example, having different propagation times or delays. Where FDD reciprocity is low, reuse of the UL frequency domain basis vector for the DL precoder can result in poor performance. Accordingly, utilizing UE explicit feedback (e.g., a set of channel state reports with coefficients and/or port attributes) may effectively improve performance as described. In addition, the scheduling entity 108 may update the DL FD basis vector based on the PMI in the UE feedback. In an example, the scheduling entity 108 may transmit a precoded DL reference signal over a set of antenna ports, with the precoder being applied at respective ports.

In optional block 1006, the scheduled entity 106 may estimate the DL channel to determine PMI, such as a set of precoding matrix indicators for the respective antenna ports. In an example, the scheduled entity 106 may determine channel characteristics based on measurements performed on the first set of RSs. In such examples, the scheduled entity 106 may determine the PMI based on those characteristics of the DL channel. In addition, the scheduled entity 106 may generate an initial FD basis vector based on the channel characteristics. The scheduled entity 106 may utilize the initial FD basis vector to precode a UL transmission, such as to transmit the PMI, an SRS, and/or other UL signal.

In optional block 1008, the scheduled entity 106 may transmit the PMI to the scheduling entity 108. In an example, the scheduled entity 106 may transmit a set of precoding matrix indicators or a precoding matrix to the scheduling entity 108. In some examples, the scheduled entity 106 may determine an FD basis vector based on, for example, the SVD of the DL channel, and then transmit the information to the scheduling entity 108. Because, in FDD systems, frequencies between UL transmissions may be independent from frequencies between DL transmissions, the scheduled entity 106 may transmit such feedback to the scheduling entity 108 regarding the state of the DL channel and/or may transmit the PMI to assist the scheduling entity 108 in refining the DL precoders.

In accordance with one or more of the various techniques of this disclosure, altering the allocation of computing tasks from the scheduled entity 106 to the scheduling entity 108 may provide improved efficiencies, a conservation of resources, and an overall improvement to DL precoder performance depending on the particular implementation of any such allocation techniques. In an example, the scheduled entity 106 may instead, as disclosed herein, provide the scheduling entity 108 with channel coefficient measurements and/or various antenna port attributes corresponding to a secondary subset of the antenna ports, such that the scheduling entity 108 may update the DL precoders based on this information. In this way, the scheduling entity 108 may perform the task of determining the PMI, and thereby alleviate the processing systems of the scheduled entity 106 from performing such computationally burdensome tasks. In an example, the scheduled entity 106 may transmit certain information (e.g., a set of channel coefficients corresponding to the set of antenna ports) in a set of channel state reports that the scheduling entity 108 may then use to determine a set of precoders or modify a set of precoders.

At optional block 1010, the scheduling entity 108 receives the PMI from the scheduled entity 106. The scheduling entity 108 may process the PMI using precoder manager 124 to determine, for example, a set of precoding matrix indicators, the FD basis vector, the SVD of the DL channel, etc.

In optional block 1012, the scheduling entity 108 may utilize the PMI received from the scheduled entity 106 to determine an initial set of DL precoders to utilize when transmitting a subsequent DL transmission. The initial set of precoders may, in such instances, be derived from the UL transmission received from scheduled entity 106. In some examples, the scheduling entity 108 may determine the set of precoders (or modify any precoders that may have been used in the DL transmission of the set of RSs at block 1002) on the basis of a set of precoding matrix indicators determined from the PMI and a set of codebooks. In another example, the scheduling entity 108 may determine the initial set of precoders based on more specific feedback items that, in some instances, may be communicated to the scheduling entity 108, such as feedback regarding the SVD of the DL channel. In such instances, however, this may result in the scheduled entity 106 performing a task that the scheduling entity 108 may have been able to perform instead with better productivity. In an example, the scheduling entity 108 may receive a threshold amount of data to determine the set of DL precoders. In some instances, the threshold may be tunable, such that the amount of data received from and/or generated by the scheduled entity 106 effectively increases or decreases with time.

While a scheduling entity 108 may be able to determine DL precoders based on the PMI received from a scheduled entity 106, the scheduled entity 106, on the front end, may be consuming extraneous amounts of computing resources when determining the PMI. In some examples, however, this consumption and resulting inefficiency may be advantageously reduced. At the same time, a particular channel state reporting scheme may independently and advantageously influence the performance of the DL precoders. In an example, the scheduling entity 108 may access a particular set of input data to generate the DL precoders, with the scheduled entity 106 optimizing its reporting output over time. This may be achieved, for example, by effectively providing the scheduling entity 108 with a lesser amount of UE-processed data. In any example, the scheduling entity 108 may provide channel coefficients rather than matrix values, SVD, or PMI. In another example, the scheduling entity 108 may cause the scheduled entity 106 to provide a variable UL transmission scheme to facilitate an optimal exchange of data that may include escalating and/or deescalating UL transmissions over time during any given channel state reporting period, as disclosed herein.

In an example, a variable UL transmission scheme may allow the scheduled entity 106 to effectively target a transmittal of a threshold amount of data, where the threshold amount may advantageously vary over time. In this way, the scheduled entity 106 may optimize the amount of data and/or the type of data transmitted to the scheduling entity 108 over time, rather than providing UE explicit feedback that is static over time. Accordingly, the scheduling entity 108 may then determine and/or modify the set of DL precoders with an optimal amount of data that may advantageously fluctuate (e.g., ramp up or down over time) until the scheduling entity 108 may determine that enough information regarding the DL channel has been acquired from the scheduled entity 106, such that the signal quality for the precoded DL transmissions has improved to satisfy a signal quality threshold.

In optional block 1014, the scheduling entity 108 may utilize the initial set of precoders corresponding to the set of antenna ports to transmit a set of RSs to the scheduled entity 106. In an example, the scheduling entity 108 may use the precoder manager 124 to transmit the RS(s) over the set of antenna ports. In some examples, the scheduling entity 108 may apply the initial set of precoders to the set of RSs when transmitting the RSs to provide a precoded set of RSs.

At block 1016, the scheduled entity 106 receives the precoded set of RS(s) from the scheduling entity 108. In an example, the scheduled entity 106 may receive the precoded set of RS(s) over a plurality of antenna ports as precoded subsets corresponding to individual antenna ports in a set of antenna ports. In another example, the scheduled entity 106 may receive the precoded set of RS(s) over time, such that a subset of RS(s) corresponding to individual antenna ports are received across multiple time intervals. The scheduled entity 106 may, in some instances, identify a combined RS from a precoded set of RS(s) and/or may identify multiple RSs over time from the precoded set of RS(s). In an example, the scheduled entity 106 may combine the precoded subsets of RSs corresponding to individual antenna ports into a combined RS. In another example, the scheduled entity 106 may combine the precoded subsets of RSs corresponding to individual antenna ports into multiple RSs (e.g., a first precoded RS and a second precoded RS identified at discrete times).

At block 1030, the scheduled entity 106 may transmit a set of UL reference signals (e.g., one or more SRSs) to the scheduling entity 108. In an example, the scheduled entity 106 may utilize a set of antenna ports to transmit the UL RS(s) to the scheduling entity 108. In some examples, the scheduled entity 106 may precode the UL transmission using a set of precoders. In an example, the scheduled entity 106 may measure the DL transmission (e.g., the precoded set of RS(s)). Accordingly, the scheduled entity 106 may determine the set of precoders based at least partially on the measurements of the DL transmission (e.g., CSI-RS measurements) and utilize the set of precoders to transmit the set of RS(s) to scheduling entity 108. In another example, the scheduled entity 106 may transmit the UL RS(s) to the scheduling entity 108 without precoding the UL transmission. The scheduled entity 106 may transmit the UL RS(s) after receiving a DL transmission from the scheduling entity 108 (e.g., as at block 1004 and/or block 1016). In some instances, however, the scheduled entity 106 may transmit the UL RS(s) to a scheduling entity 108 regardless of whether any DL transmission has been transmitted by a scheduling entity 108 to the scheduled entity 106 and/or whether any DL transmission has been received at the scheduled entity 106.

At block 1032, the scheduling entity 108 receives a UL transmission, such as a set of RSs, from the scheduled entity 106. In an example, the scheduling entity 108 uses a set of antenna ports to receive the set of RS(s). For example, in FDD systems, a scheduling entity 108 may deploy a set of antenna ports to acquire SRSs (e.g., via antennas 304) transmitted over a reciprocal UL channel (e.g., via antennas 308) having FDD reciprocity with the DL channel. In some examples, scheduling entity 108 may deploy the precoder manager 124 to receive the UL transmission over the set of antenna ports.

At block 1034, the scheduling entity 108 estimates the UL channel. In an example, the scheduling entity 108 may measure a UL transmission (e.g., a precoded set of SRSs, a non-precoded set of SRSs, etc.) received from the scheduled entity 106 to estimate the channel. In such examples, the scheduling entity 108 may measure the UL transmission to determine a set of channel characteristics for the UL channel (e.g., delay spread, angular spread, shadowing factor, cluster delay, cluster power, and/or departure/arrival angles, etc.). The scheduling entity 108 may estimate the UL channel based on the determined channel characteristics.

At block 1036, the scheduling entity 108 determines SD and FD bases. In an example, the scheduling entity 108 may determine the SD and FD bases based on the set of channel characteristics. In an example, the scheduling entity 108 may generate a UL FD basis vector $$f_m^{UL},$$

e.g., based on the set of channel characteristics. In addition, the scheduling entity 108 may generate a DL FD basis vector $$f_m^{DL},$$

e.g., based on a DL transmission and/or corresponding UE feedback. In such instances, the UL FD basis vector and the DL FD basis vector can be represented according to a DFT or oversampled DFT basis matrix. As noted before, this may not provide the best precoder performance, but may be suitable in some instances.

At block 1040, the scheduling entity 108 determines at least two subsets of antenna ports from among the set of antenna ports (e.g., a first subset of antenna ports and a second subset of antenna ports). In an example, the scheduling entity 108 arranges the set of antenna ports (e.g., Ports 0-9) into subsets of antenna ports to identify a first subset of antenna ports (e.g., Ports 0, 1, 2, 3) and a second subset of antenna ports (e.g., Ports 4, 5, 6, 7, 8, 9). In an example, the scheduling entity 108 may determine a subset for the set of antenna ports utilized when communicating the sets of RSs from block 1002, block 1014, and/or block 1032. In some examples, the scheduling entity 108 may determine to use the port subset indicated by the scheduled entity 106 when identifying the at least two antenna port subsets to utilize for subsequent DL transmissions.

Generally, a scheduling entity 108 may use any suitable approach for determining the at least two subsets of antenna ports from among the set of antenna ports. In an illustrative and non-limiting example, the scheduling entity 108 determines at least two port subsets from among the first set of ports over which the scheduling entity 108 transmits the DL transmission. In some examples, a scheduling entity 108 may estimate the UL channel to determine channel characteristics for a set of antenna ports and divide the set of antenna ports into at least two subsets of antenna ports based on the relative channel characteristics observed at the antenna ports in the set of antenna ports. In a non-limiting example, the scheduling entity 108 identifies a first subset of antenna ports that consists of antenna ports with wideband-only precoding and a second subset of antenna ports that consists of antenna ports with FD precoding.

Although an example is presented in which two subsets of ports (e.g., a set of antenna ports having a first subset of antenna ports and a second subset of antenna ports) are established, e.g., by the scheduling entity at block 1040, it should be understood that the antenna ports may be arranged in a different number of subsets (e.g., three or more antenna port subsets) depending upon the system implementation.

At block 1050, the scheduling entity 108 determines a set of DL precoders for transmitting a set of RSs over the set of antenna ports. In such examples, the set of precoders includes a first subset of precoders for transmitting over the first subset of ports, and a second subset of precoders for transmitting over the second subset of ports. That is, the first subset of precoders corresponds to the first subset of ports, and the second subset of precoders corresponds to the second subset of ports. The first subset of precoders includes precoders that the scheduling entity 108 aims to refine (r ports, where r is an integer corresponding to a number of ports grouped in the first subset of antenna ports). The second set of precoders includes precoders that the scheduling entity 108 generates, e.g., utilizing a random sequence. The scheduling entity 108 may, in some instances, generate the second set of precoders based on a null space of the first set of precoders. In another example, the scheduling entity 108 may generate the second set of precoders based on random Gaussian systems providing a random set of precoder matrix values that a transmitter 302 may apply while generating a DL signal in order to compensate for channel conditions between the transmitter and the receiver.

In an illustrative example, the second subset of antenna ports corresponds to the second subset of precoders (m ports, where m is an integer corresponding to a number of antenna ports in the second subset of antenna ports), which in some examples, may be a subset of random precoders. In an example, the second subset of precoders may be a random Gaussian subset of precoders. In another example, the scheduling entity 108 may generate the second subset of precoders randomly from the null space of the first set of precoders corresponding to the first subset of antenna ports. In an illustrative example, the precoder set corresponding to the first subset of antenna ports (e.g., x ports) may be denoted as W1 (with dimension N-by-x). The null space of W1 is W1_null with a dimension of N-by-(N minus x). In an example involving a total of K antenna ports assigned for transmission of a reference signal, the precoder corresponding to the first subset of antenna ports may then occupy x ports (where x is an integer corresponding to a number of antenna ports in the first subset of antenna ports). As such, K minus x antenna ports remain for the second subset of antenna ports. In such examples, the scheduling entity 108 may generate the random precoder W2 corresponding to the second subset of antenna ports by randomly selecting 'K minus x' out of 'N minus x' columns from W1_null.

Accordingly, the scheduling entity 108 applies at least two different types of precoders to the different subsets of the antenna ports (e.g., a first set of precoders to precode a first subset of antenna ports, and a second set of precoders to precode a second subset of antenna ports). In such examples, the scheduling entity 108 precodes the antenna ports in the different port subsets by applying a first set of precoders of a first type to a first subset of antenna ports and a second set of precoders of a second type to a second subset of antenna ports. As such, the scheduling entity 108 identifies a first subset of precoders (e.g., a first precoding matrix, a first set of precoding vectors, etc.) to precode one or more antenna ports that the scheduling entity 108 has determined for the first subset of antenna ports, and similarly, identifies a second subset of precoders (e.g., a second matrix, a second set of precoding vectors, etc.) to precode one or more antenna ports that the scheduling entity 108 has determined for the second subset of antenna ports.

In optional block 1051, the scheduling entity 108 may transmit port subset identifiers to the scheduled entity 106. The scheduling entity 108 transmits an identification of the port subsets to the UE, for example, as port subset identifiers indicating an antenna port subset. In an example, scheduling entity 108 may transmit a set of port identifiers corresponding to at least the first subset of antenna ports and the second subset of antenna ports. Accordingly, the set of port identifiers identify the at least two subsets of antenna ports. In an example, the port subset identifiers indicate which antenna ports from the set of antenna ports are grouped within the various subsets of antenna ports.

In an illustrative example and non-limiting example, a set of antenna ports may include Ports 0 through 9. The port subset identifiers (e.g., group identification information) may then identify a first subset of ports (e.g., Ports 0, 1, 2, 3) that belong to a first port group and a second subset of ports (e.g., Ports 4, 5, 6, 7, 8, 9) that belong to a second port group. While some antenna port subsets are described in some examples as including port indices that are consecutive or sequential in nature, the techniques of this disclosure are not so limited, and a subset of antenna ports may include any port groups within a set of antenna ports. In any case, antenna ports belonging to a first subset of antenna ports and antenna ports belonging to a second subset of antenna ports may be derived from one full set of antenna ports. Likewise, while some antenna port subsets may be shown as examples including mutually exclusive subsets, the techniques of this disclosure are not so limited, and the subsets may include overlapping antenna ports, in some instances. In addition, not all antenna ports may be included in a given subset, and in some instances, emulated antenna ports may be grouped into any given antenna port subset, as well.

At block 1053, the scheduled entity 106 receives the port identifiers from the scheduling entity 108. In an example, a scheduled entity 106 may receive an identification of the first subset of antenna ports as a first antenna port subset, and the second subset of antenna ports as a second antenna port subset. The scheduled entity 106 may then utilize the port identifiers when generating a set of channel state reports based on subsequent DL transmissions (e.g., RSs) and transmitting the set of channel state reports to scheduling entity 108. As described in one or more of the various examples disclosed herein, the scheduled entity 106 may determine a first set of channel coefficients relative to the first subset of antenna ports, a second set of channel coefficients relative to the second subset of antenna ports, and/or a set of port attributes for at least a portion of the second subset of antenna ports. In an example, the scheduled entity 106 may determine the first set of channel coefficients using a first timing parameter. In addition, the scheduled entity 106 may determine the second set of channel coefficients using another timing parameter. In such instances, the scheduled entity 106 may determine the second set of channel coefficients at a lesser frequency relative to a first timing defined by the first timing parameter. The scheduled entity 106 may further determine a set of port attributes for at least a portion of the second subset of antenna ports. In such instances, the scheduled entity 106 may determine the set of port attributes using a timing that results in the scheduled entity 106 determining the information at a lesser frequency relative to the first timing. In any case, the scheduled entity 106 may determine and/or transmit the set of channel state reports using a plurality of different transmission timings signaled to the scheduled entity 106 by the scheduling entity 108.

At block 1060, the scheduling entity 108 transmits a set of RSs (e.g., CSI-RSs) to the scheduled entity 106. In such instances, the set of RSs may include a first subset of RSs corresponding to the first subset of antenna ports that the scheduling entity 108 transmits using the first set of precoders. In addition, the set of RSs may include a second subset of RSs corresponding to the second subset of antenna ports that the scheduling entity 108 transmits using the second set of precoders. The BS uses at least two different types of precoders (e.g., refined and random) to precode the first subset of antenna ports (e.g., a first port grouping) and the second subset of antenna ports (e.g., a second port grouping), respectively. In an illustrative example, the scheduling entity 108 may transmit precoded CSI-RS(s) as the set of RSs precoded based on SD and FD bases, with each antenna port in the first subset of antenna ports being precoded by the scheduling entity 108 using the determined SD-FD pairs. In an example, the scheduling entity 108 may transmit the set of RSs by precoding each antenna port in the first subset of antenna ports using the determined SD-FD pairs.

In an illustrative example, a scheduling entity 108 may precode r ports in the first subset of antenna ports using a first set of precoders (e.g., a precoder the scheduling entity 108 refines or aims to refine), and m ports in the second subset using a second precoder(s) (e.g., a random precoder) (r and m are integers). The refined precoders corresponding to the first subset of antenna ports may be generated by the scheduling entity 108 based on the SD and FD bases for the DL channel, for example, determined from a set of channel state reports received from a scheduled entity 106. The scheduling entity 108 may perform the precoding of the antenna ports when transmitting signals and data to the scheduled entity 106 (e.g., CSI-RS, PDSCH). In another example, the scheduling entity 108 applies the refined set of precoders to a PDSCH, as well as to the CSI-RS. In some examples, the scheduling entity 108 applies the refined set of precoders to transmit precoded layers via the DL channel. In another example, the scheduling entity 108 may transmit precoded CSI-RS(s) using SD and FD bases, where each antenna port is precoded by a pair of SD and FD bases. In some examples, the scheduling entity 108 may transmit a set of CSI-RSs (e.g., one or more RSs) based on an assigned rank with separate precoding for each layer to provide for multi-layer channel estimation.

At block 1062, the scheduled entity 106 receives the RSs from the scheduling entity 108. In an example, the scheduled entity 106 receives at least one first precoded subset of RSs and at least one second precoded subset of RSs. The scheduled entity 106 may generate a set of channel state reports based on an estimate of the DL transmission and transmit the set of channel state reports to scheduling entity 108. In such examples, scheduling entity 108 may then modify based at least partially on the contents of the channel state report(s) at least the first set of precoders utilized to precode the first subset of RSs in the DL transmission. In some examples, this process may be repeated any number of times to dynamically maintain a suitable level of DL performance.

Figure 11:
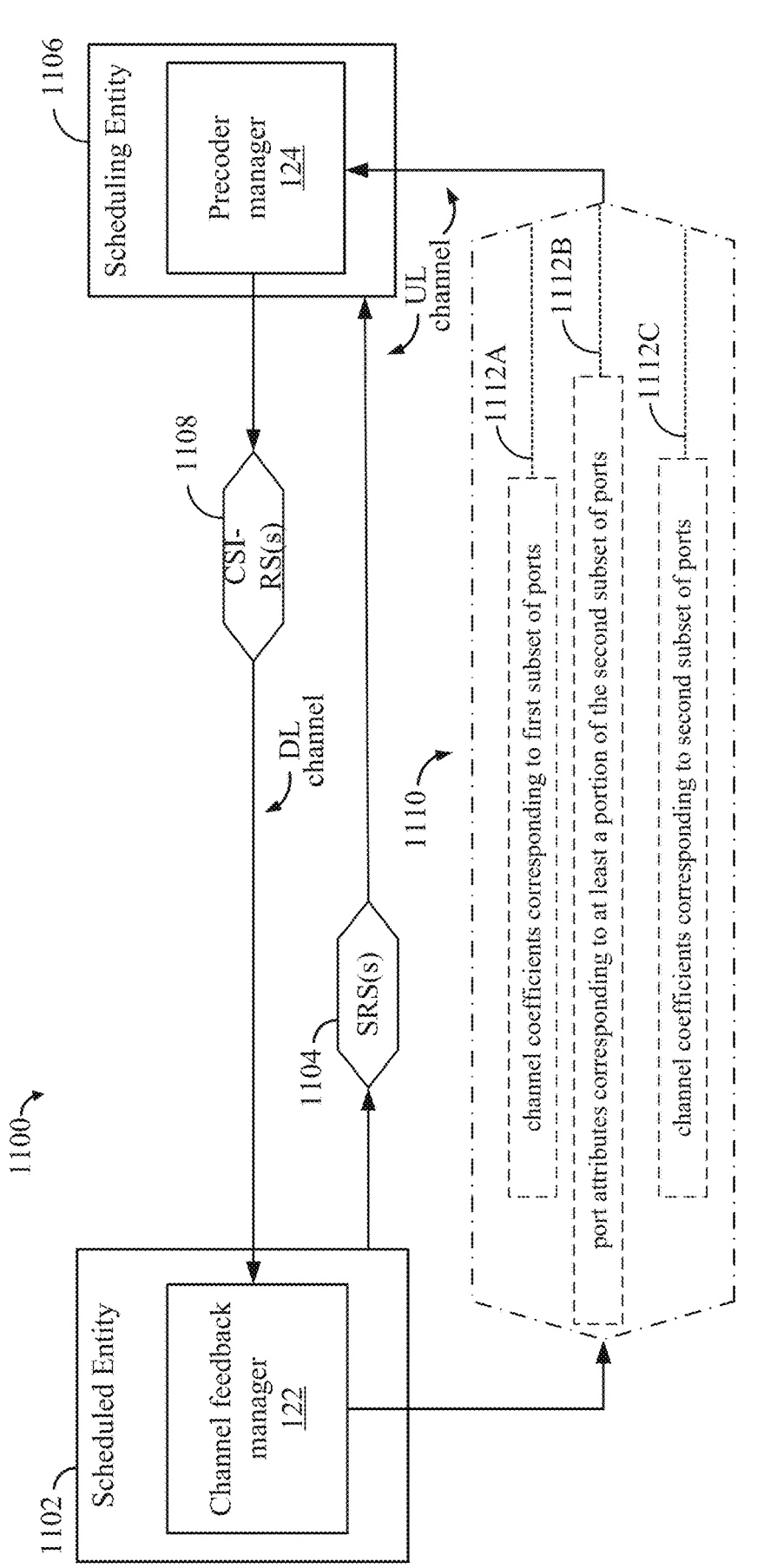
FIG. 11 is a block diagram illustrating a set of channel state reports including channel coefficients and port attributes according to some embodiments.

FIG. 11 is a block diagram illustrating a set of channel state reports 1110 including channel coefficients and port attributes according to some aspects of the present disclosure. FIG. 11 illustrates a scheduled entity 1102 transmitting a set of SRSs 1104 to a scheduling entity 1106 via a UL channel, and a scheduling entity 1106 transmitting a set of CSI-RSs 1108 to the scheduled entity 1102 via a DL channel. FIG. 11 also illustrates the scheduled entity 1102 transmitting one or more channel state report(s) 1110 in UL wireless transmission via the UL channel. The scheduled entity 1102 may be an example of a scheduled entity 106, and the scheduling entity 1106 may be an example of a scheduling entity 108, both described herein, for example, with reference to FIGS. 1-3, 10, 20, 21, 24, and 25. In addition, the DL and UL channels shown may represent an FDD reciprocal channel.

In some examples, the scheduled entity 1102 may transmit an SRS 1104 over a set of antenna ports. That is, in a particular UL transmission, the scheduled entity 1102 may transmit an SRS 1104 as multiple subsets of RSs. To illustrate, the scheduled entity 1102 may transmit the SRS 1104 as a first subset of RSs over a first subset of antenna ports, and as a second subset of RSs over a second subset of antenna ports. In some instances, the scheduled entity 1102 may precode the UL transmission using a first set of UL precoders to transmit the first subset of RSs. The scheduled entity 1102 may, in some instances, further precode the second subset of RSs using a second set of UL precoders to transmit the second subset of RSs. The first subset of antenna ports and the second subset of antenna ports may be determined and/or communicated between entities using any suitable techniques, such as any of the example techniques described with reference to FIG. 10. In an example, the scheduled entity 1102 may receive port identifiers from scheduling entity 1106, the port identifiers indicating which antenna ports in a set of antenna ports belong to a first subset of antenna ports, and as such, may be for precoding with a precoder of a particular type, and similarly, which antenna ports in the set of antenna ports belong to a second subset of antenna ports.

In such examples, the scheduling entity 1106 may receive the multiple subsets of RSs, and then, may identify (e.g., reconstruct, extract, etc.) a single SRS 1104 from the subsets of RSs and/or may measure the individual RSs of the subset that correspond to one or more antenna ports in the first subset of antenna ports or the second subset of antenna ports to, for example, estimate the UL channel.

In another example, the scheduling entity 1106 transmits, via antennas 304 of FIG. 3, a set of CSI-RSs 1108 to the scheduled entity 1108. In an illustrative example, the scheduling entity 1106 uses the precoder manager 124 to precode and transmit a CSI-RS 1108 over a set of antenna ports. In an example, the scheduling entity 1106 estimates the UL channel based on an SRS 1104, determines SD-FD pairs based on the UL channel estimation, and uses the SD-FD pairs to precode the DL transmission (e.g., the CSI-RS 1108). In some examples, the scheduling entity 1106 may utilize a first set of precoders to transmit a first precoded subset of RSs over a first subset of the antenna ports, and may utilize a second set of precoders (e.g., a randomly sequenced set of precoders) to transmit a second precoded subset of RSs over a second subset of the antenna ports. In some examples, the scheduling entity 1106 may determine the first set of precoders based on the UL channel estimate, PMI data, and/or precoder matrices as specified within a predetermined codebook. Regardless of whether this data was first determined by the scheduling entity 1106 or the scheduled entity 1108, the scheduling entity 1106 may refine the first set of precoders based on explicit channel coefficients (e.g., amplitude measurements, phase measurements, etc.) and/or port attributes (e.g., port selections, SNR data, signal strength, etc.) received from the scheduled entity 1108, from which the scheduling entity 1106 may then use to determine a UL channel estimate and/or PMI data. In another example, the scheduling entity 1106 may utilize a second set of precoders that are randomly sequenced to provide a random Gaussian set of precoders. In some instances, the scheduling entity 1106 may determine the second set of precoders by randomly generating a sequence of precoder matrix values based on the null space of the first set of precoders (e.g., a refined set of precoders), which, in such instances, the scheduling entity 1106 may update the second set of precoders if the scheduling entity 1106 observes the value of the null space to change.

In some examples, the scheduling entity 1106 may signal a UE feedback design (not explicitly shown in FIG. 11) to the scheduled entity 1108 via the DL channel. In some instances, the scheduling entity 1106 may communicate the UE feedback design as part of a network configuration of and transmitted to the scheduled entity 1108 via the DL channel. The UE feedback design may indicate a set of report parts 1112A-1112C that are to be included in a set of channel state reports 1110. The scheduled entity 1108 may transmit the set of channel state reports 1110 over time, where various channel state reports in the set of channel state reports 1110 may include various combinations of the report parts 1112A-1112C. In an illustrative and non-limiting example, a first channel state report may include report parts 1112A and 1112B, a subsequent channel state report may include report part 1112A, a third channel state report may include parts 1112A and 1112B, a fourth channel state report may include parts 1112A-1112C, a fifth channel state report may include parts 1112A and 1112B, and a sixth channel state report may include part 1112A.

In addition, the scheduling entity 1106 may provide the scheduled entity 1102 with a set of timing parameters that effectively prioritize various parts that are to be included in the UE explicit feedback. The scheduling entity 1106 may also provide a set of quantization parameters, a set of omission criteria, and/or a set of conditions that, when met, cause the scheduled entity 1102 to reduce the size of the set of channel state reports during a reporting period. The scheduling entity 1106 may provide the scheduled entity 1102 with these parameters as part of a network configuration.

In some examples, the scheduled entity 1102 may deploy the channel feedback manager 122 to generate the UE explicit feedback in a plurality of report parts. The parts may correspond to particular antenna port subsets of the at least two subsets of antenna ports and accordingly, to particular precoder types corresponding to the. The plurality of report parts may correspond to a set of timing parameters signaling the set of different timings for transmitting the plurality of report parts. Accordingly, the scheduled entity 1102 may include, in a set of channel state reports 1110, one or more of the plurality of parts using the set of timing parameters and in various combinations. The three report parts may be referred to in some instances herein as a first channel state report, a second channel state report, and a third channel state report. These parts may be transmitted as individual channel state reports. In instances where the transmission timing aligns for multiple parts, the report parts may be transmitted as a single channel state report that encompasses some combination of the first channel state report, the second channel state report, and/or the third channel state report.

In an illustrative example, a first report part may include the explicit channel coefficients for a first subset of antenna ports (e.g., part 1112A). A second report part may include a set of port attributes for at least a portion of a second subset of antenna ports (e.g., part 1112B). Additionally, a third report part may include explicit channel coefficients for the second subset of antenna ports (e.g., part 1112C). As described throughout this disclosure, the first set of channel coefficients and the second set of channel coefficients correspond to different network-configured (e.g., BS-configured) antenna port subsets (e.g., a first subset and a second subset of antenna ports). In addition, the set of port attributes correspond to the second subset of antenna ports.

In some examples, the UE feedback consists of the three report parts with different priorities associated with each report part. In an illustrative example, part 1112A corresponds to the explicit channel coefficients for the first subset of antenna ports. In some examples, part 1112A may be prioritized higher than the other report parts (e.g., sent more frequently and with less or no omission criteria) because the first set of precoders for the first subset of antenna ports are presumably a more suitable match with the FDD reciprocal channel. As such, scheduled entity 1102 is likely to obtain a higher quality estimate of the DL transmission relative to estimates of the DL channel corresponding to the second subset of antenna ports.

In another example, part 1112B may correspond to a port selection for the second subset of antenna ports. In some examples, the scheduling entity 1106 may configure part 1112B as having a lesser priority (e.g., medium priority) relative to part 1112A.

As described, the precoders in the second subset of antenna ports may be random. In such examples, it is likely that the scheduled entity 1102 would receive weaker signals from the second subset of antenna ports. When a scheduled entity 1102 receives a set of reference signals (e.g., CSI-RS(s)) over a precoded channel (e.g., over a set of antenna ports), the scheduled entity 1102 may compare the plurality of antenna ports of a set of antenna ports, or of a subset of antenna ports, to determine port attributes for at least a portion of the antenna ports representative of various differences amongst antenna ports in the set or subset.

A scheduled entity 1102 may identify differences among antenna ports in terms of relative parameters or measurements of a DL channel (e.g., received signal power, etc.). Based on these DL channel measurements, the scheduled entity 1102 may rank and rate the antenna ports of the set of antenna ports, and/or may determine a portion of the second subset of the antenna ports providing a quality signal. In such examples, the scheduled entity 1102 may provide feedback to the scheduling entity 1106 corresponding to a set of port attributes associated with the second subset of antenna ports (e.g., port indices for antenna ports deemed selectable based on the DL channel). In such instances, the scheduling entity 1106 may have precoded the second subset of antenna ports using a different type of DL precoder relative to the precoder used to transmit signals over the first subset of antenna ports.

In another example, part 1112C, corresponding to the explicit channel coefficients for the second subset of antenna ports, may be prioritized lower than part 1112A, and in some instances, lower than part 1112B, as well. The channel coefficients for the second subset assist a scheduling entity 1106 in the refinement of the subset of precoders for the first subset of antenna ports through refinement algorithms. In some instances, part 1112C may correspond to a subset of channel coefficients associated with the selected ports in the second subset of antenna ports (e.g., the portion of the second subset of antenna ports the scheduled entity 1102 selects).

While generally described as generating a set of channel state reports 1110 based on a set of CSI reference signals, the techniques of this disclosure are not so limited. In an example, the scheduled entity 1102 may use one or more of the various techniques of this disclosure to determine the set of channel state reports 1110 based on other DL transmissions received from a scheduling entity 1106, such as pilots, DM-RSs, etc.

Example Determination of Port Attributes

Figure 12:
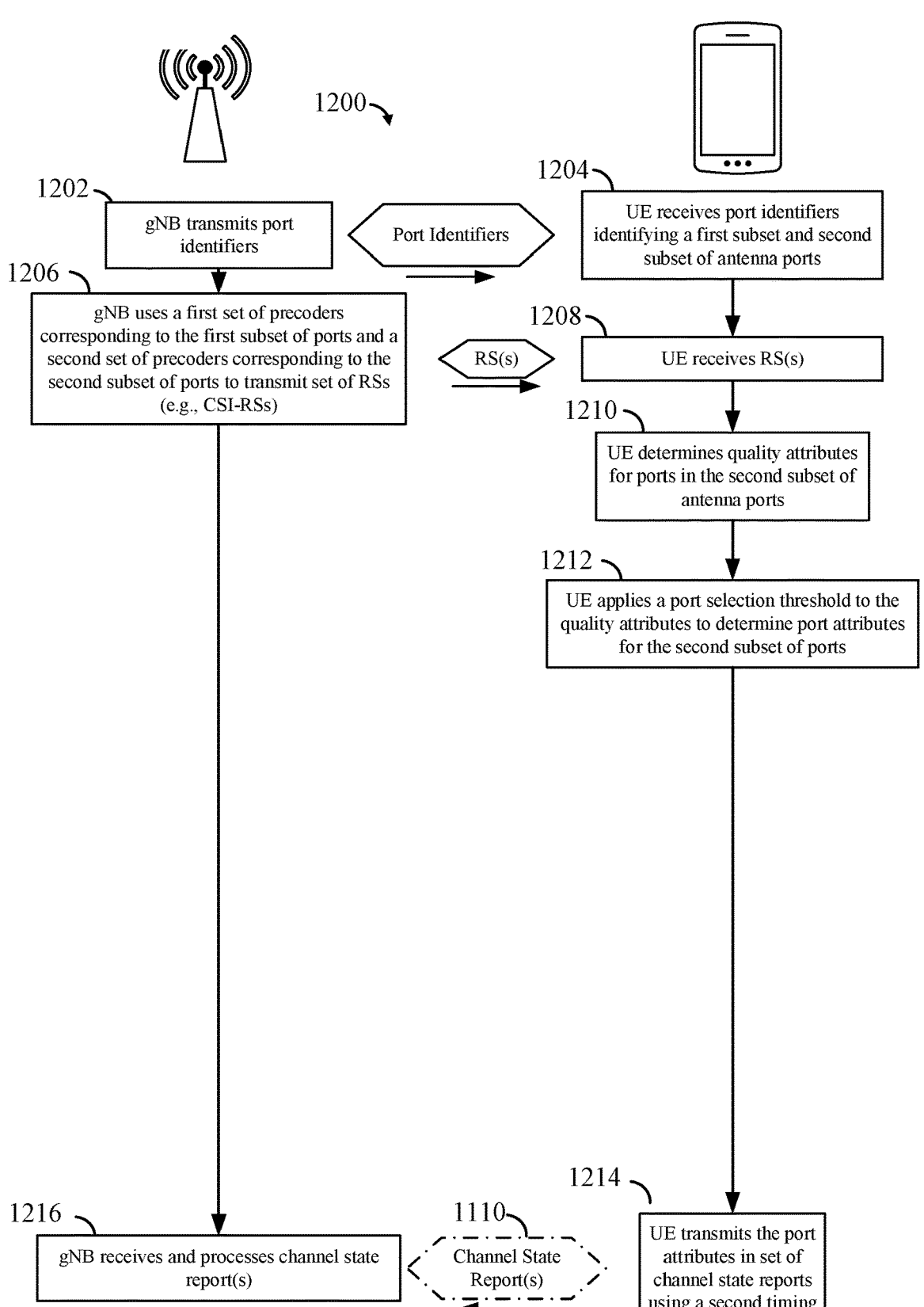
FIG. 12 is a flow chart illustrating an exemplary process for a scheduled entity to determine port attributes according to some embodiments.

FIG. 12 is a flow chart illustrating an exemplary process for a scheduled entity 106 to determine port attributes in accordance with some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 25 may be configured to carry out the process 1200. In some examples, any suitable apparatus or means for carrying out the functions or algorithm described below may carry out the process 1200.

At block 1202, the scheduling entity 1106 transmits port identifiers to the scheduled entity 1102. In an example, the scheduling entity 1106 may provide port indices identifying which antenna ports belong to which port subsets.

At block 1204, the scheduled entity 1102 may then receive the port identifiers from scheduling entity 1106 identifying a first subset of antenna ports and a second subset of antenna ports relative to a set of antenna ports. In an example, the scheduled entity 1102 may receive an indication that a first subset of antenna ports belongs to a first grouping of ports and a second subset of antenna ports belongs to a second grouping of ports.

At block 1206, the scheduling entity 1106 may transmit a set of reference signals to the scheduled entity 1102. The scheduling entity 1106 may transmit the reference signal(s) over a set of antenna ports. In an example, the scheduling entity 1106 may transmit the first subset of reference signal (s) over the first subset of antenna ports and may transmit the second subset of reference signal(s) over the second subset of antenna ports. In an illustrative example, the scheduling entity 1106 may transmit a set of precoded signals over a set of 'K' antenna ports (e.g., Ports 0 through 9, with 'K' being equal to ten as the number of antenna ports in the set of antenna ports). As described with reference to FIG. 10, the scheduling entity 108 may group the set of antenna ports into a first subset of antenna ports and the second subset of antenna ports. In an illustrative example, the first subset of antenna ports may include Ports 0 through 3 (e.g., 'r' ports, with 'r' being equal to the number of antenna ports (e.g., 4) in the first subset) and the second subset of antenna ports may include Ports 4 through 9 (e.g., 'm' ports, with 'm' being equal to the number of antenna ports (e.g., 6) in the second subset).

At block 1208, the scheduled entity 1102 may receive the reference signal(s) from the scheduling entity 1106. In an example, the scheduled entity 1102 may receive the reference signal(s) as a set of precoded signals. The scheduled entity 1102 may receive the signals at antennas 308.

At block 1210, the scheduled entity 1102 may determine quality attributes for antenna ports in the second subset of antenna ports corresponding to the second subset of reference signals. The scheduled entity 1102 may do so to determine which ports in the second subset of antenna ports provide higher quality relative to other antenna ports in the second subset of antenna ports. Accordingly, the scheduled entity 1102 may determine the set of port attributes by measuring the subset of RSs received at the second subset of antenna ports. In another example, the scheduled entity 1102 may determine whether the power of a received signal from the second subset of antenna ports is larger than, for example, the lowest power of the signals received from the first subset of antenna ports.

At block 1212, the scheduled entity 1102 may apply a port selection threshold to the set of quality attributes to determine port attributes for the second subset of antenna ports. In an example, scheduled entity 1102 may pick out SD-FD pairs out of the precoded SD-FD pairs to determine a portion of the second subset of antenna ports that satisfy a port selection threshold. In another example, antenna ports that exhibit greater levels of polarization may be characterized in that they are associated with higher power transmissions than antenna ports exhibiting reduced levels of polarization. In another example, the quality attributes may correspond to CQI, RI, SINR, SNR, power (RSRP), etc.

The port selection threshold may be a relative threshold with respect to the other antenna ports in the second subset of antenna ports. In some examples, a particular port selection threshold may correspond to a particular quality attribute used to perform the port selection. For example, when the scheduled entity 1102 uses a signal power measurements to determine which ports to select from the second subset of antenna ports, then the port selection threshold may be a signal power threshold. In such instances, and depending on the DL precoder, a portion of the second subset of antenna ports may provide a higher power measurement that the scheduled entity 1102 may determine exceeds the signal power threshold while other antenna ports in the second subset of antenna ports may not satisfy the predefined power threshold. While particular examples are discussed herein, the techniques of this disclosure are not so limited, and the port selection threshold may correspond to any one, or any combination of, port selection criteria (e.g., quality attributes) used to select particular antenna ports when the scheduled entity 1102 determines port attributes relative to the second subset of antenna ports.

In an illustrative example, the port selection threshold may be set to isolate a particular number of antenna ports that are providing a better signal quality in the second subset of antenna ports and/or are providing a better signal quality relative to a static threshold. In another example, a threshold may be used to determine whether any antenna ports satisfy the threshold in the second subset of antenna ports. In an illustrative example, the second subset of antenna ports may include at least one antenna port that is providing a better quality signal relative to other antenna ports in the second subset of antenna ports. In such examples, the scheduled entity 1102 may then determine a set of quality attributes for the set of antenna ports including for the at least one antenna port. The scheduled entity 1102 may determine that the set of quality attributes (e.g., CQI, RI, SINR, SNR, RSRP, etc.) for the at least one antenna port satisfies a predefined port selection threshold. Accordingly, the scheduled entity 1102 determines the set of port attributes to include antenna port data (e.g., SNR data, CQI data, port indices, SD-FD pairs for a portion of the antenna ports in the second subset, etc.) for the selected antenna ports from the second subset of antenna ports. Accordingly, the antenna port data may correspond to the antenna ports from the second subset having a set of quality attributes that satisfy the predefined port selection threshold, such as a port index for at least one antenna port providing a quality signal. In another example, the port selection threshold may be a relative threshold with respect to the first subset of antenna ports. In another illustrative and non-limiting example, the scheduled entity 1102 may determine the power of a received signal from the second subset of antenna ports (e.g., port(s) X) is larger than the lowest power of the signals received from the first subset of antenna ports. As such, the scheduled entity 1102 may determine the port attributes for the second subset of antenna ports by indicating selection of port(s) X from the second subset of antenna ports. In an example, the scheduled entity 1102 may indicate "00010000" in part 1112B, as an example including eight antenna ports in the second subset of antenna ports, and where at least the fourth antenna port is providing a higher quality attribute relative to antenna ports in the first subset of antenna ports.

In some examples, the set of port attributes may represent port selection information (e.g., which ports from the second subset of antenna ports are, or have been, selected as indicated by a set of ports indices). The set of port attributes may further indicate the quality attributes used to select a portion of antenna ports from the second subset of antenna ports (e.g., SNR data, signal strength, etc.). These port attributes may also be referred to as UE selection attributes. In an example, an attribute for port X from the second subset may be that Port X has been selected from the second subset of antenna ports, or that it is otherwise a selectable port, or that it has quality attributes (e.g., precoder performance) making Port X suitable for UE selection and reuse for the precoding of subsequent DL transmissions.

At block 1208, the scheduled entity 1102 transmits the set of port attributes in a set of channel state reports 1110. In such examples, the scheduled entity 1102 may transmit the port attributes using a second timing (e.g., T2). In an example, the scheduled entity 1102 may derive one or more time intervals from a timing parameter (e.g., in a set of timing parameters) to transmit the port attributes using at least the second timing. In such examples, the scheduled entity 1102 may transmit the port attributes using the second timing by determining at what time intervals the scheduled entity 1102 is set to transmit the set of port attributes to the scheduling entity 1102 (e.g., transmit at the one or more derived time intervals, etc.).

Example Channel State Reporting

Figure 13:
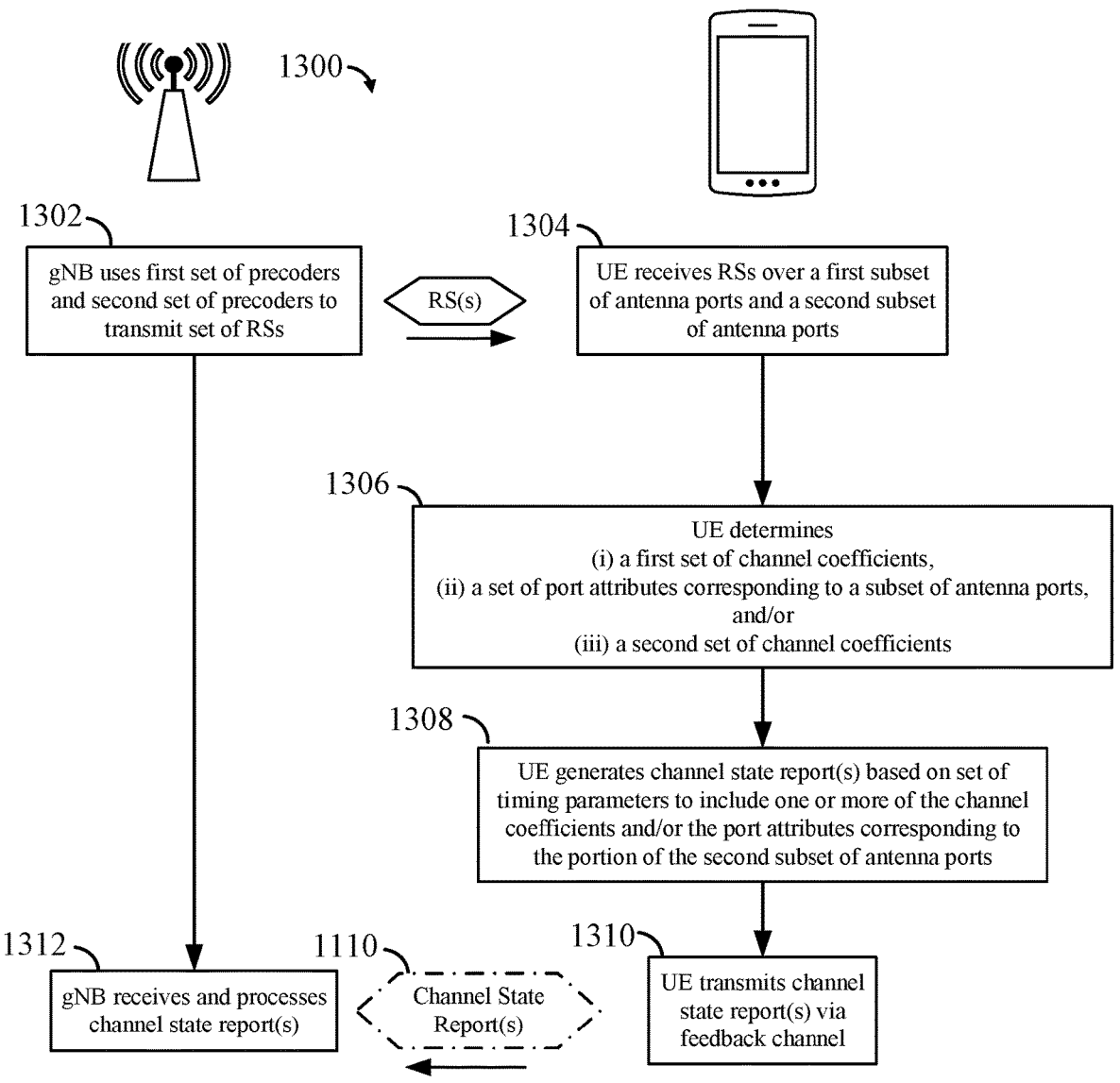
FIG. 13 is a flow chart illustrating an exemplary process for a scheduled entity to process channel measurement data for the generation of channel state reports according to some embodiments.

FIG. 13 is a flow chart illustrating an exemplary process for processing channel measurement data for generation of a set of channel state reports 1110 in accordance with some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 25 may be configured to carry out the process 1300. In some examples, any suitable apparatus or means for carrying out the functions or algorithm described below may carry out the process 1300.

At block 1302, the scheduling entity 1106 uses the first set of precoders of the first type and the second set of precoders of the second type to transmit a set of RSs to the scheduled entity 1102. In an example, scheduling entity 1106 uses the first set of precoders to transmit a first subset of RSs over a first subset of antenna ports and uses the second set of precoders to transmit a second subset of RSs over a second subset of antenna ports. The first subset of antenna ports and the second subset of antenna ports may together represent a set of antenna ports used to transmit the DL transmission (e.g., as a first precoded set of RSs using a first precoder type and a second precoded set of RSs using a second precoder type).

At block 1304, the scheduled entity 1102 may receive a first precoded set of RSs corresponding to a first set of the antenna ports. In an example, the scheduled entity 1102 may receive a first subset of RSs corresponding to the first subset of the antenna ports and a second subset of RSs corresponding to the second subset of the antenna ports. Together, the first subset of RSs and the second subset of RSs may provide the first precoded set of RSs.

At block 1306, the scheduled entity 1102 may determine, based at least in part on the first subset of RSs, a first set of channel coefficients corresponding to the first subset of antenna ports (part 1112A). In an example, the scheduled entity 1102 may receive and perform suitable measurements on the DL transmission to determine a first set of channel coefficients relative to the first subset of antenna ports. The scheduled entity 106 may determine a first set of channel coefficients based at least in part on the values of a transfer function H on the receiver side (e.g., corresponding at least in part to the transfer function H on the transmitter side) for a first subset of antenna ports in a set of antenna ports (e.g., based on the various components of a precoding matrix discussed with reference to FIG. 5). Likewise, the scheduled entity 106 may, in some instances, determine a second set of channel coefficients from the values of the transfer function H related to a second subset of antenna ports in the set of antenna ports, where the coefficient basis information corresponds to each individual port (e.g., layer). As discussed, in some examples, the scheduled entity 106 may determine and transmit the set of channel coefficients to the scheduling entity 108 in a set of channel state reports 1110 (e.g., in part 1112A and/or part 1112C).

In some examples, the first set of channel coefficients may generally correspond to a set of amplitude and phase values the scheduled entity 1102 obtains upon measuring the received DL signal relative to the individual antenna ports in the first subset of antenna ports. The first set of channel coefficients may further correspond to a set of phase measurements the scheduled entity 1102 obtains upon measuring the received DL signal relative to the individual antenna ports in the first subset of antenna ports. In addition, the scheduled entity 1102 may determine, based at least in part on the second subset of RSs, a set of port attributes for the second subset of antenna ports (part 1112B). These may include port indices for a port selection or any other set of port attributes for the second subset of antenna ports that the scheduled entity 1102 may identify according to the example process described with reference to FIG. 12 (e.g., block 1212). In addition, the scheduled entity 1102 may determine, based at least in part on the second subset of RSs, a second set of channel coefficients corresponding to the second subset of antenna ports (part 1112C).

In some examples, the second set of channel coefficients may generally correspond to a set of amplitude and phase values the scheduled entity 1102 obtains upon measuring the received DL signal relative to the individual antenna ports in the second subset of antenna ports. The second set of channel coefficients may further correspond to a set of phase measurements the scheduled entity 1102 obtains upon measuring the received DL signal relative to the individual antenna ports in the second subset of antenna ports. As will be understood, the first and second sets of channel coefficients may represent coefficients of a transfer function that correspond to amplitude and phase measurements that correspond to individual FD units for each individual antenna ports in a set of antenna ports.

In other words, the scheduled entity 1102 may determine a first set of channel coefficients from the first set of values of a transfer function (e.g., $\hat{H}$) related to at least the coefficient basis components of a precoding matrix configured for precoding a first subset of antenna ports in a set of antenna ports. Likewise, the scheduled entity 1102 may determine a second set of channel coefficients from the second set of values of the transfer function (e.g., $\hat{H}$) related to the coefficient basis components of a precoding matrix configured for precoding a second subset of antenna ports in the set of antenna ports. As discussed, in some examples, the scheduled entity 1102 may determine and transmit the set of channel coefficients to the scheduling entity 1106 in a set of channel state reports.

In any case, the scheduled entity 1102 may determine one or more of the various parts 1112A-1112C based on a first reference signal. In another example, the scheduled entity 1102 may determine one or more of the various parts 1112A-1112C over time based on different reference signals received over time (e.g., a first precoded CSI-RSs transmitted at a first time interval and a second precoded CSI-RSs transmitted at a second time interval).

In an example, the scheduled entity 1102 may determine that all three parts are to be included in a channel state report 1110 based on the timing parameters for each (e.g., parts 1112A, 1112B, and 1112C are to be included in a particular channel state report 1110), and as such, may determine to include all three parts 1112A, 1112B, and 1112C in a channel state report 1110 subject to any omission or size reduction criteria. In another example, the scheduled entity 1102 may determine the contents of each channel state report 1110 anew over time, such as at a time immediately prior to transmitting a given channel state report 1110. That is, the scheduled entity 1102 may determine part 1112C at a different time relative to determining the contents of a channel state report 1110 that is set to include part 1112B but not part 1112C. In any case, the scheduled entity 1102 determines parts 1112A-1112C based on a set of signals and transmits parts 1112A-1112C over time while advantageously using different timings for the transmission of different parts.

At block 1308, the scheduled entity 1102 may generate a channel state report 1110 based on the set of timing parameters to include one or more of the channel coefficients and/or the port attributes corresponding to a portion of the second subset of antenna ports (e.g., a set of UE port selections). Typically, the channel coefficients (e.g., for amplitude (and phase) measurements) generated by the scheduled entity 1102 at block 1306 are high resolution. As such, if the scheduled entity 1102 were to transmit the raw measured data to the scheduling entity 1106 in the form of a channel state report, the report would contain a relatively large amount of data potentially causing substantial overhead in data transmissions between these devices. To reduce the overhead, the scheduled entity 1102 may be configured to quantize the values (e.g., amplitude and/or phase) contained within the channel state report to reduce the size of the channel state report or otherwise facilitate processing of the received channel state report by the BS. In an example, the scheduled entity 1102 may, for part 1112A further quantize, based at least in part on a reference amplitude corresponding to the first set of channel coefficients, the first set of channel coefficients to produce a first quantized set of channel coefficients. In addition, for part 1112C, the scheduled entity 1102 may quantize, based at least in part on a reference amplitude, the second set of channel coefficients to produce a second quantized set of channel coefficients.

Figure 14:
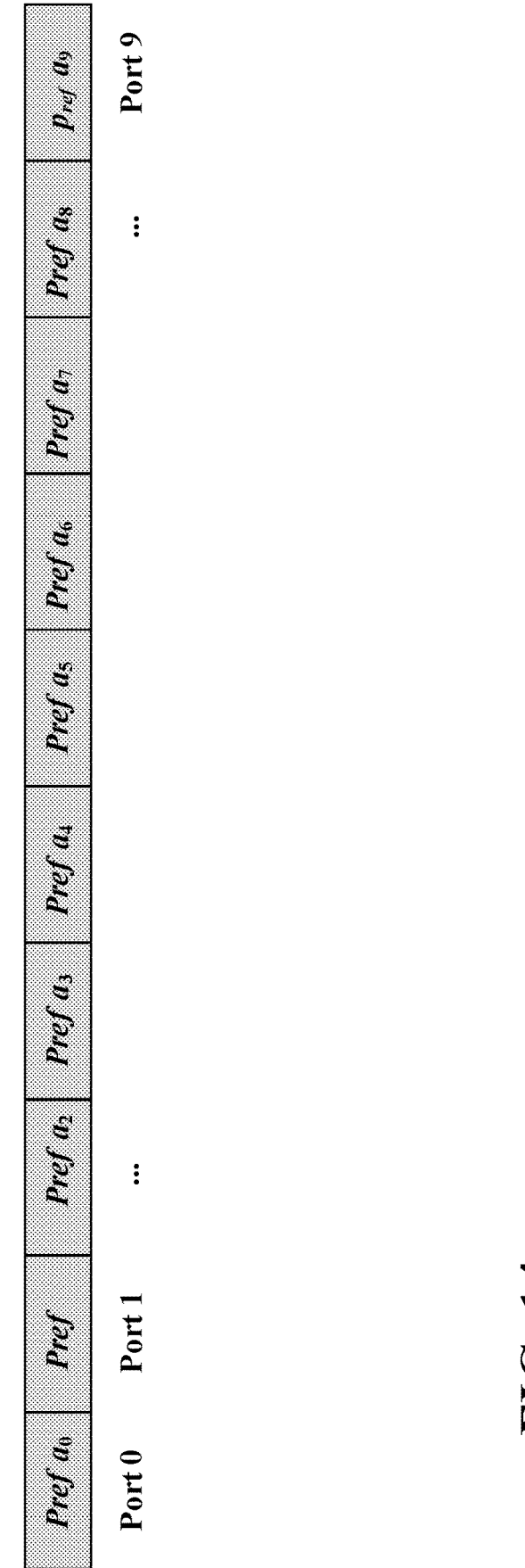
FIG. 14 shows a data array depicting channel coefficients according to the method depicted in FIG. 13.

To illustrate an example of a portion of a channel state report 1110, FIG. 14 shows one example of a data array depicting channel coefficients (e.g., channel state measurements for amplitude as an example) quantized and normalized by a scheduled entity 1102. As illustrated, the channel state data is arranged in two subsets (e.g., as may be designated by the scheduling entity 1106 at block 1040, FIG. 10). As described herein, the channel state report(s) 1110 may include only quantization data for the first subset of antenna ports, may include quantization data for the first subset of antenna ports and the second subset of antenna ports, or may include of quantization data for the first subset of antenna ports and may omit all or a portion of the quantization data for the second subset of antenna ports. In addition to quantizing the first set of channel coefficients and/or at least a portion of the second set of channel coefficients in the set of channel state reports, the scheduled entity 106 may also normalize coefficient values in the channel state report around a particular value (e.g., a strongest coefficient value that the scheduled entity 106 measured during channel measurement) or apply reference value multipliers to subsets of coefficients in the set of channel state reports.

In the example of FIG. 14, the amplitude associated with the antenna port and FD basis combination having the strongest amplitude may be normalized to a coefficient value of "1" (e.g., 0 dB). In this example, the second port in the first subset of antenna ports may have the strongest amplitude and thus, its amplitude may be represented as $p_{ref}$. As discussed herein, a value $p_{ref}$ may be determined for one or both subsets of antenna ports. In some examples, the reference amplitude $p_{ref}$ may be the same for each subset. In another example, the reference amplitude $p_{ref}$ may be different for each subset (e.g., $p_{ref\_1}$ for Ports 0 through 3 and $p_{ref\_2}$ for Ports 4 through 9). In some examples, the channel coefficient '$a_i$' may be normalized between 0 and 1, such that the coefficient can be represented as $p=p_{ref}$ multiplied by $a_i$ for remaining coefficients in at least the first set of channel coefficients not selected for the reference amplitude (Port 1 in this example, second from the left in FIG. 14). In an example, the first port (Port 0) shown in FIG. 14 may have a coefficient (to include in the first set of channel coefficients) that may be represented as $p_{ref}$ multiplied by $a_0$, where $a_0$ is the coefficient for Port 0 normalized between 0 and 1, and so forth for the other antenna ports.

At block 1310, the scheduled entity 1102 may transmit the channel state report(s) 1110 to the scheduling entity 1106. In an example, scheduled entity 1102 may transmit the first set of channel coefficients using a first timing, transmit the set of port attributes using a second timing, and transmit the second set of channel coefficients using a third timing. Part 1112A may be included in a channel state report along with part 1112B, and all three parts may be included in a channel state report, depending on the set of timing parameters governing how these parts are to be transmitted to the scheduling entity 1106 over time.

Figure 22:
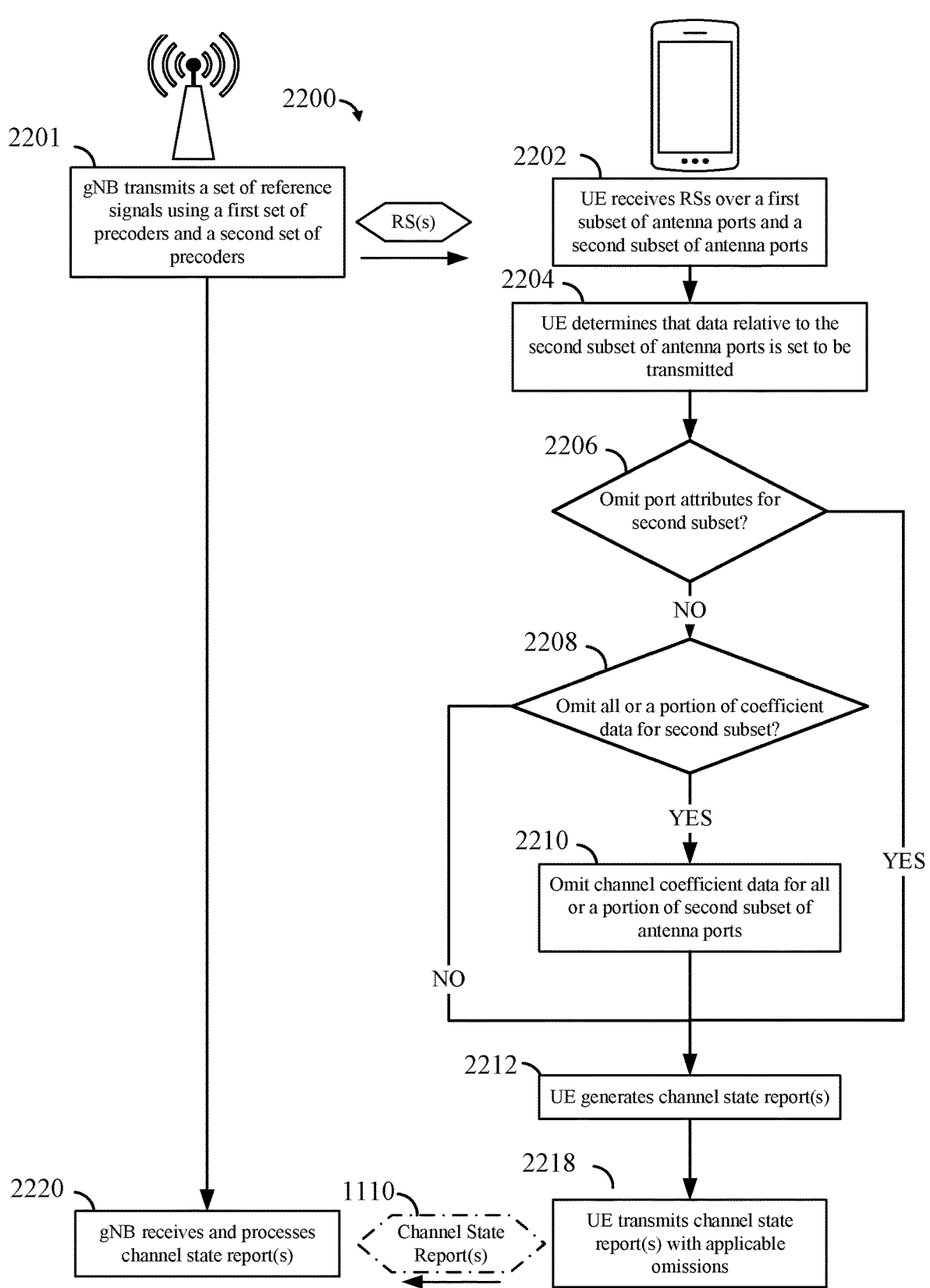
FIG. 22 is a flow chart illustrating an exemplary process for a scheduled entity to omit data from a channel state report when certain conditions are met according to some embodiments.

As described with reference to FIGS. 22 and/or 23, certain omission and/or size reduction criteria may apply prior to the transmitting and/or prior to the generation of a particular channel state report 1110, such that when the scheduled entity 1102 transmits part 1112C using the third timing or part 1112B using the second timing, some channel state reports 1110 that would ordinarily include these parts, may have an omission of some of this data or a size reduction of a particular channel state report, when the omission and/or size reduction criteria are met. In any case, transmitting part 1112B or part 1112C using the second timing parameter and the third timing parameter may result in some channel state reports that would have included these parts to not include these parts in some channel state reports 1110 that would otherwise have included such parts or may include a reduction in the size of a given channel state report 1110, for example, based on a reduction in the amount of quantized data transmitted for part 1112C.

At block 1312, the scheduling entity 1106 may receive the channel state report(s) 1110. The scheduling entity 1106 may receive a set of channel state reports 1110 over time as illustrated in the exemplary transmission timeline described below. In an illustrative example, transmitting these parts using timing parameters may result in the scheduling entity 1106 receiving a set of channel state reports as follows: parts 1112A and 1112B received at 1X (subject to any omission criteria for part 1112B), part 1112A received at 2X, parts 1112A and 1112B received at 3X (subject to any omission criteria for part 1112B), part 1112A received at 4X, parts 1112A and 1112B and 1112C being received at 5X (subject to any omission criteria or size reduction criteria for parts 1112B and/or 1112C), and part 1112A being received at 6X, etc. In the example above, X may represent a particular time increment (e.g., 'X' may represent 1 slot to represent, in this particular example, a first slot at 1X, a second slot at 2X, a third slot at 3X, etc.). A channel state report 1110 including the first set of channel coefficients may include these coefficients as a quantized set. Similarly, a channel state report 1110 including the second set of channel coefficients may include these coefficients as a quantized set, where the quantized set may or may not be reduced (e.g., subject to any size reduction criteria having been met).

Example Timing Parameter Signaling

Figure 15:
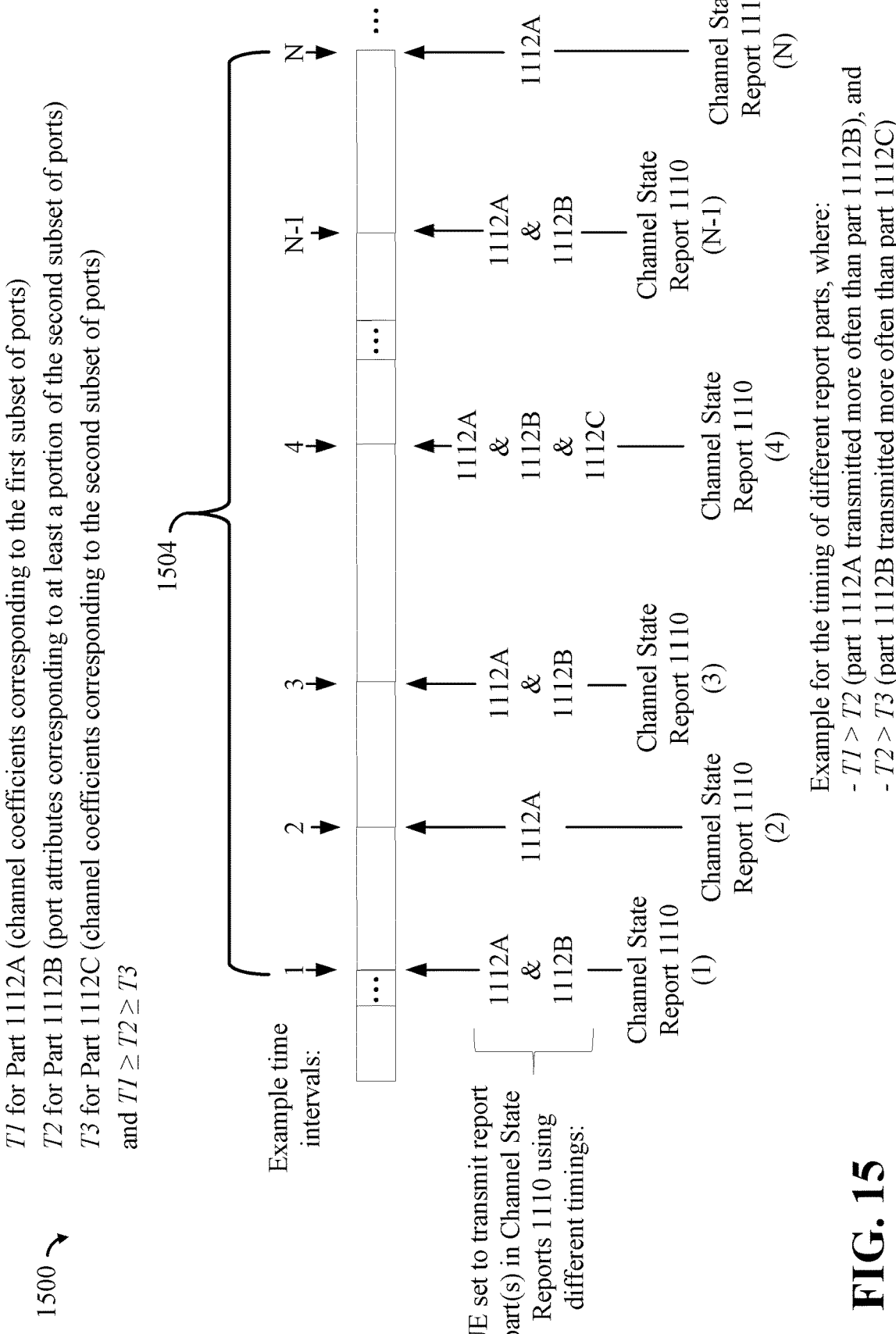
FIG. 15 is an exemplary transmission timeline for providing channel feedback for updating a precoder according to some embodiments.

FIG. 15 is an exemplary transmission timeline 1500 of a scheduled entity providing channel feedback to a scheduling entity for the updating of a DL precoder according to some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 25 may be configured to carry out the process 1300 to provide the exemplary transmission timeline 1500. In some examples, any suitable apparatus or means for carrying out the functions or algorithm described below may carry out the process 1300 to provide the exemplary transmission timeline 1500.

In some examples, the scheduling entity 1106 may provide the scheduled entity 1102 with a set of timing parameters for the report parts. In an illustrative example, the scheduling entity 1106 may configure part 1112A, part 1112B, and part 1112C of channel state reports 1110 to include up to three different transmission timings. For example, the scheduling entity 1106 may provide timing parameters of: T1 for a timing of part 1112A, T2 for a timing of part 1112B, and T3 for a timing of part 1112C, and scheduling entity 1106 may configure T1 to be greater than or equal to T2, and T2 to be greater than or equal to T3 (e.g., T1≥T2≥T3).

It may be advantageous to send the first set of channel coefficients at a higher frequency relative to the second set of channel coefficients and at a higher frequency relative to the set of port attributes corresponding to the second subset of antenna ports because the scheduling entity 1106 may be able to refine the set of DL precoders based on the first set of channel coefficients alone. The use of information related to the second subset of antenna ports may not always be as useful as the first set of channel coefficients and thus, a metered approach may be employed to meter the amount of data sent in any given channel state report. That is, information related to the second subset of antenna ports may be used to supplement the information related to the first subset of antenna ports. If sent with the same timing used to send the first set of channel coefficients, the scheduled entity 1102 may be overburdened with having to calculate the first and second set of channel coefficients at each time interval rather than strategically calculating the second set of channel coefficients less than the first set of channel coefficients. This is because the first set of channel coefficients may correspond to a specific set of antenna ports that correspond to a refined set of DL precoders. The second set of channel coefficients, however, may correspond to a random set of DL precoders that may result in poor signal quality for signals received over the second subset of antenna ports relative to the first subset of antenna ports.

This use of different timings applies to the port attributes as well since the port selection may be far smaller than a given set of channel coefficients, but may nevertheless be useful in refining a set of DL precoders for the first subset of antenna ports. As such, the port attributes for the port selection may be transmitted more frequently than the second set of channel coefficients in an attempt to allow the scheduling entity 1106 to refine the DL precoders while potentially conserving resources over time as opposed to if all report parts were sent at each time interval.

In some examples, scheduling entity 1106 may pre-define various combinations of T1, T2, and T3 to simplify signaling of the timing parameters. In some examples, the timings may correspond to a frequency with which scheduled entity 1102 is set to transmit the different report parts (subject to any omission or size reductions for any given channel state report in the set of channel state reports 1110).

In some examples, the first timing (e.g., time between report part transmissions) may be less than the second timing (e.g., the first timing for the first timing parameter has less time between part 1112A transmissions relative to the time between part 1112B transmissions. In addition, the third timing may be greater than or equal to the second timing (e.g., the second timing has less time between part 1112B transmissions relative to the time between part 1112C transmissions). In an example, scheduling entity 1106 may define the timing signaling as T1=T2=T3. In another example, the scheduling entity 1106 may define the timing signaling as T1>T2=T3. In yet another illustrative example, the scheduling entity 1106 may define the timing signaling as T1>T2>T3. The exemplary transmission timeline 1500 illustrates an example where T1>T2>T3.

For the exemplary transmission timeline 1500, the scheduling entity 1106 may first initialize a DL precoder. The scheduling entity 1106 may do so based upon an estimate of the UL channel (e.g., a channel estimate based on a set of SRSs received from scheduled entity 1102 as in block 1032 in FIG. 10). The scheduling entity 1106 may then transmit, using the DL precoder, a precoded set of reference signals (e.g., CSI-RSs) to a scheduled entity 1102 over a set of antenna ports, including over a first subset of ports and over a second subset of ports.

The scheduled entity 1102 may receive and measure the set of reference signals. The scheduled entity 1102 may then provide a set of channel state reports 1110 to scheduling entity 1106 as UE explicit feedback during a channel state reporting period 1504 using a set of timing parameters. In such examples, a scheduled entity 1102 may provide explicit channel feedback to a scheduling entity 1106 that the scheduling entity 1106 may utilize to update the DL precoder. In some examples, the scheduled entity 1102 may continue to update over time additional DL precoders in a set of modified DL precoders previously modified during the channel state reporting period 1504.

During the channel state reporting period 1504, scheduled entity 1102 transmits explicit feedback (e.g., measurements that the scheduled entity 1102 makes during the period 1504) regarding the DL channel to the scheduling entity 1106. The scheduled entity 1102 may transmit the channel state reports 1110 (1) through (N) in a series of slots. In some instances, the scheduled entity 1102 may receive an additional set of CSI-RSs over time and may generate the channel state reports 1110 in a set of channel state reports based on the most current CSI-RS. The scheduling entity 1106 may transmit the set of CSI-RSs using different precoders that have been refined over time. In an example, the scheduled entity 1102 may generate channel state reports 1110 (1) through (3) of FIG. 15 based on a first reference signal received from the scheduling entity 1106 (e.g., a first subset of RSs transmitted over a first subset of antenna ports using a first precoder type and a second subset of RSs transmitted over a second subset of antenna ports using a second precoder type), and may generate channel state reports 1110 (4) through (N) of FIG. 15 based on a second reference signal received from the scheduling entity 1106. In such examples, the second reference signal may be transmitted using an updated DL precoder. That is, the scheduling entity 1106 may update the DL precoder corresponding to the first subset of antenna ports based on channel state reports 1110 (1) through (3) prior to transmitting the second reference signal. In another example, scheduled entity 1102 may generate channel state reports 1110 (1) through (N) of FIG. 15 based on a single reference signal received from the scheduling entity 1106. In this illustrative example, N may be the sixth channel state report in the set of channel state reports 1110.

In an illustrative example, when the at least one channel state report of the set of channel state reports 1110 is to set to include part 1112A according to the first timing, the scheduled entity 1102 may transmit the first set of channel coefficients using the first timing by transmitting the channel state reports 1110 (1) through (N) at particular time intervals using the first timing parameter. In another illustrative example, when the at least one channel state report of the set of channel state reports 1110 is set to include part 1112B, the scheduled entity 1102 may transmit the set of port attributes using the second timing by transmitting the channel state reports 1110 (1), (3), (4), (N–1), and (N) using the second timing parameter. That is, part 1112B may be transmitted with part 1112A at particular time intervals according to the timing parameters.

In another example, channel state report 1110 (N) may be set to include part 1112B and/or part 1112C. However, an omission or size reduction criteria may be met at this time interval. As such, these parts transmitted using the second timing (T2) and the third timing (T3), may be omitted, at least in part, from the channel state report 1110 (N). If, on the other hand, the omission or size reduction criteria were not met, the channel state report 1110 (N) may be transmitted to include parts 1112B and/or 1112C. In either case, scheduled entity 1102 is transmitting part 1112B using the second timing and/or part 1112C using the third timing, even when the scheduled entity 1102 omits these parts from a particular channel state report 1110 that otherwise should include these parts were it not for the omission and/or size reduction criteria being met.

In some examples, the scheduled entity 1102 may transmit the set of channel state reports 1110 on a continual basis. In another example, the scheduled entity 1102 may determine that a channel state reporting procedure is complete after a predetermined amount of time or after a suitable (e.g., predetermined) number of channel state reports 1110 have been transmitted to scheduling entity 108 following initiation of the channel state reporting period 1504. In such examples, the scheduled entity 1102 may discontinue transmitting the set of channel state reports. In some examples, the scheduled entity 106 may discontinue the channel state reporting procedure after a suitable (e.g., predetermined) amount of time has elapsed since the initiation of the channel state reporting procedure. In some examples, the scheduled entity 1102 may reinitiate a channel state reporting procedure after determining that a predetermined amount of time has elapsed since the completion of a previous channel state reporting procedure. In this way, a predetermined amount of time may effectively separate a last channel state report of one channel state reporting period (e.g., channel state report 1110 (N)) from an initial channel state report of a subsequent channel state reporting period.

In an example, the scheduled entity 1102 may initiate a first channel state reporting procedure at a first time that initiates the transmission of a predetermined number of channel state reports 1110 over time to the scheduling entity 1106. The scheduled entity 1102 may conclude the first channel state reporting procedure after the predetermined number of channel state reports 1110 have been transmitted to the scheduling entity 1106. Of course, the scheduled entity 1102 may initiate a second channel state reporting procedure following the conclusion of first channel state reporting procedure. In an example, the scheduled entity 1102 may do so after receiving a trigger from scheduling entity 1106 to initiate the procedure, and/or after the scheduled entity 1102 has determined that a predetermined amount of time has elapsed since the conclusion of a preceding channel state reporting procedure.

In some examples, the scheduled entity 1102 may initiate the transmission process automatically (e.g., without receiving a trigger from the scheduling entity 1106), and without provocation, may begin automatically transmitting a set of channel state reports 1110 according to the set of timing parameters (e.g., for a definite or indefinite period of time). In such examples, the scheduled entity 1102 may utilize the first timing, the second timing, and the third timing to transmit the set of channel state reports 1110 during a reporting period 1504. In another example, the scheduled entity 1102 may receive a trigger from a scheduling entity 1106 to initiate a channel state reporting procedure. In response to the trigger, the scheduled entity 1102 may transmit at least one channel state report of the set of channel state reports 1110. The at least one channel state report may be transmitted using the first timing to include at least the first set of channel coefficients (e.g., channel state report 1110 (1) in FIG. 15). Regardless of whether an explicit trigger from the scheduling entity 1106 is used in the process or not, the scheduled entity 1102 may generate a set of channel state reports 1110 based on a CSI-RS received from the scheduling entity 1106 to include the various report parts in accordance with the set of timing parameters.

Example Quantization Schemes

FIG. 16 is a flow chart illustrating an exemplary process 1600 for a UE to quantize channel measurements in accordance with some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 25 may be configured to carry out the process 1600. In some examples, any suitable apparatus or means for carrying out the functions or algorithm described below may carry out the process 1600.

At block 1601, a scheduling entity 1106 (e.g., a BS) transmits reference signals, such as a CSI-RS, using a transceiver with one or more antennas. Here, to provide for refinement of the DL precoders it uses, the scheduling entity 1106 transmits a first subset of RSs via a first subset of antenna ports, using a first set of DL precoders, and a second subset of RSs via a second subset of antenna ports, using a second set of DL precoders. For example, the first set of DL precoders may be those that the scheduling entity 1106 aims to refine, while the second set of DL precoders may be employed as follows to refine the first set of DL precoders.

At block 1602, the scheduled entity 1102 (e.g., a UE) receives the RSs using a transceiver with one or more antennas. In an example, the scheduled entity 1102 may receive the RS(s) as a first subset of RSs and a second subset of RSs corresponding to respective antenna port subsets. To illustrate, the first set of RSs may be a first set of channel state information reference signals (CSI-RSs) transmitted using the first set of precoders, and the second set of RSs may be a second set of CSI-RSs transmitted using the second set of precoders.

At block 1604, the scheduled entity 1102 performs channel measurements to determine a first set of channel coefficients corresponding to the first subset of antenna ports. The scheduled entity 1102 may further perform channel measurements to determine a second set of channel coefficients corresponding to the second set of channel coefficients. In some instances, the scheduled entity 1102 may perform these measurements at different times, such as with a delay in between measurements when the second set of channel coefficients is not to be transmitted together with the first set of channel coefficients. In another example, the scheduled entity 1102 may perform these measurements on the received RS together at substantially the same time (e.g., when generating channel state report 1110 (1), or generating channel state report 1110 (4), for example, illustrated in FIG. 15).

In some examples, the scheduled entity 1102 may perform channel measurements for each antenna port in the set of antenna ports. In an example, the scheduled entity 1102 may determine, for each antenna port in the set of antenna ports, FD basis component combination associated with a nonzero channel coefficient. In any case, the scheduled entity 1102 may perform channel measurements for each antenna port in the first subset of antenna ports. In addition, the scheduled entity 1102 may perform channel measurements for each antenna port in the second subset of antenna ports.

At block 1606, the scheduled entity 1102 may determine the antenna port and/or FD basis combination in the first subset of antenna ports corresponding to the strongest channel coefficient (e.g., strongest relative to other channel measurements for other ports in the first subset of antenna ports). In some examples, the scheduled entity 1102 may determine an antenna port in the first subset of antenna ports corresponding to a strongest channel coefficient. In an example, the scheduled entity 1102 may determine an antenna port in the first subset of antenna ports having a maximum amplitude.

At block 1608, the scheduled entity 1102 may quantize the first set of channel coefficients based on the strongest channel coefficient determined for the first subset of antenna ports. The scheduled entity 1102 may quantize the first set of channel coefficients corresponding to the first subset of antenna ports to produce a first quantized set of channel coefficients. In an example, the amplitude data for the first set of channel coefficients may be quantized into 8 different amplitude values (e.g., 3-bit quantization) having discrete magnitudes ranging from 0 dB to −21 dB in step sizes of −3 dB. In other implementations, different quantization schemes, as known to persons skilled in the art, may be used to quantize the measured amplitude data for the first set of channel coefficients. In some examples, the scheduled entity 1102 may quantize the measured values for each port subset, and may optionally normalize the measured values relative to, for example, the strongest amplitude values measured for each antenna port.

In an illustrative example, the scheduled entity 1102 may set the amplitude of the strongest coefficient in the first subset of antenna ports as a reference amplitude '$p_{ref}$'. In some examples, the scheduled entity 1102 may then normalize the remaining channel coefficients corresponding to the first subset of antenna ports between a value of 0 and 1 (e.g., 0 dB). In any case, the amplitude for the first quantized set of channel coefficients can be represented as $p=p_{ref}a$, where a is quantized and $a \in (0,1]$.

At block 1610, the scheduled entity 1102 may quantize the second set of channel coefficients when set to transmit part 1112C in a given channel state report of the set of channel state report(s) 1110. In some examples, the scheduled entity 1102 may quantize the second set of channel coefficients based on the strongest coefficient determined for the first subset of antenna ports (e.g., $p_{ref}$). In this example, the scheduled entity 1102 may use a single reference amplitude (e.g., $p_{ref}$) to quantize both the first set of channel coefficients and the second set of channel coefficients.

In an illustrative example, the first set of channel coefficients may include a plurality of channel coefficients. The scheduled entity 1102 may then quantize the first set of channel coefficients by determining at least one channel coefficient from the first set of channel coefficients as representative of a set of stronger coefficients (e.g., at least one coefficient) relative to at least one other channel coefficient in the first set of channel coefficients. The scheduled entity 1102 may then utilize, when quantizing the first set of channel coefficients, one or more amplitudes corresponding to the set of stronger coefficients as a first reference amplitude (e.g., $p_{ref\_1}$, or simply $p_{ref}$ in this instance). The scheduled entity 1102 may then utilize a second reference amplitude to quantize the second set of channel coefficients (e.g., $p_{ref\_2}$). In some examples, however, the first reference amplitude may be used as the second reference amplitude (e.g., $p_{ref\_1}=p_{ref\_2}$). In such examples, the amplitude for the second quantized set of channel coefficients can also be represented as $p=p_{ref}a$, where a is quantized and $a \in (0,1]$, and $p_{ref}$ corresponds to the strongest coefficient from the first subset of antenna ports. Similar quantization and normalization may be obtained with respect to phase quantization for the set of antenna ports.

At block 1612, the scheduled entity 1102 may then generate a set of channel state report(s) 1110 to include the one or more quantized sets of channel coefficients (e.g., part 1112A and/or part 1112B). In some examples, the scheduled entity 1102 may store the quantized values in a data array, where the rows in the array are associated with different antenna ports and the columns in the array are associated with different FD basis components.

Figure 17:
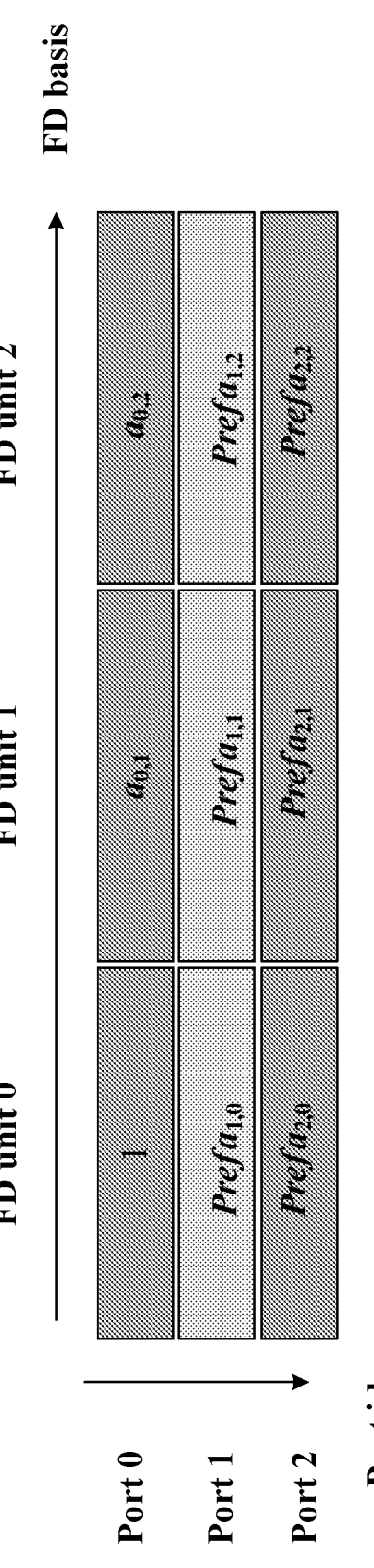
FIG. 17 shows a data array depicting channel coefficients according to the method depicted in FIG. 16.

To illustrate, FIG. 17 shows one example of a data array depicting channel state measurements quantized and normalized by a scheduled entity 1102 according to the method depicted in FIG. 16. In some examples, the scheduled entity 1102 may have identified a first port (e.g., Port 0) as the port having the FD basis component with the highest amplitude of all port measurements. Accordingly, the scheduled entity 1102 may normalize the value in the first FD basis component (e.g., FD unit 0) for that port to an amplitude value of "1". The scheduled entity 1102 may further quantize and normalize the channel coefficients 'a' (e.g., having amplitude and phase components) for the other FD basis components in that port (Port 0) relative to the FD basis component (FD unit 0) that the scheduled entity 1102 normalized to the value of "1". The scheduled entity 1102 may further quantize and normalize the channel coefficients (e.g., having amplitude and phase components) for other antenna ports using a reference amplitude ($p_{ref}$) determined from, in this particular example, Port 0.

In an illustrative example, the scheduled entity 1102 may generate a channel state report 1110 to include the first quantized set of channel coefficients (e.g., part 1112A). In addition, and depending on the particular time interval, the scheduled entity 1102 may generate the channel state report 1110 to include both the first quantized set of channel coefficients and the second quantized set of channel coefficients (e.g., parts 1112A and 1112B). That is, depending on the timing for transmitting the first set of channel coefficients and the timing for transmitting the second set of channel coefficients, the scheduled entity 1102 may include one or both of these parts in a given report. When generating the channel state report 1110, however, the scheduled entity 1102 may determine to omit all or a portion of part 1112B from a given channel state report 1110 prior to transmitting the report, according to one or more of the various techniques of this disclosure.

At block 1614, the scheduled entity 1102 may transmit the channel state report(s) 1110. In an example, the scheduled entity 1102 may transmit the first quantized set of channel coefficients (part 1112A) using the first timing. In addition, the scheduled entity 1102 may transmit the second quantized set of channel coefficients (part 1112B) using the second timing. In some instances, the scheduled entity 1102 may transmit part 1112A more frequently (pursuant to the first timing) compared to the frequency with which the scheduled entity 1102 transmits part 1112B (pursuant to the second timing).

At block 1616, the scheduling entity 1106 may receive and process the set of channel state reports 1110. In an example, the scheduling entity 1106 may use the channel state reports 1110 to refine the DL precoders used to transmit additional DL transmissions (reference signals, data, etc.) to the scheduled entity 1102.

Figure 18:
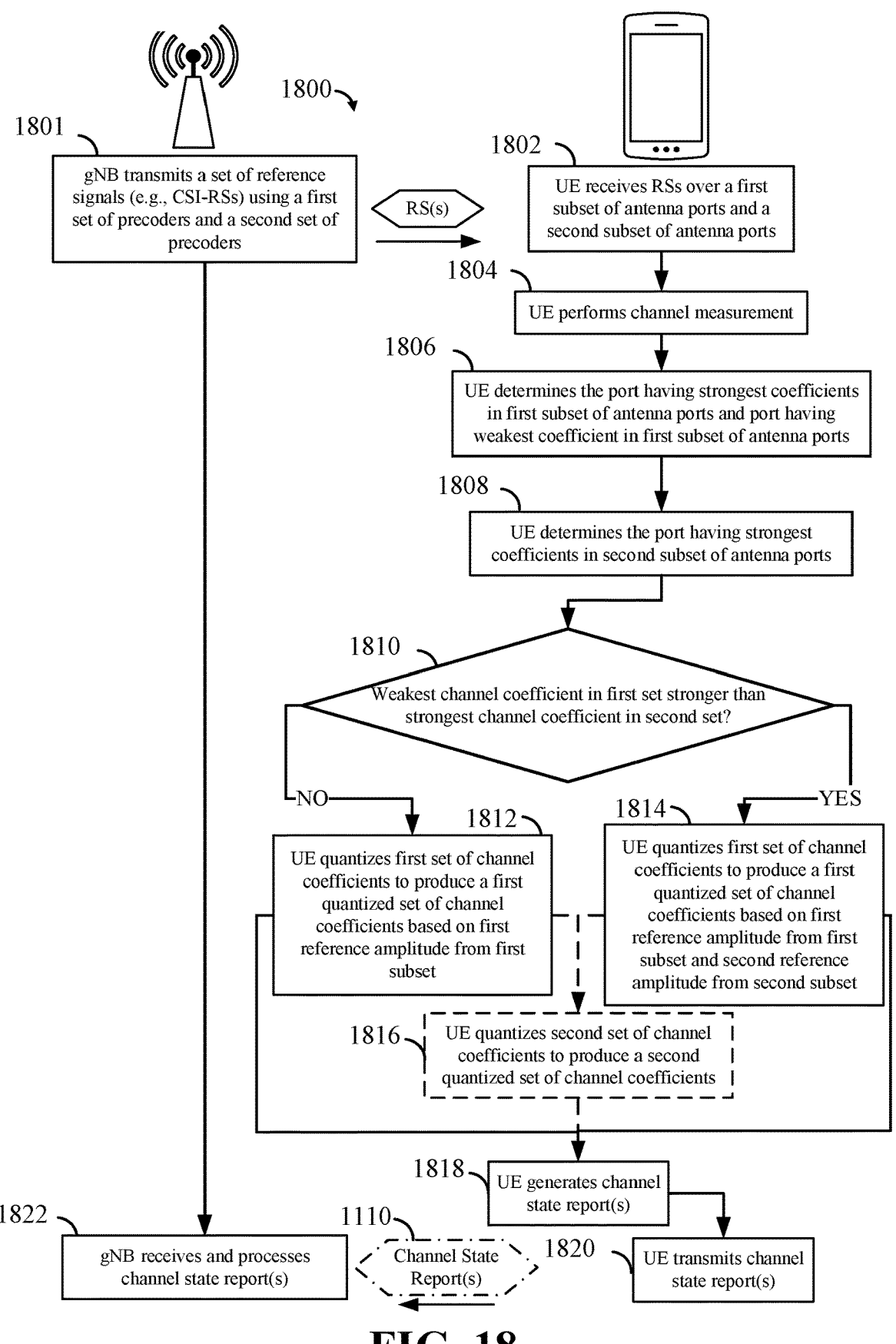
FIG. 18 is a flow chart illustrating an exemplary process for a scheduled entity to quantize channel coefficients according to some embodiments.

FIG. 18 is a flow chart illustrating another exemplary process 1800 for a scheduled entity to quantize channel measurements in accordance with some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 25 may be configured to carry out the process

1800. In some examples, any suitable apparatus or means for carrying out the functions or algorithm described below may carry out the process 1800.

At block 1801, a scheduling entity 1106 (e.g., a BS) transmits reference signals, such as a CSI-RS, using a transceiver with one or more antennas. Here, to provide for refinement of the DL precoders it uses, the scheduling entity 1106 transmits a first subset of RSs via a first subset of antenna ports, using a first set of DL precoders, and a second subset of RSs via a second subset of antenna ports, using a second set of DL precoders. For example, the first set of DL precoders may be those that the scheduling entity 1106 aims to refine, while the second set of DL precoders may be employed as follows to refine the first set of DL precoders.

At block 1802, the scheduled entity 1102 (e.g., a UE) receives the RSs using a transceiver with one or more antennas. In an example, the scheduled entity 1102 may receive the RS(s) as a first subset of RSs and a second subset of RSs corresponding to respective antenna port subsets. To illustrate, the first set of RSs may be a first set of channel state information reference signals (CSI-RSs) transmitted using the first set of precoders, and the second set of RSs may be a second set of CSI-RSs transmitted using the second set of precoders.

At block 1804, the scheduled entity 1102 performs channel measurements to determine a first set of channel coefficients corresponding to the first subset of antenna ports. The scheduled entity 1102 may further perform channel measurements to determine a second set of channel coefficients corresponding to the second set of channel coefficients. In some instances, the scheduled entity 1102 may perform these measurements at different times, such as with a delay in between measurements when the second set of channel coefficients is not to be transmitted together with the first set of channel coefficients. In another example, the scheduled entity 1102 may perform these measurements on the received RS together at substantially the same time (e.g., when generating channel state report 1110 (1), or generating channel state report 1110 (4), for example, illustrated in FIG. 15).

The scheduled entity 1102, however, may determine, based on a quantization parameter received from scheduling entity 1106, to quantize the channel coefficients differently than described in, for example, FIG. 16. In an example, the quantization parameter may signal to scheduled entity 1102 to use the same reference amplitude for both sets of channel coefficients as in FIG. 16 or to use different reference amplitudes as in FIG. 18.

In an illustrative example, the scheduled entity 1102 may determine that the scheduled entity 1102 is to utilize different reference amplitudes for quantizing both the first and second sets of channel coefficients. In such examples, the scheduled entity 1102 may determine the antenna ports having the strongest channel coefficients in either set to be the reference amplitudes for quantizing each set of channel coefficients. In an example, a quantization parameter received from a scheduling entity 1106 may signal to scheduled entity 1102 to perform a relative quantization for the first set of channel coefficients and the second set of channel coefficients in view of one another.

In some examples, quantization may include normalizing the amplitude values of the FD basis components in the port based upon the highest measurement amplitude (which is normalized to a value of "1") and then quantizing the normalized values using a suitable quantization scheme. In another example, relative quantization may include first quantizing all amplitude values for each FD basis component of the port and then normalizing the values by subtracting the largest quantized amplitude from the other quantized amplitude values. In addition, phase measurements for the antenna port's FD basis components can be quantized and normalized to the quantized phase measurement of the FD basis component.

In one example, the scheduled entity 1102, at block 1806, may determine the antenna port having the strongest coefficients corresponding to the first subset of antenna ports. In addition, the scheduled entity 1102 may determine the antenna port yielding the weakest channel coefficient in first subset of antenna ports. In such examples, the scheduled entity 1102 may determine a first reference amplitude corresponding to the strongest coefficient from the first set of channel coefficients. That is, the scheduled entity 1102 may set the amplitude of the strongest coefficient for part 1112A as $p_{ref}$.

At block 1808, the scheduled entity 1102 may determine the antenna port having the strongest coefficients in the second subset of antenna ports. In such examples, the scheduled entity 1102 may determine a second reference amplitude corresponding to the strongest coefficient from the second set of channel coefficients. That is, the scheduled entity 1102 may set the amplitude of the strongest coefficient for part 1112C as prep.

At block 1810, the scheduled entity 1102 may determine whether the amplitude of the lowest coefficient in Part 1 is larger than $p_{ref2}$ (e.g., the weakest channel coefficient in the first set of channel coefficients is stronger than the strongest channel coefficient in the second set of channel coefficients).

At block 1812, the scheduled entity 1102 may determine, in instances where the amplitude of the weakest channel coefficient in the first set of channel coefficients is not stronger than the strongest channel coefficients in the second set of channel coefficients (NO at block 1810), that the amplitude in part 1112A may be represented as: $p=p_{ref2}a$, where a is quantized and $a\in(0,1]$.

At block 1814, in instances where the amplitude of the weakest channel coefficient in part 1112A is larger than $p_{ref2}$ (e.g., the strongest coefficient determined for part 1112C) (YES at block 1810), then the amplitude in part 1112A may be represented as:

$$p = p_{ref_1}\left(\frac{p_{ref_2}}{p_{ref_1}} + a\right),$$

where a is quantized and $a\in(0,1]$.

In such examples, the scheduled entity 1102 may quantize the first set of channel coefficients to produce the first quantized set of channel coefficients by determining that a weakest channel coefficient from the first set of channel coefficients is stronger than the second reference amplitude. The scheduled entity 1102 may then quantize the first set of channel coefficients based at least in part on the first reference amplitude and the second reference amplitude to produce the first quantized set of channel coefficients.

At block 1816, in instances where the scheduled entity 1102 is to determine a second set of quantized channel coefficients, the amplitude in part 1112C may be represented as: $p=p_{ref2}a$, where a is quantized and $a\in(0,1]$. That is, the scheduled entity 1102 may determine the second set of quantized channel coefficients based at least in part on the second reference amplitude determined relative to the second subset of antenna ports.

At block 1818, the scheduled entity 106 may normalize the amplitude values based upon the highest measured amplitude (e.g., identified at block 1814) and then, quantize the amplitude values using a suitable quantization scheme. In some examples, this process may include quantizing all amplitude values and normalizing the values by subtracting the largest quantized amplitude from the other quantized amplitude values.

Additionally, at block 1818, the scheduled entity 106 may generate a channel state report 1110. The channel state report 1110 may include quantized sets of channel coefficients and also may include port attributes for part 1112B. The quantized sets may be generated in various ways as determined by quantization parameters received from scheduling entity 1106. In some examples, the scheduled entity 1102 may generate a channel state report 1110 to include the first quantized set of channel coefficients or the first quantized set of channel coefficients and the second quantized set of channel coefficients, depending on the particular time interval and depending on the timing parameters for the first set of channel coefficients and the second set of channel coefficients. In instances where the second set of channel coefficients is not to be transmitted in a channel state report due to an omission or size reduction criteria having been met, the channel state report 1110 may forgo block 1816.

At block 1820, the scheduled entity 1102 transmits the channel state report(s) 1110 to include the first quantized set of channel coefficients (part 1112A) using the first timing, and in some instances, the second quantized set of channel coefficients (part 1112B) using the second timing.

At block 1822, the scheduling entity 1106 may receive and process the set of channel state reports 1110. In an example, the scheduling entity 1106 may use the channel state reports 1110 to refine the DL precoders used to transmit additional DL transmissions (reference signals, data, etc.) to the scheduled entity 1102.

In some examples, a quantization scheme for the sets of channel coefficients in a channel state report may include the scheduled entity 1102 mapping a set of channel coefficients to a relatively small set of discrete predetermined quantized coefficient values to obtain the first quantized set of channel coefficients and/or the second quantized set of channel coefficients. In an example, to obtain a quantized set of channel coefficients, the scheduled entity 1102 may map amplitude values to a set of predetermined quantized amplitude values and/or may map phase values to a set of predetermined quantized phase values. That is, the scheduled entity 1102 may also perform quantization of the measured phase values to obtain the first quantized set of channel coefficients and/or the second quantized set of channel coefficients. In an example, each measured phase value in the set of channel state reports may be quantized using PSK techniques.

In some examples, the quantization levels may be the same for any given quantization scheme that scheduled entity 1102 uses to quantize the first set of channel coefficients corresponding to the first subset of antenna ports and to quantize the second set of channel coefficients corresponding to the second subset of antenna ports. In an illustrative and non-limiting example, the scheduled entity 1102 may perform 4-bit quantization to quantize both of the sets of channel coefficients, in which the 4-bits are used to define 16 discrete signal amplitude values.

In various quantization schemes, the scheduled entity 1102 may perform different quantization approaches using one or more quantization levels (e.g., as defined by the quantization parameter received from the scheduling entity

1106). In some examples, the quantization levels for quantizing the first set of channel coefficients (e.g., part 1112A for the set of channel state reports) may not necessarily be the same for quantizing the second set of channel coefficients (e.g., part 1112C for the set of channel state reports).

In an illustrative and non-limiting example, the scheduled entity 1102 may perform 4-bit quantization to quantize a first set of channel coefficients corresponding to the first subset of antenna ports, and 3-bit quantization to quantize a second set of channel coefficients corresponding to the second subset of antenna ports. In such examples, the scheduled entity 1102 may use, for example, the 3-bits to define eight discrete signal amplitude values. In an example, the scheduled entity 1102 may perform quantization for a measured channel coefficient by replacing the measured channel coefficient with the closest of the eight quantized channel coefficient values.

While particular examples of quantization levels are described for illustration purposes, the techniques of this disclosure are not so limited, and the scheduled entity 106 may alternatively (or in addition) utilize other quantization levels to quantize the channel coefficients. As a person of ordinary skill in the art would understand, other quantization schemes may include applying 8-bit quantization or 2-bit quantization, for example, and different quantization levels may be applied differently for different sets of channel coefficients.

By employing some of the aspects described herein, a scheduled entity 1102 may effectively reduce or limit the size of its overhead, achieving improved performance with a relatively small cost in UL signaling overhead. In an example, when a scheduling entity 1106 utilizes a DL precoder updated based on certain features herein to transmit DL signals via an FDD reciprocal channel, a scheduled entity 1102 may, as a result, capture more power when receiving the DL signals over time.

Example Modification of Precoders

In some examples, the scheduling entity 1106 may utilize the channel report(s) 1110 to update its DL FD basis vector for improved performance of subsequently precoded DL transmissions (e.g., CSI-RS(s) 1108). Benefits of providing channel state reports in a set of channel state reports 1110 with varying degrees of information include an improvement in updating the precoders performance in an FDD system and increasing the efficiency with which the scheduling entity 1106 may refine precoders used to provide DL transmissions. In addition, the scheduled entity 1102 may assist in the precoder refinement at the scheduling entity 1106 by transmitting channel coefficients and port selections of varying degrees over time, which may, in some instances, be less burdensome on the scheduled entity 1102. Additional, benefits may include reducing UL overhead by reducing signaling requirements for channel state reports for DL precoder refinement, for example, by providing timing parameters, quantization parameters, omission criteria, etc. In this way, the scheduled entity 1102 may selectively provide a suitable amount of data to scheduling entity 1106 to allow the scheduling entity 1106 to refine precoder refinement.

FIG. 19 is a flow chart illustrating an exemplary process for a scheduling entity 1106 (e.g., a BS) to refine a set of precoders based on a set of channel state reports received from a scheduled entity 1102 in accordance with some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 25 may be configured to carry out the process 1900. In some examples, any suitable apparatus or means for carrying out the functions or algorithm described below may carry out the process 1900.

At block 1901, a scheduling entity 1106 may transmit a network configuration to a scheduled entity 1102 (e.g., a UE). The network configuration may include port identifiers for a set of antenna ports including at least a first subset of antenna ports and a second subset of antenna ports. The network configuration may further include a set of channel state reporting parameters including timing parameters, quantization parameters (e.g., defining when to use a common reference amplitude as in FIG. 16 or multiple reference amplitudes as in FIG. 18), and as described below a set of omission criteria and size reduction criteria. In an illustrative example, the network configuration may include a set of timing parameters defining a set of different timings for transmitting the different report parts. In an example, the scheduled entity 1102 may apply the set of timings when reporting channel coefficients for a first subset of antenna ports, a set of port attributes corresponding to at least a portion of a second subset of antenna ports, and in some instances, channel coefficients for the second subset of antenna ports. In such examples, the set of timing parameters may define a first timing for obtaining the first set of channel coefficients, a second timing for obtaining the set of port attributes, and a third timing for obtaining the second set of channel coefficients. In some examples, the scheduled entity 1102 may determine the second set of channel coefficients based on the determined set of port attributes (e.g., quantized coefficients corresponding only to those antenna ports that the scheduled entity 1102 has selected over the other antenna ports in the second subset of antenna ports).

At block 1902, the scheduled entity 1102 may receive the network configuration and store the configuration details to a memory device. In an example, the scheduled entity 1102 may store the configuration details to a computer-readable medium (e.g., the computer-readable medium illustrated as block 2506 in FIG. 25). The scheduled entity 1102 may receive the configuration details together or over time. In an example, scheduled entity 1102 may receive the port identifiers at a first time and may receive the reporting parameters at a second time subsequent to the first time.

At block 1904, the scheduling entity 1106 transmits reference signals, such as a CSI-RS, using a transceiver with one or more antennas. The scheduling entity 1106 may be the same or different from the scheduling entity 1106 providing the network configuration. In an example, a first scheduling entity 1106 may transmit the network configuration to one or more scheduled entities 1102, and a second scheduling entity 1106 may transmit reference signals and/or data to a particular scheduled entity 1102 that have established a particular FDD channel therebetween.

At block 1906, the scheduled entity 1102 receives the RSs using a transceiver with one or more antennas. In an example, the scheduled entity 1102 may receive the RS(s) as a first subset of RSs and a second subset of RSs corresponding to respective antenna port subsets. To illustrate, the first set of RSs may be a first set of channel state information reference signals (CSI-RSs) transmitted using the first set of precoders, and the second set of RSs may be a second set of CSI-RSs transmitted using the second set of precoders. According to aspects of the present disclosure, for time $t_0$ (e.g., when beginning a process for updating a precoder), the precoder can be initialized based on the estimated UL channel $U^{(t_0)}=U_{UL}$, where $U_{UL}$ is the SVD of the UL channel.

In an illustrative and non-limiting example, the scheduled entity 1102 may measure a second subset of reference signals to determine that, in particular, antenna ports 1, 4, 7, and 8 from the second subset of antenna ports may provide better signal quality relative to the other antenna ports in the second subset of antenna ports. Thus, at a time interval when a particular channel state report 1110 is set to include part 1112B (e.g., those port indices identifying the selected antenna ports), the scheduled entity 1102 may include information relative to antenna ports 1, 4, 7, and 8 as part 1112B, in addition to including information relative to the first subset of antenna ports. Once the scheduling entity 1106 receives the port selection report (e.g., part 1112B of the channel state report 1110), the scheduling entity 1106 may then utilize the set of precoders corresponding to the UE's selection of antenna ports to then precode a subsequent DL transmission (e.g., a second CSI transmission). That is, in this illustrative example, the scheduling entity 1106 may utilize the precoders corresponding specifically to antenna ports 1, 4, 7, and 8 used to precode a first DL transmission to then precode at least the second DL transmission (e.g., at least one second subset of CSI-RSs subsequently transmitted over the second subset of antenna ports).

At block 1908, the scheduled entity 1102 may generate and transmit at least one channel state report 1110 in a set of channel state reports to scheduling entity 1106. The scheduled entity 1102 may generate and transmit a set of channel state reports in accordance with one or more of the variety of techniques described with reference to FIGS. 11-23.

At block 1910, the scheduled entity 1102 receives the set of channel state report(s) 1110. The set of channel state reports 1110 may include a plurality of channel state reports transmitted over time based on a current RS made available to the scheduled entity 1102 from the scheduling entity 1106.

At block 1912, the scheduling entity 1106 utilizes the set of channel state reports to refine precoders associated with the first subset of antenna ports, and thereby, improve performance of the DL precoders and improve DL signal quality. In an example, the scheduling entity 1106 may modify the first set of precoders to produce a modified set of precoders by modifying the first set of precoders based on the first set of channel coefficients, the set of port attributes corresponding to the second subset of antenna ports, and/or the second set of channel coefficients.

When the random precoders (e.g., the second subset of precoders) are particularly structured (e.g., generated from the null space of the precoder in the first group), UE feedback regarding the port attributes (e.g., as part 1112B provides) allows the scheduling entity 1106 to determine which random precoders to use or not use for subsequent DL transmissions.

In such examples, the scheduling entity 1106 can use information relative to the second subset of antenna ports (e.g., the second set of channel coefficients or information regarding the port attributes corresponding to the second subset of antenna ports) in order to refine the first subset of precoders associated with the first subset of antenna ports. Of course, the scheduling entity 1106 may do so in addition, or alternatively, to using information relative to the first subset of antenna ports (e.g., the first set of channel coefficients). In any case, the scheduling entity 1106 uses the precoders to precode the antenna ports with SD-FD pairs (e.g., by generating and applying a precoding matrix based on the channel estimate), with the first subset of antenna ports being precoded with the DL SD-FD pairs, and the second subset of antenna ports being precoded with second subset of precoders. As discussed, the second subset of precoders may be a random sequence (e.g., random precoder, random Gaussian, randomly generated from the null space of the precoder(s) in the first subset of antenna ports, etc.). In an example, the BS precodes a first subset of antenna ports using a first refined set of precoders (e.g., DL SD and FD bases) and precodes a second subset of antenna ports using a second set of precoders).

In some examples, the scheduling entity 1106 may determine the second subset of precoders associated with the second subset of antenna ports based on the null space of the first subset of precoders associated with the first subset of antenna ports. In an example, the first subset of precoders associated with the first subset of antenna ports may correspond to a number of SD-FD pairs (integer 'N'). In such examples, the null space of the first subset of precoders corresponds to the difference between the number of antenna ports in the first subset of antenna ports (e.g., r ports) and the number of SD-FD pairs (e.g., null space=N minus r). As such, the scheduling entity 1106 may generate the second subset of precoders utilizing a random sequence based on the null space of the first subset of precoders.

In an example, W1 may denote the first subset of precoders, and W2 may denote the second subset of precoders. The scheduling entity 1106 may receive part 1112A and part 1112B. As such, the scheduling entity 1106 may use the channel coefficients in part 1112A to refine W1 to determine W1_refined. In such examples, the scheduling entity 1106 may generate W2_refined, which is still in the null space of W1, i.e., W2_refined is in null(W1). According to the port attributes in part 1112B, the scheduling entity 1106 may removes some and maintain some of the precoders in W2.

Figure 20:
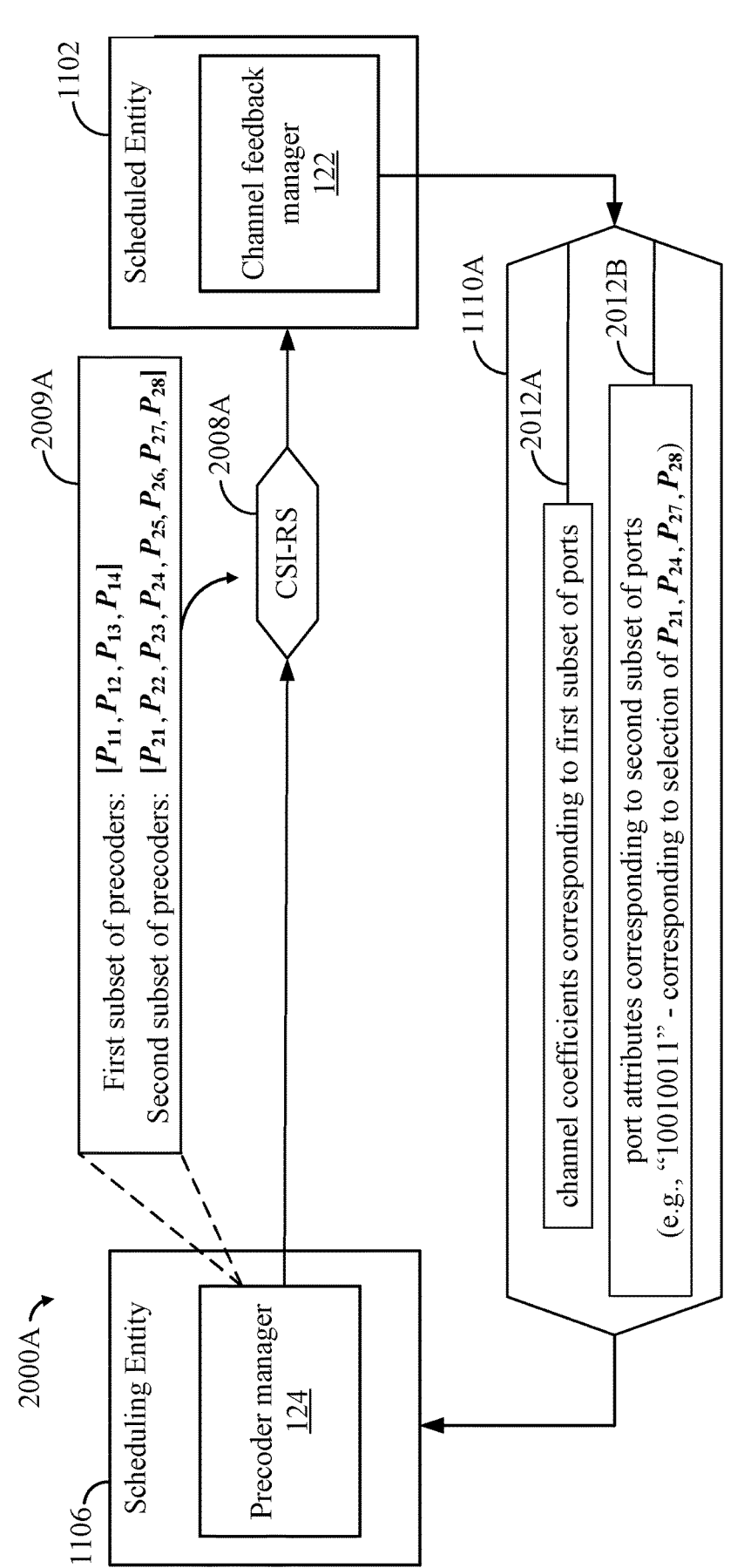
FIG. 20 is a block diagram illustrating a scheduling entity receiving a channel state report received from a scheduled entity to precode DL transmissions according to some embodiments.
Figure 21:
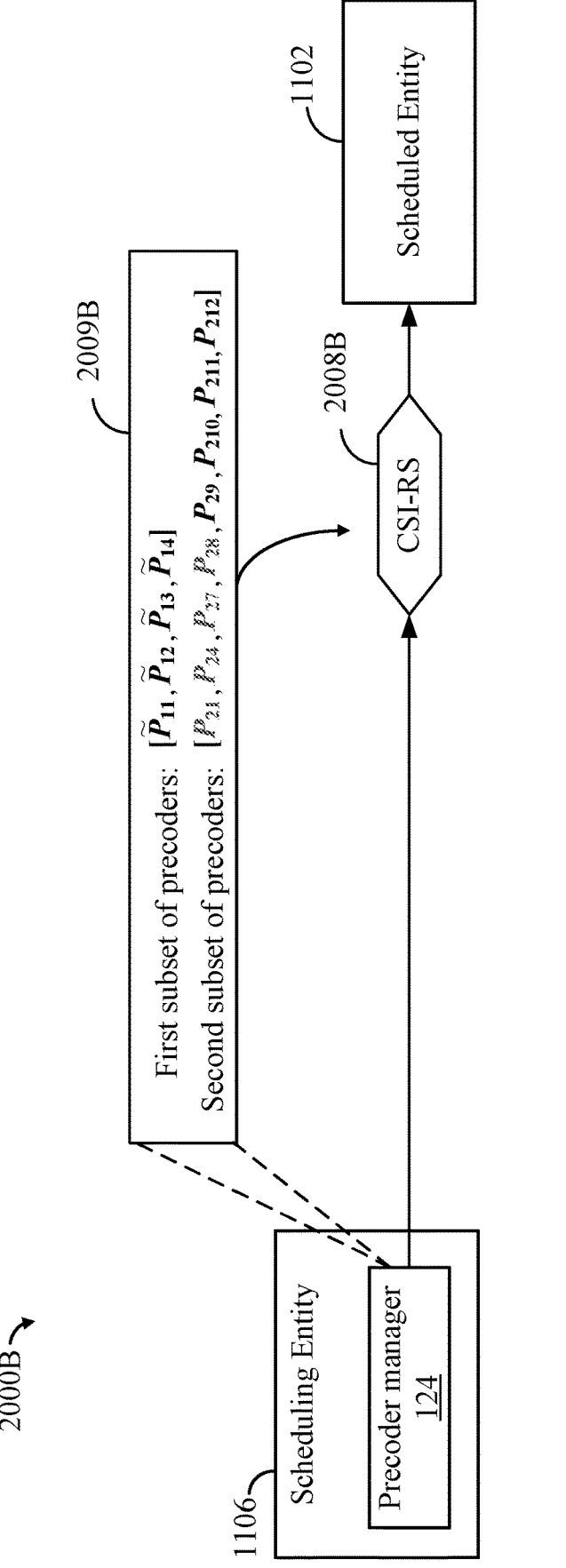
FIG. 21 is a block diagram illustrating a scheduling entity utilizing the channel state report received from a scheduled entity as illustrated in FIG. 20 to precode DL transmissions according to some embodiments.

Referring briefly to FIGS. 20 and 21 for an illustrative example, FIG. 20 is a block diagram 2000A illustrating a scheduling entity 1106 transmitting a signal to a scheduled entity 1102, and in turn receiving a channel state report 1110A from the scheduled entity 1102 according to some embodiments. In this example, as indicated by the box 2009A, a scheduling entity 1106 may utilize $[P_{11}, P_{12}, P_{13}, P_{14}]$ (e.g., a subset of four precoders) in the first subset of antenna ports and $[P_{21}, P_{22}, P_{23}, P_{24}, P_{25}, P_{26}, P_{27}, P_{28}]$ (e.g., a subset of eights precoders) in the second subset of antenna ports for the first CSI-RS transmission 2008A. As shown, precoders in the second subset of precoders $P_{21}$ are, in this example, in the null space of precoders in the first subset of antenna ports.

Next, the scheduling entity 1106 may receive a channel state report 1110A according to, for example, the second timing (e.g., at time intervals 1 or 3 in FIG. 15, etc.). In this example as shown, the channel state report 1110A includes a part 2012A (an example of part 1112A from FIG. 11) transmitted with the first timing provision (e.g., channel coefficients corresponding to the first subset of antenna ports). The channel state report 1110A also includes, in this example, a part 2012B (an example of part 1112B from FIG. 11) transmitted with the second timing provision (e.g., port attributes indicative of the selection of antenna ports from the second subset of antenna ports). The channel state report 1110A may, in an example, indicate port attributes as '10010011' (select port 1,4,7,8 in the second subset of antenna ports) for part 2012B of the channel state report 1110A (an example of part 1112B). Upon receiving the report 1110A, the scheduling entity 1106 may select these four precoders ($P_{21}$, $P_{24}$, $P_{27}$, and $P_{28}$) for precoding a subsequent DL transmission.

FIG. 21 is a block diagram 2000B illustrating the scheduling entity 1106 utilizing the channel state report 1110A received from the scheduled entity 1102 as illustrated in FIG. 20 to precode DL transmissions according to some embodiments. As shown, the scheduling entity 1106 may refine the first subset of precoders using part 2012A info to achieve a refined set of precoders corresponding to the first subset of antenna ports as, for example, $[\tilde{P}_{11}, \tilde{P}_{12}, \tilde{P}_{13}, \tilde{P}_{14}]$. In addition, the scheduling entity 1106 may determine the second subset of precoders as follows: $[P_{21}, P_{24}, P_{27}, P_{28}, P_{29}, P_{210}, P_{211}, P_{212}]$. There, the second subset of precoders, including $P_{29}, P_{210}, P_{211}, P_{212}$, are still in the null space of precoders corresponding to the first subset of precoders. In this way, as indicated by the box 2009B, the scheduling entity 1106 may utilize the set of precoders as shown (including the first subset of precoders corresponding to the first subset of antenna ports and the second subset of precoders corresponding to the second subset of antenna ports) to transmit a subsequent signal 2008B.

Referring once again to FIG. 19, and as another illustrative example, the scheduling entity 1106 may receive a channel state report 1110 according to, for example, the third timing (e.g., time interval 4 in FIG. 15 as only an illustrative example). In this particular example, receiving a channel state report 1110 at time interval 4 may include the scheduling entity 1106 receiving a first quantized set of channel coefficients corresponding to the first subset of antenna ports. Receiving the channel state report 1110 at time interval 4 may further include the scheduling entity 1106 receiving a quantized set of channel coefficients corresponding to the second subset of antenna ports, where the quantized set may be of a first size or a smaller size relative to the first size (e.g., in terms of number of bits). As discussed herein, the scheduled entity 1102 may have transmitted this smaller-sized set because the size of the report was too large to transmit with a full set of channel coefficients corresponding to the second subset of antenna ports. As such, the scheduled entity 1102 may reduce the report size of the report part transmitted using the third timing. In an example, the scheduled entity 1102 may transmit, as the quantized set of channel coefficients of the smaller size, a reduced set of channel coefficients corresponding to the second subset of channel coefficients.

At times when the scheduling entity 1106 receives report parts 1112A-1112C in a channel state report 1110, the scheduling entity 1106 may utilize information in the three report parts to modify the first subset of DL precoders to yield a refined first subset of DL precoders (e.g., W1_refined). In addition, the scheduling entity 1106 may further generate a refined second subset of DL precoders (e.g., W2_refined). In some examples, the scheduling entity 1106 may modify the second subset of DL precoders to generate the refined second subset of DL precoders. The scheduling entity 1106 may generate the refined second subset of DL precoders in any suitable way. In an example, the scheduling entity 1106 may generate the refined second subset of DL precoders to be in the null space of the refined first subset of precoders (e.g., null(W1_refined)). In some instances, however, the refined second subset of DL precoders may be a replica of, or at least may not differ substantially from, the second subset of DL precoders. In either case, the scheduling entity 1106 may utilize the various report parts to determine a refined set of DL precoders that accordingly includes at least the refined first subset of DL precoders and/or a second subset of DL precoders (e.g., the refined second subset of DL precoders).

At block 1914, the scheduling entity 1106 may transmit a second set of reference signals (RSs) using the refined set of precoders (e.g., W1_refined and W2_refined). In an example, the scheduling entity 1106 may transmit the second set of RSs over the same set of antenna ports used to transmit the first set of RSs or over another set of antenna ports. In any case, the scheduling entity 1106 may utilize the refined set of DL precoders to precode multiple subsets of antenna ports when transmitting the second set of reference signals (e.g., a second CSI-RS) to the scheduled entity 1102.

At block 1916, the scheduled entity 1102 may receive the second set of reference signals. In an example, the scheduled entity 1102 may receive a first subset of RSs over a first subset of antenna ports and a second subset of RSs over a second subset of antenna ports. In such examples, the first subset of precoded RSs and the second subset of precoded RSs may together form the second set of reference signals (e.g., the second CSI-RS).

At block 1918, the scheduled entity 1102 may generate additional channel state reports 1110. In an example, the scheduled entity 1102 may generate additional channel state reports 1110 to include one or more of the report parts (e.g., part 1112A, part 1112B, and/or part 1112C) depending on the different timing parameters for each and based on any omission or size reduction criteria discussed in one or more of the various techniques of this disclosure.

At block 1920, the scheduling entity 1106 may receive the channel state reports 1110 and continue to refine the DL precoders. In an example, the scheduling entity 1106 may further refine the first subset of DL precoders corresponding to the first subset of antenna ports. The scheduling entity 1106 may, additionally, determine a second subset of precoders based on the first subset of precoders (e.g., based on the null space of the refined subset of precoders), or as an independently, randomly generated set of precoder values for precoding signals transmitted over the second subset of antenna ports. In any case, the scheduling entity 1106 may continue modifying the DL precoders to include at least one first subset of DL precoders refined over time (e.g., in response to each new channel state report 1110), and at least one second subset of DL precoders corresponding to the second subset of antenna ports. Accordingly, the scheduling entity 1106 may continuously utilize the DL precoders as refined over time to provide a variety of DL transmissions to the scheduled entity 1102 over time.

The scheduling entity 1106 and the scheduled entity 1102 may repeat this entire process 1900, or at least a portion of the process 1900, any number of times to dynamically maintain a suitable level of DL precoder performance. In some examples, when the channel state reporting process (e.g., process 1900) has discontinued, a scheduling entity 1106 may, at variously subsequent times, transmit to the scheduled entity 1102 a trigger to re-initiate the channel state reporting process 1900 (starting at block 1916, for example). In another example, the scheduled entity 1102 may, on its own, initiate the channel state reporting period (e.g., automatically), such as at various predetermined and/or random time intervals for periodic precoder refinement to dynamically maintain a suitable level of DL precoder performance. Examples for the Omission of Data from Channel State Reports FIG. 22 is a flow chart illustrating an exemplary process for a scheduled entity 1102 to omit certain information (e.g., parameters, report parts) from a set of channel state reports when preconfigured conditions are met in accordance with some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 25 may be configured to carry out the process 2200. In some examples, any suitable apparatus or means for carrying out the functions or algorithm described below may carry out the process 2200.

At block 2201, a scheduling entity 1106 (e.g., a BS) transmits reference signals, such as a CSI-RS, using a transceiver with one or more antennas. Here, to provide for refinement of the DL precoders it uses, the scheduling entity 1106 transmits a first subset of RSs via a first subset of antenna ports, using a first set of DL precoders, and a second subset of RSs via a second subset of antenna ports, using a second set of DL precoders. For example, the first set of DL precoders may be those that the scheduling entity 1106 aims to refine, while the second set of DL precoders may be employed as follows to refine the first set of DL precoders.

At block 2202, the scheduled entity 1102 (e.g., a UE) receives the RSs using a transceiver with one or more antennas. In an example, the scheduled entity 106 may receive the RS(s) as a first subset of RSs and a second subset of RSs corresponding to respective antenna port subsets. To illustrate, the first set of RSs may be a first set of channel state information reference signals (CSI-RSs) transmitted using the first set of precoders, and the second set of RSs may be a second set of CSI-RSs transmitted using the second set of precoders.

The scheduled entity 1102 may then perform suitable measurements of the received RSs to obtain one or more parameters such as a Doppler spread, a minimum mean squared error (MMSE) estimate of the channel, or any other suitable parameter(s). Based on these measurements, the scheduled entity 1102 determines a first set of channel coefficients (e.g., amplitude and/or phase measurement components) corresponding to the first subset of antenna ports, and a second set of channel coefficients corresponding to the second subset of antenna ports. For example, as discussed above, the scheduled entity may determine the SVD of the channel, a DFT basis of the channel, or any other suitable algorithm to determine the channel coefficients. Further, the scheduled entity determines a suitable set of port attributes corresponding to the second subset of antenna ports, such as an identification of a portion of the second subset of antenna ports (e.g., utilizing port indices) where the value of a corresponding RS measurement is high enough to meet or exceed a predefined threshold (e.g., a signal power threshold, etc.).

At block 2204, the scheduled entity 1102 may determine, based at least in part on the timing parameters, that the scheduled entity 1102 is set to transmit data relative to the second subset of antenna ports. As discussed above, the scheduled entity 1102 may first be set to transmit feedback including the first set of channel coefficients with a highest priority, e.g., according to a first timing that provides relatively short durations between transmissions. In addition, in this example, the scheduled entity 1102 may then determine to transmit data relative to the second subset of antenna ports, e.g., according to a second timing and/or a third timing that provide for relatively longer duration between transmissions. According to an aspect of the present disclosure, the scheduled entity 1102 may determine, however, not to transmit feedback corresponding to the second subset of antenna ports regardless of whether the scheduled entity 1102 was set to do so at the particular time. That is, at blocks 2206-2210, the scheduled entity 1102 determines whether to include, or to omit, at least one of the second set of channel coefficients and/or the set of port attributes of the second subset of antenna ports, from its feedback transmission(s) (e.g., as part of any one or more of channel state report(s) 1110).

In some examples, the scheduled entity 1102 may determine whether one or more conditions have been met, including whether a resource allocation limitation corresponding to the transmitting of a channel state report 1110 has been met. In an example, when the precoder corresponding to the first subset of antenna ports is well matched with the channel and/or the UL resource is limited, the scheduled entity 1102 may determine to omit part 1112C from a given channel state report 1110 set for transmission at a particular time interval. In some instances, the scheduled entity 1102 may obtain a limited set of scheduled resources that it may use for feedback transmission (e.g., transmission of UCI). For this or any other suitable reason, a scheduled entity 1102 may reduce its feedback transmission overhead by accordingly determining to omit the second set of channel coefficients, the set of port attributes of the second subset of antenna ports, or both from a feedback transmission. In another example, the scheduled entity 1102 may establish that the signals received via the second subset of antenna ports are weaker than a predefined threshold. Accordingly, the measurements of the received RSs corresponding to the second subset of antenna ports may result in a channel vector having an amplitude that falls below a predefined threshold value. Of course, any other measurement or characteristic of the second subset of antenna ports may be utilized in this manner in a given implementation.

At decision block 2206, the scheduled entity 1102 may determine whether to omit feedback corresponding to port attributes (e.g., port indices) for the second subset of antenna ports. In such examples, when the scheduled entity 1102 determines to omit part 1112B, then the scheduled entity 1102 may omit part 1112C as well. This is because part 1112C may be associated with part 1112B. That is, the scheduling entity 1106 may not infer port indices based on part 1112C information. That is, when the scheduled entity 1102 determines at decision block 2206 to omit part 1112B, then the scheduled entity may generate a channel state report 1110 that does not include data relative to the second subset of antenna ports even when the scheduled entity 1102 was otherwise set to include such data based on the timing parameters. The scheduled entity 1102 may decide to omit such feedback based on weak signal measurements in accordance with any suitable number of antenna ports among the second subset of antenna ports. As one example, the scheduled entity 1102 may determine to omit at least one of the second set of channel coefficients and/or the set of port attributes of the second subset of antenna ports if at least a predefined threshold number of antenna ports in the second subset exhibit less than a predefined value of a measurement parameter.

At decision block 2208, the scheduled entity 1102 may determine whether to omit feedback corresponding to the channel coefficients for the second subset of antenna ports. In an example where the allocated UCI resource is limited, the scheduled entity 1102 may omit all or a portion of part 1112C or both of part 1112B and part 1112C. When the scheduled entity 1102 determines not to omit any parts (e.g., no at blocks 2206 and 2208), then the scheduled entity 1102 may report parts 1112A-1112C in a given channel state report 1110 that is set to include parts 1112A-1112C in accordance with the timing parameters.

At block 2210 (when the scheduled entity 1102 determines Yes to omit data at block 2208), the scheduled entity 1102 may omit feedback corresponding to the channel coefficients for the second subset of antenna ports.

At block 2212, the scheduled entity 1102 generates the feedback information, e.g., including at least the first set of channel coefficients corresponding to the first subset of antenna ports. And according to the considerations discussed above in relation to blocks 2106-2110, the scheduled entity 1102 may further generate feedback information including a set of port attributes and/or a second set of channel coefficient corresponding to the second subset of antenna ports.

In an illustrative example, the scheduled entity 1102 may report port attributes in part 1112B, and a portion of coefficients in part 1112C. In an example involving a selection of 4 out of 8 antenna ports for part 1112B, the scheduled entity 1102 may reports part 1112B using a bitmap, such as '10010011' (e.g., port 1, 4, 7, and 8 are selected). The scheduled entity 1102 may determine to report the channel coefficients in part 1112C for various reasons, where those coefficients correspond to port 4 and port 7, and may omit the coefficients associated with port 1 and port 8. As such, the scheduled entity 1102 then represents the bitmap for part 1112B as 00010010 to reflect that port 1 and port 8 were not adequate for reporting in part 1112C. In another example, the scheduled entity 1102 may report port attributes in part 1112B ('10010011') and omit part 1112C entirely in a given channel state report 1110 set to otherwise include parts 1112A-1112C.

At block 2218, the scheduled entity 1102 may transmit the set of channel state reports 1110 to the scheduling entity 1106. In such instances, the scheduled entity 1102 may determine that one or more conditions have been met that cause the scheduled entity 1102 to omit from a given channel state report 1110 at least one of: the set of port attributes and/or at least a portion of the second set of channel coefficients. As shown, the scheduled entity 1102 may then transmit the at least one channel state report 1110 with omission the portion of the second set of channel coefficients or both the set of port attributes and the portion of the second set of channel coefficients.

At block 2220, the scheduling entity 1106 receives and processes the channel state reports 1110 to modify the DL precoders (e.g., the DL precoders corresponding to the first subset of antenna ports). In some examples, this process may be repeated any number of times to dynamically maintain a suitable level of DL performance.

FIG. 23 is a flow chart illustrating an exemplary process for reducing the size of a channel state report according to some aspects of the present disclosure. As described below, a particular implementation may omit some or all illustrated features, and may not require some illustrated features to implement all embodiments. In some examples, the scheduling entity 2400 illustrated in FIG. 24 and the scheduled entity 2500 illustrated in FIG. 26 may be configured to carry out the process 2200. In some examples, any suitable apparatus or means for carrying out the functions or algorithm described below may carry out the process 2300.

At block 2301, a scheduling entity 1106 transmits reference signals, such as a CSI-RS, using a transceiver with one or more antennas. Here, to provide for refinement of the DL precoders it uses, the scheduling entity 1106 transmits a first subset of RSs via a first subset of antenna ports, using a first set of DL precoders, and a second subset of RSs via a second subset of antenna ports, using a second set of DL precoders. For example, the first set of DL precoders may be those that the scheduling entity 1106 aims to refine. The scheduling entity 1106 may then employ the second set of DL precoders as follows to refine the first set of DL precoders.

At block 2302, the scheduled entity 1102 (e.g., a UE) receives the RSs using a transceiver with one or more antennas. In an example, the scheduled entity 1102 may receive the RS(s) as a first subset of RSs and a second subset of RSs corresponding to respective antenna port subsets. To illustrate, the first set of RSs may be a first set of channel state information reference signals (CSI-RSs) transmitted using the first set of precoders, and the second set of RSs may be a second set of CSI-RSs transmitted using the second set of precoders.

At block 2304, the scheduled entity 1102 generates a first channel state report of a set of channel state reports 1110. In particular, the scheduled entity 1102 is set, based on the timing parameters, to include in the channel state report at least one of: the second set of channel coefficients (e.g., part 1112C) using the third timing, and/or the set of port attributes (e.g., part 1112B) using the second timing.

In an illustrative example, the scheduled entity 1102 may be set, at a particular point in time, to report parts 1112A, 1112B, and 1112C (e.g., at time interval 4 in FIG. 15 as simply an illustrative example). For part 1112A, the scheduled entity 1102 may be set to determine four coefficients for amplitude and four coefficients for phase. If, in an illustrative example, the quantization level for amplitude is three bits and for phase is 3 bits, then the payload size for part 1112A may calculate to 24 bits (e.g., 4*3+4*3=24 bits). The scheduled entity 1102 may not necessarily need to generate the report for part 1112A first to determine the payload size. That is, the scheduled entity 1102 may calculate payload sizes prior to compiling any channel state report 1110 or parts thereof.

In this example, for part 1112B, the scheduled entity 1102 may determine, for example, a selection of four antenna ports out of eight antenna ports from the second subset of antenna ports as providing relatively higher quality signals and/or signals exceeding a static threshold. In such an example, the scheduled entity 1102 may determine the port attributes for part 1112B by generating a bitmap to indicate the port selection (e.g., '10010011,' as the selection attributed ports in the second subset of ports, thereby indicating a selection of ports 1, 4, 7, and 8 in this particular example). Accordingly, the payload size for part 1112B is eight bits.

At block 2308, the scheduled entity 1102 may determine whether a size of the channel state report 1110 exceeds a size threshold for a channel state report 1110. In an example, the scheduled entity 1102 may receive a size limitation for the channel state report 1110 from a scheduling entity 1106. The payload size may have a limitation. To illustrate in a non-limiting example, the payload size may have a set limitation of 40 bits. To continue the above illustrative example involving payload size calculations for parts 1112A and 1112B, the scheduled entity 1102 may determine a number of bits remaining for coefficients in part 1112C. In this particular example, there are 8 bits remaining for coefficients in part 1112C (i.e., limitation size (e.g., 40 bits) minus size of part 1112A (e.g., 24 bits) minus size of part 1112B (e.g., 8 bits)=8 bits left for coefficients in part 1112C). If, for example, the quantization level for part 1112C is also 3 bits for amplitude and 3 bits for phase, then the payload size for part 1112C may calculate to 24 bits (i.e., e.g., 4*3+4*3=24 bits). In this instance, the scheduled entity 1102 may determine that including the three parts in their entirety would exceed the 40-bit size threshold imposed upon the scheduled entity 1102.

At block 2310, when the size exceeds the threshold (e.g., YES at block 2308), the scheduled entity 1102 may determine to reduce the size of the channel state report 1110. In an example, the scheduled entity 1102 may determine to omit parts 1112C or 1112B as described with reference to FIG. 22. However, the scheduled entity 1102 may determine that it can satisfy the size limitation threshold by instead only omitting quantization bits from the second quantized set of channel coefficients that correspond to weak amplitudes, for example. In an example, the scheduled entity 1102 may determine the second quantized set of channel coefficients using various quantization schemes, for example, as described with reference to FIGS. 13, 16, and 18. Upon determining that a channel state report 1110 with the second quantized set of channel coefficients would exceed the size threshold, the scheduled entity 1102 may determine the overage amount could be compensated for by omitting a particular amount of quantized data from the second quantized set of channel coefficients. Accordingly, the scheduled entity 1102 may determine a reduced portion of the second quantized set of channel coefficients that correspond to measured amplitudes satisfying a predefined amplitude threshold (e.g., highest amplitude coefficients pass while lowest amplitude coefficients are omitted). This is because weak signals corresponding to the second subset of antenna ports may not contribute to the refinement of the precoders.

if all three parts in the CSI report, then the scheduled entity 1102 can further determine whether to. It might be the case that some of the signals received from the second subset of antenna ports are strong, and the corresponding channel coefficients should be reported back for better DL precoders refinement. However, the payload size is limited, therefore, UE would omit the bits correspond to weak amplitudes, and just report back stronger coefficients.

At block 2312, the scheduled entity 1102 may modify the channel state reports 1110 to include the reduced portion of the quantized set of channel coefficients when transmitted using the third timing.

At block 2314, the scheduled entity 1102 may transmit the set of channel state reports 1110 as modified based on the size threshold. In such examples, the scheduled entity 1102 may transmit the second set of channel coefficients, as those would be represented in modified form, as a reduced portion of the second quantized set of channel coefficients. To illustrate with reference to the 40-bit threshold size example above, the scheduled entity 1102 may omit some of the quantization bits corresponding to the second subset of antenna ports to in any number of different ways. To illustrate with a few non-limiting example, the scheduled entity 1102 may determine to only include in the channel state report 1110 the strongest signal, which in an example, may be the coefficient corresponding to antenna port 4. Therefore, the report in part 1112B changes to '00010000' (i.e., only port 4 is selected then because it may have the strongest amplitude). The scheduled entity 1102 may reduce the size this way by omitting data to provide a payload for part 1112C as being 1*3+1*3=6 bits. That is, the scheduled entity 1102 may reduce the size to achieve a particular payload size that is less than the size threshold. The scheduled entity 1102 is able to achieve this here in this way because then the total payload size after reduction is 24 bits for part 1112A plus 8 bits for part 1112B plus 6 bits for part 1112C, providing 38 bits in total (e.g., 24+8+6), which is less than the 40-bit size threshold.

In another example, the scheduled entity 1102 may determine to omit part 1112C entirely, even at a time interval that the scheduled entity 1102 is set to include all or even a portion of part 1112C. In this instance, the total payload size would be 24 bits for part 1112A plus 8 bits for part 1112B, providing 32 bits in total, which is less than the 40-bit size threshold. In yet another example, the scheduled entity 1102 may determine to omit both part 1112B and 1112C. In this instance, the scheduled entity 1102 may further determine to alter the quantization level for part 1112A from 3 bits to 5 bits (e.g., 5 bits for amplitude and 5 bits for phase). Accordingly, the total size of channel state report 1110 is then 4*5+4*5=40 bits (with only part 1112A included). The scheduled entity 1102 may determine to proceed this way because the signals received from the second subset of antenna ports are all very weak (e.g., below a quality threshold). The scheduled entity 1102 may determine that the channel state report 1110 would be more effective in allowing scheduling entity 1106 to refine its DL precoders based on part 1112A only with better quality (higher quantization level) given a limited payload.

At block 2316, the scheduling entity 1106 may receive and process the channel state reports 1110 to modify the DL precoders. In this example, the scheduling entity 1106 may expect to receive all three parts at time interval 4 in FIG. 15, but may only receive part 1112A and/or part 1112B due to report size meeting the size threshold as then a condition for the scheduled entity 1102 to reduce the size of the channel state report 1110.

This process may repeat any number of times to dynamically maintain a suitable level of DL performance. To illustrate, the scheduling entity 1106 may first transmit a signal to the scheduled entity 1102 using a set of DL precoders. The scheduling entity 1106 may determine the first subset of DL precoders corresponding to the first subset of antenna ports by estimating the UL channel (e.g., without any refinement), and may determine the second subset of DL precoders corresponding to the second subset of antenna ports by determining the null space corresponding to the first subset of antenna ports. When the UL and DL channels are mismatched (e.g., in terms of poor FDD reciprocity), the scheduled entity 1102 may receive relatively strong signals over the second subset of antenna ports (relative to signals received over the first subset of antenna ports). In contrast, when the UL/DL channels are well-matched, the scheduled entity 1102 may receive weak signals (e.g., mostly noise) over the second subset of antenna ports relative to signals received over the first subset of antenna ports.

In the mismatched case, the scheduled entity 1102 may report at least those channel coefficients corresponding to strong amplitudes, so that the scheduling entity 1106 can more advantageously refine the set of DL precoders. After several refinements, the DL precoders may begin to gradually approximate the DL channel over time. In turn, the scheduled entity 1102 may receive increasingly weak signals from the second subset of antenna ports relative to signals received over the first subset of antenna ports. Accordingly, the scheduled entity 1102 may determine to omit part 1112C entirely (e.g., at block 2210 of FIG. 22). If, however, the DL channel changes, the DL precoders may no longer sufficiently match the DL channel to satisfy a particular matching threshold. In such instances, the scheduled entity 1102 may determine to transmit more of the channel coefficients in part 1112C, such that the scheduling entity 1106 may better refine the DL precoders. Accordingly, the size thresholds may change over time (e.g., as a function of the relative mismatch between a channel and a set of precoders that a scheduled entity 1102 may determine based on the relative signal strength received over the second subset of antenna ports). As an example, the scheduled entity 1102 may tune the size threshold over time based on the relative mismatch between a channel and a set of precoders used to transmit over the channel to provide optimal data amounts and/or report types to the scheduling entity 1106 for efficient precoder refinement.

Scheduling Entity

Figure 24:
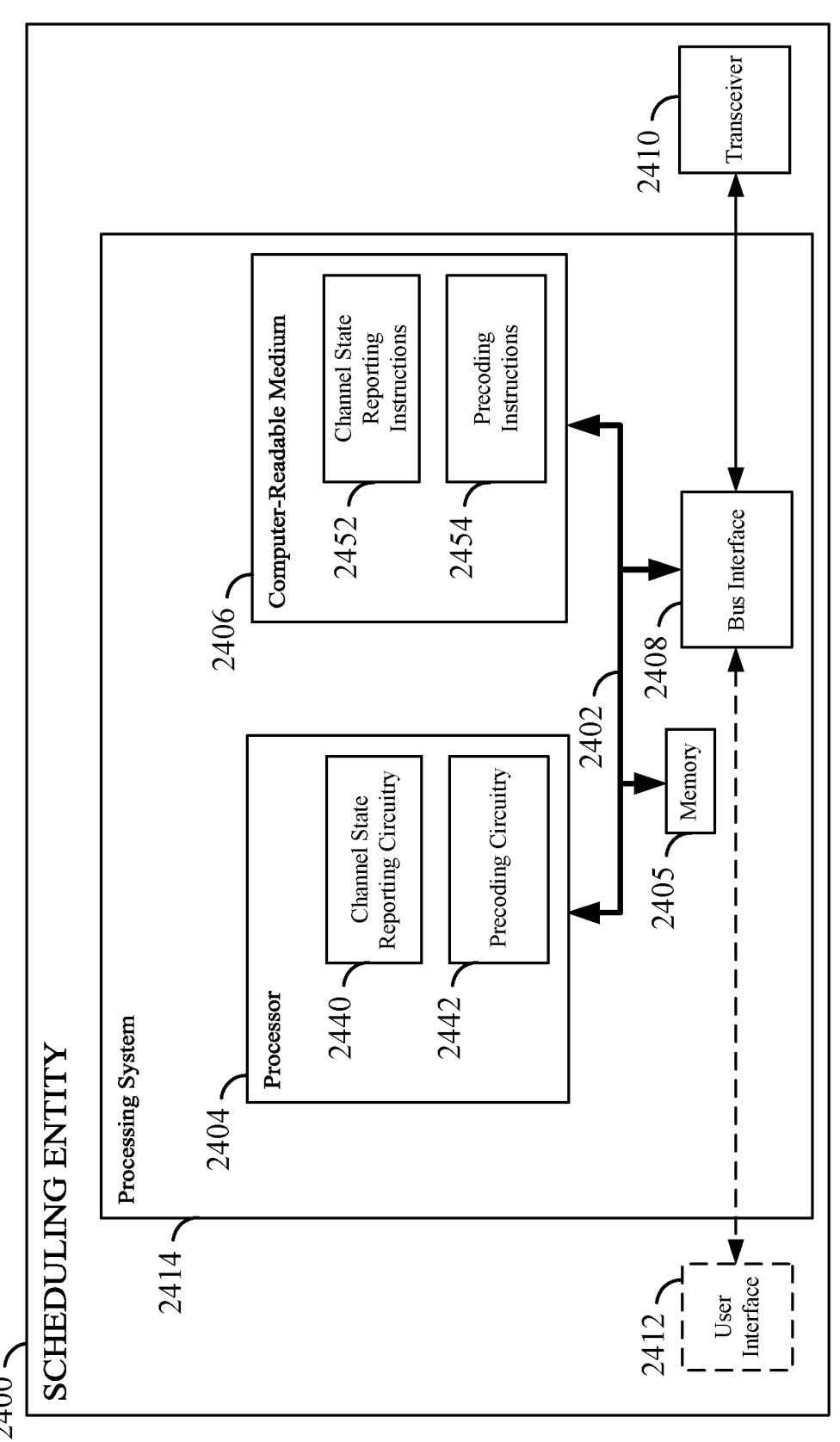
FIG. 24 is a block diagram conceptually illustrating an example of a hardware implementation for a scheduling entity according to some embodiments.

FIG. 24 is a block diagram illustrating an example of a hardware implementation for a scheduling entity 2400 employing a processing system 2414. For example, the scheduling entity 2400 may be a user equipment (UE) as illustrated in any one or more of FIGS. 1-3, 10, etc. In another example, the scheduling entity 2400 may be a BS as illustrated in any one or more of FIGS. 1-3, 10, etc.

The scheduling entity 2400 may include a processing system 2414 having one or more processors 2404. Examples of processors 2404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 2400 may be configured to perform any one or more of the functions described herein. That is, the processor 2504, as utilized in a scheduling entity 2400, may be configured (e.g., in coordination with the memory 2405 and the transceiver 2410) to implement any one or more of the processes and procedures described above and illustrated in FIGS. 10-23.

The processing system 2414 may be implemented with a bus architecture, represented generally by the bus 2402. The bus 2402 may include any number of interconnecting buses and bridges depending on the specific application of the processing system 2414 and the overall design constraints. The bus 2402 communicatively couples together various circuits including one or more processors (represented generally by the processor 2404), a memory 2405, and computer-readable media (represented generally by the computer-readable medium 2406). The bus 2402 may also link various other circuits such as timing sources, peripherals, voltage regulators, and power management circuits, which are well known in the art, and therefore, will not be described any further. A bus interface 2408 provides an interface between the bus 2402 and a transceiver 2410. The transceiver 2410 provides a communication interface or means for communicating with various other apparatus over a transmission medium. Depending upon the nature of the apparatus, a user interface 2412 (e.g., keypad, display, speaker, microphone, joystick) may also be provided. Of course, such a user interface 2412 is optional, and some examples, such as a base station, may omit it.

In some aspects of the present disclosure, the processor 2404 may include channel state reporting circuitry 2440 configured (e.g., in coordination with the memory 2405 and the transceiver 2410) for various functions, including, e.g., transmitting channel state reporting parameters (e.g., quantization parameters, timing parameters, omission parameters, etc.) for configuring a scheduled entity 106 with channel state reporting instructions and/or receiving data, control signaling, and reference signals over a wireless air interface. The processor 2404 may further include precoding circuitry 2442 configured (e.g., in coordination with the memory 2405 and the transceiver 2410) for various functions, including, e.g., determining and applying a precoding matrix to a wireless transmission (e.g., a first subset of precoders and a second subset of precoder relative to corresponding antenna port subsets).

The processor 2404 is responsible for managing the bus 2402 and general processing, including the execution of software stored on the computer-readable medium 2406.

The software, when executed by the processor 2404, causes the processing system 2414 to perform the various functions described above for any particular apparatus. The processor 2404 may also use the computer-readable medium 2406 and the memory 2405 for storing data that the processor 2404 manipulates when executing software.

One or more processors 2404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2406. The computer-readable medium 2406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2406 may reside in the processing system 2414, external to the processing system 2414, or distributed across multiple entities including the processing system 2414. The computer-readable medium 2406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 2406 may store computer-executable code that includes channel state reporting instructions 2452 that configure a scheduling entity 2400 for various functions. For example, the channel state instructions 2452 may be configured to cause a scheduling entity 2400 to implement one or more of the functions described in relation to FIGS. 10-23, including, e.g., block 1901, block 1051, etc. The computer-readable storage medium 2406 may store computer-executable code that includes precoding instructions 2454 that configure a scheduling entity 2400 for various functions described in relation to FIGS. 10-23, including, e.g., blocks 1002, 1310, 1904, etc. It should be understood that the scheduling entity 2400 may deploy precoder manager 124 (e.g., via controller/processor 312 of FIG. 3) in the execution of precoding instructions 2454 (e.g., blocks 1206, 1310, etc.).

In one configuration, the apparatus 2400 for wireless communication includes means for determining and transmitting a set of channel state parameters for configuring a scheduled entity 106 for channel state reporting, for example, using timing parameters, and means for precoding signals transmitted over a set of antenna ports. In one aspect, the aforementioned means may be the processing system 2414 shown in FIG. 24 configured to perform the functions recited by the aforementioned means. In another aspect, the aforementioned means may be a circuit or any apparatus configured to perform the functions recited by the aforementioned means.

Of course, in the above examples, the circuitry included in the processor 2404 is merely provided as an example, and other means for carrying out the described functions may be included within various aspects of the present disclosure, including but not limited to the instructions stored in the computer-readable storage medium 2406, or any other suitable apparatus or means described in any one of the FIGS. 1-4, and utilizing, for example, the processes and/or algorithms described herein in relation to FIGS. 5-23. In any case, the previous description is provided to enable any person skilled in the art to practice the various aspects described herein.

Scheduled Entity

Figure 25:
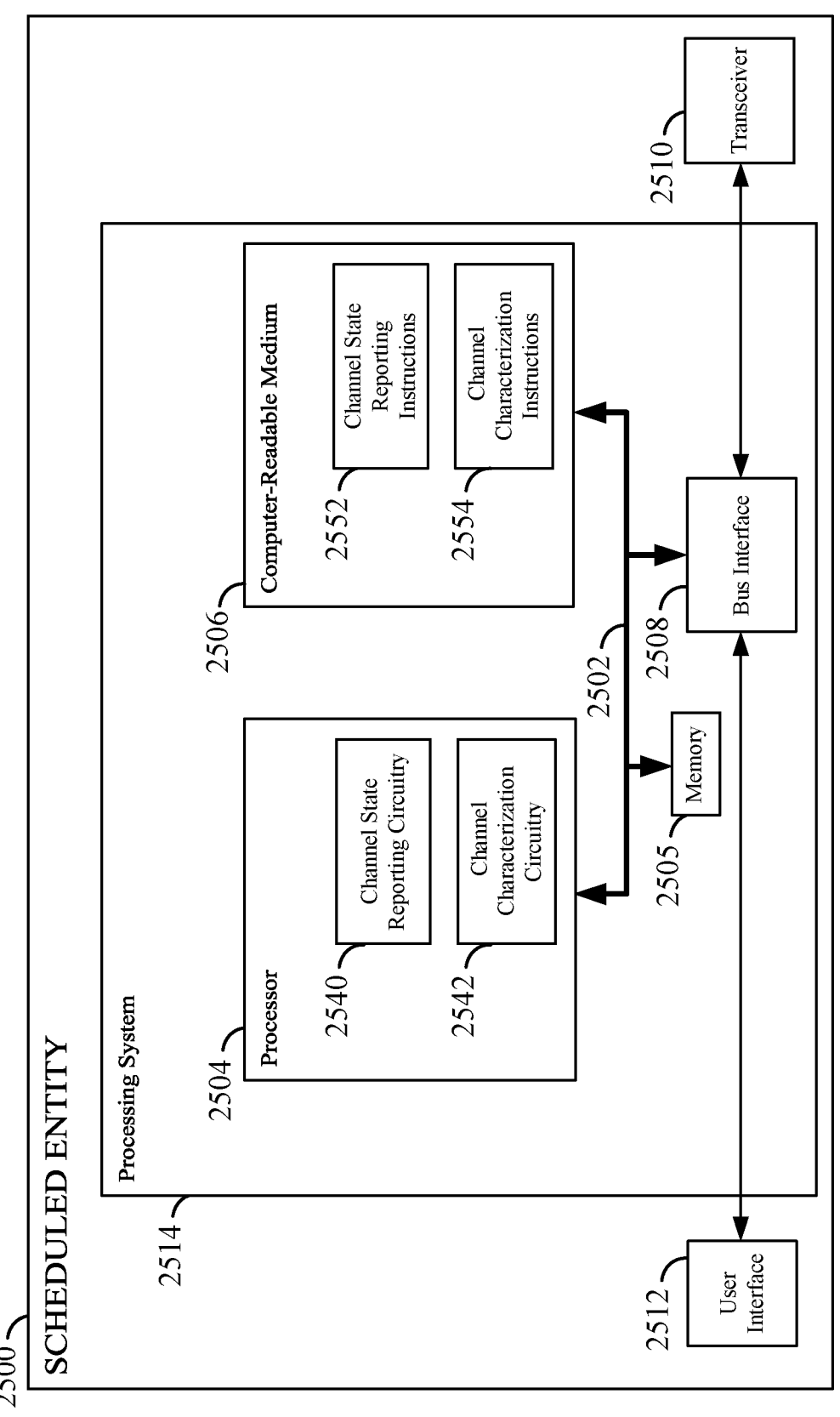
FIG. 25 is a block diagram conceptually illustrating an example of a hardware implementation for a scheduled entity according to some embodiments.

FIG. 25 is a conceptual diagram illustrating an example of a hardware implementation for an exemplary scheduled entity 2500 employing a processing system 2514. In accordance with various aspects of the present disclosure, a processing system 2514 may include an element, or any portion of an element, or any combination of elements having one or more processors 2504. For example, the scheduled entity 2500 may be a user equipment (UE) as illustrated in any one or more of FIGS. 1-3.

The processing system 2514 may be substantially the same as the processing system 2414 illustrated in FIG. 24, including a bus interface 2508, a bus 2502, memory 2505, a processor 2504, and a computer-readable medium 2506. Furthermore, the scheduled entity 2500 may include a user interface 2512 and a transceiver 2510 substantially similar to those described above in FIG. 24. That is, the processor 2504, as utilized in a scheduled entity 2500, may be configured (e.g., in coordination with the memory 2505 and the transceiver 2510) to implement any one or more of the processes described and illustrated in FIGS. 1-23.

In some aspects of the present disclosure, the processor 2504 may include channel state reporting circuitry 2540 configured (e.g., in coordination with the memory 2505 and the transceiver 2510) for various functions, including, for example, generating and/or transmitting channel state reports over a wireless air interface. The processor 2504 may further include channel characterization circuitry 2542 configured (e.g., in coordination with the memory 2505 and the transceiver 2510) for various functions, including, for example, receiving and performing suitable measurements on a signal such as a reference signal, to be utilized in the communication of one or more channel state reports in a set of channel state reports.

And further, the computer-readable storage medium 2506 may store computer-executable code that includes channel state reporting instructions 2552 that configure a scheduled entity 2500 configured (e.g., in coordination with the memory 2505 and the transceiver 2510) for various functions, including, for example, generating and/or transmitting channel state reports over a wireless air interface. The computer-readable storage medium 2506 may further store computer-executable code that includes channel characterization instructions 2554 that configure a scheduled entity 2500 configured (e.g., in coordination with the memory 2505 and the transceiver 2510) for various functions, including, for example, receiving and performing suitable measurements on a signal such as a reference signal, to be utilized in the communication of one or more channel state reports in a set of channel state reports. It should be understood that the scheduled entity 2500 may deploy channel feedback manager 122 in the execution of channel characterization instructions 2554 (e.g., blocks 1210 and/or 1324) and channel state reporting instructions 2552 (e.g., blocks 1214, 2116, etc.).

In one configuration, the apparatus 2500 for wireless communication includes means for determining channel characterization parameters for a channel and for generating and transmitting a set of channel state reports, for example, using timing parameters, quantization parameters, etc. In one aspect, the aforementioned means may be the processing system 2514 shown in FIG. 25 configured to perform the functions recited by the aforementioned means. In another aspect, the aforementioned means may be a circuit or any apparatus configured to perform the functions recited by the aforementioned means.

Of course, in the above examples, the circuitry included in the processor 2504 is merely provided as an example, and other means for carrying out the described functions may be included within various aspects of the present disclosure, including but not limited to the instructions stored in the computer-readable storage medium 2506, or any other suitable apparatus or means described in any one of the FIGS. 1-3, and utilizing, for example, the processes and/or algorithms described herein in relation to FIGS. 5-23.

Further Examples Having a Variety of Features

Example 1: A method, apparatus, system, and non-transitory computer-readable medium for wireless communication over a set of antenna ports that includes receiving a first set of reference signals (RSs) corresponding to a first subset of the antenna ports; receiving a second set of RSs corresponding to a second subset of the antenna ports, the first subset of antenna ports corresponding to a first set of precoders and the second subset of antenna ports corresponding to a second set of precoders; determining, based at least in part on the first set of RSs, a first set of channel coefficients corresponding to the first subset of antenna ports; determining, based at least in part on the second set of RSs, a second set of channel coefficients corresponding to the second subset of antenna ports, and a set of port attributes corresponding to at least a portion of the second subset of antenna ports; transmitting the first set of channel coefficients using a first timing; transmitting the set of port attributes using a second timing; and transmitting the second set of channel coefficients using a third timing.

Example 2: A method, apparatus, system, and non-transitory computer-readable medium according to Example 1, wherein the first timing is less than the second timing, and the third timing is greater than or equal to the second timing.

Example 3: A method, apparatus, system, and non-transitory computer-readable medium according to any of Examples 1 or 2, wherein the portion of the second subset of antenna ports includes at least one antenna port, and wherein the determining of the set of port attributes includes: determining, based at least in part on the second set of RSs, a set of quality attributes for the at least one antenna port; determining that the set of quality attributes for the at least one antenna port satisfies a predefined port selection threshold; and determining the set of port attributes to include antenna port data corresponding to the at least one antenna port comprising the set of quality attributes satisfying the predefined port selection threshold.

Example 4: A method, apparatus, system, and non-transitory computer-readable medium according to any of Examples 1 through 3, further including: quantizing, based at least in part on a first reference amplitude corresponding to the first set of channel coefficients, the first set of channel coefficients to produce a first quantized set of channel coefficients; and quantizing, based at least in part on the second reference amplitude, the second set of channel coefficients to produce a second quantized set of channel coefficients, wherein the transmitting of the first set of channel coefficients includes: transmitting, using the first timing, the first set of channel coefficients as represented by the first quantized set of channel coefficients, and wherein the transmitting of the second set of channel coefficients includes: transmitting, using the third timing, the second set of channel coefficients as represented by the second quantized set of channel coefficients.

Example 5: A method, apparatus, system, and non-transitory computer-readable medium according to Example 4, wherein the first set of channel coefficients includes a plurality of channel coefficients, and wherein quantizing the first set of channel coefficients includes: determining at least one channel coefficient from the first set of channel coefficients as representative of a set of stronger coefficients relative to at least one other channel coefficient in the plurality of channel coefficients; and utilizing, when quantizing the first set of channel coefficients, a set of amplitudes corresponding to the set of stronger coefficients as the first reference amplitude, and wherein the second reference amplitude is the same as the first reference amplitude.

Example 6: A method, apparatus, system, and non-transitory computer-readable medium according to Example 4, wherein the second reference amplitude represents the strongest coefficient from the second set of channel coefficients.

Example 7: A method, apparatus, system, and non-transitory computer-readable medium according to Example 6, wherein the quantizing of the first set of channel coefficients to produce the first quantized set of channel coefficients includes: determining a weakest channel coefficient from the first set of channel coefficients is stronger than a second channel coefficient from the second set of channel coefficients, the second channel coefficient comprising the second reference amplitude; and quantizing the first set of channel coefficients based at least in part on the first reference amplitude and the second reference amplitude to produce the first quantized set of channel coefficients.

Example 8: A method, apparatus, system, and non-transitory computer-readable medium according to Example 4, wherein the transmitting of the second set of channel coefficients includes: determining a reduced portion of the second quantized set of channel coefficients that correspond to measured amplitudes satisfying a predefined amplitude threshold; and transmitting the second set of channel coefficients as represented by the reduced portion of the second quantized set of channel coefficients.

Example 9: A method, apparatus, system, and non-transitory computer-readable medium according to any of Examples 1 through 8, wherein the transmitting of the first set of channel coefficients, the set of port attributes, and the second set of channel coefficients includes: transmitting at least one channel state report in a set of channel state reports to include at least one of: the first set of channel coefficients using the first timing, the set of port attributes using the second timing, or the second set of channel coefficients using the third timing.

Example 10: A method, apparatus, system, and non-transitory computer-readable medium according to Example 9, wherein, when the at least one channel state report of the set of channel state reports is to set to include the first set of channel coefficients, transmitting the first set of channel coefficients using the first timing includes transmitting the at least one channel state report at a first time interval using the first timing, and wherein, when the at least one channel state report of the set of channel state reports is to set to include the set of port attributes, the transmitting of the set of port attributes using the second timing includes transmitting the at least one channel state report, using the second timing, at the first time interval or a second time interval, and wherein, when the at least one channel state report of the set of channel state reports is to set to include the second set of channel coefficients, the transmitting of the second set of channel coefficients using the third timing includes transmitting the at least one channel state report, using the third timing, at the second time interval or a third time interval.

Example 11: A method, apparatus, system, and non-transitory computer-readable medium according to any of Examples 9 or 10, further including determining that one or more conditions have been met that are configured to cause, when met, an omission from the at least one channel state report of at least one of: the set of port attributes or at least a portion of the second set of channel coefficients; and transmitting the at least one channel state report with the omission of the set of port attributes, the portion of the second set of channel coefficients, or both the set of port attributes and the portion of the second set of channel coefficients.

Example 12: A method, apparatus, system, and non-transitory computer-readable medium according to Example 11, wherein the one or more conditions include a resource allocation limitation corresponding to the transmitting of the channel state report.

Example 13: A method, apparatus, system, and non-transitory computer-readable medium according to any of Examples 9 through 12, wherein the transmitting of the at least one channel state report of the set of channel state reports includes: receiving a trigger; and in response to the trigger, transmitting the at least one channel state report of the set of channel state reports, wherein the at least one channel state report is transmitted using the first timing to include at least the first set of channel coefficients.

Example 14: A method, apparatus, system, and non-transitory computer-readable medium according to any of Examples 1 through 13, further including: receiving identification of the first subset of antenna ports as a first antenna port grouping, and the second subset of antenna ports as a second antenna port grouping.

Example 15: A method, apparatus, system, and non-transitory computer-readable medium for wireless communication over a set of antenna ports that includes transmitting a set of timing parameters that define a first timing for obtaining a first set of channel coefficients corresponding to a first subset of antenna ports, a second timing for obtaining a set of port attributes corresponding to at least a portion of a second subset of antenna ports, and a third timing for obtaining a second set of channel coefficients corresponding to the second subset of antenna ports; transmitting a first set of reference signals (RSs) using a first set of precoders that correspond to the first subset of antenna ports; transmitting a second set of RSs using a second set of precoders; receiving a set of channel state reports including at least one of: the first set of channel coefficients, the set of port attributes corresponding to the second subset of antenna ports, or the second set of channel coefficients; modifying, based at least in part on the set of channel state reports, at least the first set of precoders to produce a modified set of precoders; and transmitting a wireless transmission using the modified set of precoders.

Example 16: A method, apparatus, system, and non-transitory computer-readable medium according to Example 15, further including: determining, from the set of antenna ports, the first subset of antenna ports and the second subset of antenna ports; and utilizing the set of antenna ports to transmit the first set of RSs, the second set of RSs, and the wireless transmission.

Example 17: A method, apparatus, system, and non-transitory computer-readable medium according to any of Examples 15 or 16, further including: transmitting a set of port identifiers corresponding to at least the first subset of antenna ports and the second subset of antenna ports.

Example 18: A method, apparatus, system, and non-transitory computer-readable medium according to any of Examples 15 through 17, wherein the set of timing parameters define a transmission timing that signal a configuration for the set of channel state reports, wherein the set of channel state reports is configured to include at least one of: a first type of report that includes the first set of channel coefficients, a second type of report that includes the set of port attributes corresponding to the second subset of antenna ports, and a third type of report that includes the second set of channel coefficients.

Example 19: A method, apparatus, system, and non-transitory computer-readable medium according to Example 18, wherein the receiving of the set of channel state reports includes: receiving, according to the first timing, the first type of report that includes the first set of channel coefficients corresponding to the first subset of antenna ports; receiving, according to the second timing, the second type of report configured to include the first set of channel coefficients and the set of port attributes corresponding to the second subset of antenna ports; and receiving, according to the third timing, the third type of report configured to include the first set of channel coefficients, the set of port attributes corresponding to the second subset of antenna ports, and the second set of channel coefficients corresponding to the second subset of antenna ports.

Example 20: A method, apparatus, system, and non-transitory computer-readable medium according to Example 19, wherein the receiving of the third type of report according to the third timing includes: receiving a first quantized set of channel coefficients corresponding to the first subset of antenna ports; and receiving at least one of: a second quantized set of channel coefficients corresponding to the second subset of antenna ports, and a third quantized set of channel coefficients corresponding to the second subset of antenna ports, wherein the third quantized set includes a subset of the second quantized set of channel coefficients.

Example 21: A method, apparatus, system, and non-transitory computer-readable medium according to any of Examples 15 through 20, wherein the first timing is less than the second timing, and the third timing is greater than or equal to the second timing.

Example 22: A method, apparatus, system, and non-transitory computer-readable medium according to any of Examples 15 through 21, wherein the modifying of the first set of precoders to produce a modified set of precoders includes: modifying the first set of precoders based on at least one of: the first set of channel coefficients, the set of port attributes corresponding to the second subset of antenna ports, and the second set of channel coefficients.

Example 23: A method, apparatus, system, and non-transitory computer-readable medium according to any of Examples 15 through 22, wherein the transmitting of the second set of RSs using the second set of precoders includes: utilizing a set of random sequences to transmit the second set of RSs over the second subset of antenna ports.

Example 24: A method, apparatus, system, and non-transitory computer-readable medium according to any of Examples 15 through 23, further including: transmitting, via the first subset of antenna ports, the first set of RSs; and transmitting, via the second subset of antenna ports, the second set of RSs, wherein the first set of RSs and the second set of RSs are transmitted via the set of antenna ports to provide, at a receiver, one or more channel state information RSs (CSI-RSs).

Example 25: A method, apparatus, system, and non-transitory computer-readable medium according to any of Examples 15 through 24, further including: generating the second set of precoders based on a null space corresponding to the first subset of antenna ports.

Example 26: A method, apparatus, system, and non-transitory computer-readable medium for wireless communication over a set of antenna ports that includes: receiving a set of signals over a set of antenna ports including a first subset of antenna ports and a second subset of antenna ports; determining a first set of channel coefficients corresponding to the first subset of antenna ports; quantizing the first set of channel coefficients to produce a first quantized set of channel coefficients; determining a second set of channel coefficients corresponding to the second subset of antenna ports; quantizing the second set of channel coefficients to produce a second quantized set of channel coefficients; transmitting, at a first frequency, the first quantized set of channel coefficients; and transmitting, at a lesser frequency relative to the first frequency, the second quantized set of channel coefficients.

Example 27: A method, apparatus, system, and non-transitory computer-readable medium for wireless communication over a set of antenna ports that includes: receiving a set of signals over a set of antenna ports including a first subset of antenna ports and a second subset of antenna ports; determining a first set of channel coefficients corresponding to the first subset of antenna ports; quantizing the first set of channel coefficients to produce a first quantized set of channel coefficients; transmitting the first quantized set of channel coefficients; determining a second set of channel coefficients corresponding to the second subset of antenna ports; quantizing the second set of channel coefficients to produce a second quantized set of channel coefficients; omitting at least a portion of the second quantized set of channel coefficients when set to transmit the second quantized set of channel coefficients.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, the various aspects of this disclosure may be implemented within systems defined by 3GPP, such as Long-Term Evolution (LTE), and/or described in documents from an organization named "3rd Generation Partnership Project" (3GPP), such as LTE, as well as others including the Evolved Packet System (EPS) and/or the Universal Mobile Telecommunication System (UMTS). Various aspects may also be extended to systems defined by the and/or described in documents from an organization named the $3^{rd}$ Generation Partnership Project 2 (3GPP2). Other examples may be implemented within systems employing IEEE 802.11 (Wi-Fi), IEEE 802.16 (WiMAX), IEEE 802.20, Ultra-Wideband (UWB), Bluetooth, and/or other suitable systems. It should be noted that the terms "network" and "system" are often used interchangeably.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-25 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-25 may be configured to perform one or more of the methods, features, or steps described herein. The novel algorithms described herein may also be efficiently implemented in software and/or embedded in hardware.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b (a-b); a and c (a-c); b and c (b-c); and a, b and c (a-b-c), as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information, such as a reference signal), accessing (e.g., accessing data in a memory) and the like. Also, "determining" may include resolving, selecting, choosing, establishing and the like.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The various operations of the disclosed technology may be performed by any suitable means capable of performing the corresponding functions. The means may include various hardware and/or software component(s), and/or module(s), including, but not limited to a circuit, an application specific integrated circuit (ASIC), or processor. Generally, where there are operations illustrated in figures, those operations may have corresponding counterpart means-plus-function components with similar numbering.

It is to be understood that the claims are not limited to the precise configuration and components illustrated above. Various modifications, changes and variations may be made in the arrangement, operation and details of the methods and apparatus described herein without departing from the scope of the claims. The description of the disclosed technology is provided to enable those skilled in the art to practice the various aspects described herein. The claims, however, are not intended to be limited to the aspects shown herein, but are to be accorded the full scope consistent with the language of the claims. Various modifications to these aspects will be readily apparent to those skilled in the art, and the generic principles defined herein may be applied to other aspects.

What is claimed is:

1. A method of wireless communication over a set of antenna ports, the method comprising:

receiving a first set of reference signals (RSs) corresponding to a first subset of the antenna ports;

receiving a second set of RSs corresponding to a second subset of the antenna ports, the first subset of antenna ports corresponding to a first set of precoders and the second subset of antenna ports corresponding to a second set of precoders;

determining, based at least in part on the first set of RSs, a first set of channel coefficients corresponding to the first subset of antenna ports;

determining, based at least in part on the second set of RSs, a second set of channel coefficients corresponding to the second subset of antenna ports, and a set of port attributes corresponding to at least a portion of the second subset of antenna ports;

transmitting the first set of channel coefficients using a first timing;

transmitting the set of port attributes using a second timing; and transmitting the second set of channel coefficients using a third timing.

2. The method of claim 1, wherein the first timing is less than the second timing, and the third timing is greater than or equal to the second timing.

3. The method of claim 1, wherein the portion of the second subset of antenna ports includes at least one antenna port, and wherein the determining of the set of port attributes comprises:

determining, based at least in part on the second set of RSs, a set of quality attributes for the at least one antenna port;

determining that the set of quality attributes for the at least one antenna port satisfies a predefined port selection threshold; and determining the set of port attributes to include antenna port data corresponding to the at least one antenna port comprising the set of quality attributes satisfying the predefined port selection threshold.

4. The method of claim 1, further comprising:

quantizing, based at least in part on a first reference amplitude corresponding to the first set of channel coefficients, the first set of channel coefficients to produce a first quantized set of channel coefficients; and quantizing, based at least in part on a second reference amplitude, the second set of channel coefficients to produce a second quantized set of channel coefficients, wherein the transmitting of the first set of channel coefficients comprises:

transmitting, using the first timing, the first set of channel coefficients as represented by the first quantized set of channel coefficients, and wherein the transmitting of the second set of channel coefficients comprises:

transmitting, using the third timing, the second set of channel coefficients as represented by the second quantized set of channel coefficients.

5. The method of claim 4, wherein the first set of channel coefficients comprises a plurality of channel coefficients, and wherein quantizing the first set of channel coefficients comprises:

determining at least one channel coefficient from the first set of channel coefficients as representative of a set of stronger coefficients relative to at least one other channel coefficient in the plurality of channel coefficients; and utilizing, when quantizing the first set of channel coefficients, a set of amplitudes corresponding to the set of stronger coefficients as the first reference amplitude, and wherein the second reference amplitude is the same as the first reference amplitude.

6. The method of claim 4, wherein the second reference amplitude represents the strongest coefficient from the second set of channel coefficients.

7. The method of claim 6, wherein the quantizing of the first set of channel coefficients to produce the first quantized set of channel coefficients comprises:

determining a weakest channel coefficient from the first set of channel coefficients is stronger than a second channel coefficient from the second set of channel coefficients, the second channel coefficient comprising the second reference amplitude; and quantizing the first set of channel coefficients based at least in part on the first reference amplitude and the second reference amplitude to produce the first quantized set of channel coefficients.

8. The method of claim 4, wherein the transmitting of the second set of channel coefficients comprises:

determining a reduced portion of the second quantized set of channel coefficients that correspond to measured amplitudes satisfying a predefined amplitude threshold; and transmitting the second set of channel coefficients as represented by the reduced portion of the second quantized set of channel coefficients.

9. The method of claim 1, wherein the transmitting of the first set of channel coefficients, the set of port attributes, and the second set of channel coefficients comprises:

transmitting at least one channel state report in a set of channel state reports to include at least one of: the first set of channel coefficients using the first timing, the set of port attributes using the second timing, or the second set of channel coefficients using the third timing.

10. The method of claim 9, wherein, when the at least one channel state report of the set of channel state reports is to set to include the first set of channel coefficients, transmitting the first set of channel coefficients using the first timing comprises transmitting the at least one channel state report at a first time interval using the first timing, and wherein, when the at least one channel state report of the set of channel state reports is to set to include the set of port attributes, the transmitting of the set of port attributes using the second timing comprises transmitting the at least one channel state report, using the second timing, at the first time interval or a second time interval, and wherein, when the at least one channel state report of the set of channel state reports is to set to include the second set of channel coefficients, the transmitting of the second set of channel coefficients using the third timing comprises transmitting the at least one channel state report, using the third timing, at the second time interval or a third time interval.

11. The method of claim 9, wherein the transmitting of the at least one channel state report of the set of channel state reports comprises:

determining that one or more conditions have been met that are configured to cause, when met, an omission from the at least one channel state report of at least one of: the set of port attributes or at least a portion of the second set of channel coefficients; and transmitting the at least one channel state report with the omission of the set of port attributes, the portion of the second set of channel coefficients, or both the set of port attributes and the portion of the second set of channel coefficients.

12. The method of claim 11, wherein the one or more conditions include a resource allocation limitation corresponding to the transmitting of the channel state report.

13. The method of claim 9, wherein the transmitting of the at least one channel state report of the set of channel state reports comprises:

receiving a trigger; and in response to the trigger, transmitting the at least one channel state report of the set of channel state reports, wherein the at least one channel state report is transmitted using the first timing to include at least the first set of channel coefficients.

14. The method of claim 1, further comprising:

receiving identification of the first subset of antenna ports as a first antenna port grouping, and the second subset of antenna ports as a second antenna port grouping.

15. A method of wireless communication over a set of antenna ports, the method comprising:

transmitting a set of timing parameters that define a first timing for obtaining a first set of channel coefficients corresponding to a first subset of antenna ports, a second timing for obtaining a set of port attributes corresponding to at least a portion of a second subset of antenna ports, and a third timing for obtaining a second set of channel coefficients corresponding to the second subset of antenna ports;

transmitting a first set of reference signals (RSs) using a first set of precoders that correspond to the first subset of antenna ports;

transmitting a second set of RSs using a second set of precoders;

receiving a set of channel state reports including at least one of: the first set of channel coefficients, the set of port attributes corresponding to the second subset of antenna ports, or the second set of channel coefficients;

modifying, based at least in part on the set of channel state reports, at least the first set of precoders to produce a modified set of precoders; and transmitting a wireless transmission using the modified set of precoders.

16. The method of claim 15, further comprising:

determining, from the set of antenna ports, the first subset of antenna ports and the second subset of antenna ports; and utilizing the set of antenna ports to transmit the first set of RSs, the second set of RSs, and the wireless transmission.

17. The method of claim 15, further comprising:

transmitting a set of port identifiers corresponding to at least the first subset of antenna ports and the second subset of antenna ports.

18. The method of claim 15, wherein the set of timing parameters define a transmission timing that signal a configuration for the set of channel state reports, wherein the set of channel state reports is configured to include at least one of: a first type of report that includes the first set of channel coefficients, a second type of report that includes the set of port attributes corresponding to the second subset of antenna ports, and a third type of report that includes the second set of channel coefficients.

19. The method of claim 18, wherein the receiving of the set of channel state reports comprises:

receiving, according to the first timing, the first type of report that includes the first set of channel coefficients corresponding to the first subset of antenna ports;

receiving, according to the second timing, the second type of report configured to include the first set of channel coefficients and the set of port attributes corresponding to the second subset of antenna ports; and receiving, according to the third timing, the third type of report configured to include the first set of channel coefficients, the set of port attributes corresponding to the second subset of antenna ports, and the second set of channel coefficients corresponding to the second subset of antenna ports.

20. The method of claim 19, wherein the receiving of the third type of report according to the third timing comprises:

receiving a first quantized set of channel coefficients corresponding to the first subset of antenna ports; and receiving at least one of: a second quantized set of channel coefficients corresponding to the second subset of antenna ports, and a third quantized set of channel coefficients corresponding to the second subset of antenna ports, wherein the third quantized set comprises a subset of the second quantized set of channel coefficients.

21. The method of claim 15, wherein the first timing is less than the second timing, and the third timing is greater than or equal to the second timing.

22. The method of claim 15, wherein the modifying of the first set of precoders to produce a modified set of precoders comprises:

modifying the first set of precoders based on at least one of: the first set of channel coefficients, the set of port attributes corresponding to the second subset of antenna ports, and the second set of channel coefficients.

23. The method of claim 15, wherein the transmitting of the second set of RSs using the second set of precoders comprises:

utilizing a set of random sequences to transmit the second set of RSs over the second subset of antenna ports.

24. The method of claim 15, further comprising:

transmitting, via the first subset of antenna ports, the first set of RSs; and transmitting, via the second subset of antenna ports, the second set of RSs, wherein the first set of RSs and the second set of RSs are transmitted via the set of antenna ports to provide, at a receiver, one or more channel state information RSs (CSI-RSs).

25. The method of claim 15, further comprising:

generating the second set of precoders based on a null space corresponding to the first subset of antenna ports.

26. An apparatus for wireless communication that utilizes a set of antenna ports, the apparatus comprising:

means for receiving a first set of reference signals (RSs) corresponding to a first subset of the antenna ports;

means for receiving a second set of RSs corresponding to a second subset of the antenna ports, the first subset of antenna ports corresponding to a first set of precoders and the second subset of antenna ports corresponding to a second set of precoders;

means for determining, based at least in part on the first set of RSs, a first set of channel coefficients corresponding to the first subset of antenna ports;

means for determining, based at least in part on the second set of RSs, a second set of channel coefficients corresponding to the second subset of antenna ports, and a set of port attributes corresponding to at least a portion of the second subset of antenna ports;

means for transmitting the first set of channel coefficients using a first timing;

means for transmitting the set of port attributes using a second timing; and means for transmitting the second set of channel coefficients using a third timing.

27. The apparatus of claim 26, wherein the portion of the second subset of antenna ports includes at least one antenna port, and wherein the determining of the set of port attributes comprises:

means for determining, based at least in part on the second set of RSs, a set of quality attributes for the at least one antenna port;

means for determining that the set of quality attributes for the at least one antenna port satisfies a predefined port selection threshold; and means for determining the set of port attributes to include antenna port data corresponding to the at least one antenna port comprising the set of quality attributes satisfying the predefined port selection threshold.

28. The apparatus of claim 26, further comprising:

means for quantizing, based at least in part on a first reference amplitude corresponding to the first set of channel coefficients, the first set of channel coefficients to produce a first quantized set of channel coefficients;

means for transmitting, using the first timing, the first set of channel coefficients as represented by the first quantized set of channel coefficients;

means for quantizing, based at least in part on a second reference amplitude, the second set of channel coefficients to produce a second quantized set of channel coefficients; and means for transmitting, using the third timing, the second set of channel coefficients as represented by the second quantized set of channel coefficients.

29. The apparatus of claim 26, further comprising:

means for determining that one or more conditions have been met that are configured to cause, when met, an omission of at least one of: the set of port attributes or at least a portion of the second set of channel coefficients, from at least one channel state report in a set of channel state reports; and means for utilizing the first timing, the second timing, and the third timing to transmit the set of channel state reports, the set of channel state reports configured to include at least the first set of channel coefficients.

30. An apparatus for wireless communication that utilizes a set of antenna ports, the apparatus comprising:

at least one processor;

a transceiver communicatively coupled to the at least one processor; and a memory communicatively coupled to the at least one processor, wherein the processor is configured to:

receive a first set of RSs corresponding to a first subset of the antenna ports;

receive a second set of RSs corresponding to a second subset of the antenna ports, the first subset of antenna ports corresponding to a first set of precoders and the second subset of antenna ports corresponding to a second set of precoders;

determine, based at least in part on the first set of RSs, a first set of channel coefficients corresponding to the first subset of antenna ports;

determine, based at least in part on the second set of RSs, a second set of channel coefficients corresponding to the second subset of antenna ports, and a set of port attributes corresponding to at least a portion of the second subset of antenna ports;

transmit the first set of channel coefficients using a first timing;

transmit the set of port attributes using a second timing; and transmit the second set of channel coefficients using a third timing.

* * * * *